(12) United States Patent
Ajioka

(10) Patent No.: US 6,870,306 B2
(45) Date of Patent: Mar. 22, 2005

(54) OVERLAPPING TYPE PIEZOELECTRIC STATOR, OVERLAPPING TYPE PIEZOELECTRIC ACTUATOR AND APPLICATIONS THEREOF

(75) Inventor: Yoshiaki Ajioka, Gamagori (JP)

(73) Assignee: Ecchandes Inc., Aichi (JP)

( * ) Notice: Subject to any disclaimer, the term of this patent is extended or adjusted under 35 U.S.C. 154(b) by 20 days.

(21) Appl. No.: 10/343,705

(22) PCT Filed: Aug. 8, 2001

(86) PCT No.: PCT/JP01/06806

§ 371 (c)(1),
(2), (4) Date: Feb. 3, 2003

(87) PCT Pub. No.: WO02/15378

PCT Pub. Date: Feb. 21, 2002

(65) Prior Publication Data

US 2003/0133247 A1 Jul. 17, 2003

(30) Foreign Application Priority Data

Aug. 11, 2000 (JP) .................................. 2000-243635
Dec. 19, 2000 (JP) .................................. 2000-384883
Mar. 30, 2001 (JP) .................................. 2001-98801
Jun. 29, 2001 (JP) .................................. 2001-198080

(51) Int. Cl.$^7$ ........................... H01L 41/083; H02N 2/04
(52) U.S. Cl. ..................... 310/367; 310/311; 310/328
(58) Field of Search ........................... 310/311, 328, 310/367, 368

(56) References Cited

U.S. PATENT DOCUMENTS 3,462,746 A * 8/1969 Bartlett ........................ 365/65
4,736,132 A * 4/1988 Culp ............................ 310/333
4,795,025 A   1/1989 Doke et al. .................. 198/763
5,450,498 A   9/1995 Whitehead .................. 381/191

FOREIGN PATENT DOCUMENTS

FR  2570223    * 3/1986  .................. 310/311
JP  52-29192     3/1977  .......... H01L/41/00

(List continued on next page.)

OTHER PUBLICATIONS

Toshiro Higuchi, et al.; "Precise Positioner Utilizing Rapid Deformations of a Piezoelectric Element", JSPE, vol. 54, No. 11, pp. 2107–2112, 1988.

Karl F. Bohringer, et al ; "Computational Methods for Design and Control of MEMS Micromanipulator Arrays", IEEE Computational Science & Engineering, pp. 17–29, Jan.–Mar., 1997.

Primary Examiner—Thomas M. Dougherty
(74) Attorney, Agent, or Firm—Antonelli, Terry, Stout & Kraus, LLP

(57) ABSTRACT

Piezoelectric elements (1) are overlapping on a stator (11) in the same direction as shown in FIG. 3. Since a fixed end (6) of a piezoelectric element (1) is fixed to a foundation (4), an open end (7) of the piezoelectric element (1) elongates in the direction opposite to the foundation (4) when a voltage is applied to the piezoelectric element (1). When a drive device (12) generates a saw-tooth wave shown in FIG. 4(a), the piezoelectric element (1) rapidly elongates or slowly shrinks. A slider (21) then moves while being flicked away by the piezoelectric element (1). On the other hand, since piezoelectric element (1) rapidly shrinks or slowly elongates in the case of FIG. 4(b), a slider (21) moves while being pulled in by the piezoelectric element (1). Because of piezoelectric elements (1) arranged in a circle as shown in FIG. 13, a stator (11) can rotate a circular rotor (31) and a spherical rotor (35).

20 Claims, 48 Drawing Sheets

FOREIGN PATENT DOCUMENTS

| | | | | |
|---|---|---|---|---|
| JP | 5996881 | 6/1984 | | H02N/11/00 |
| JP | 6026476 | 2/1985 | | H02N/2/00 |
| JP | 60174078 | 9/1985 | | H02N/2/00 |
| JP | 61167591 | 7/1986 | | B41J/29/00 |
| JP | 62228392 | 10/1987 | | B25J/17/00 |
| JP | 63268479 | 11/1988 | | H02N/11/00 |
| JP | 3203571 | 9/1991 | | 310/311 |
| JP | 3-203571 | * 9/1991 | | 310/311 |
| JP | 3235676 | 10/1991 | | 310/311 |
| JP | 3-235676 | * 10/1991 | | 310/311 |
| JP | 4144819 | 5/1992 | | B65G/27/32 |
| JP | 5105291 | 4/1993 | | B65H/20/24 |
| JP | 5122961 | 5/1993 | | H02N/2/00 |
| JP | 5168195 | 7/1993 | | H02K/7/065 |
| JP | 875421 | 3/1996 | | G01B/11/00 |
| JP | 8182354 | 7/1996 | | H02N/2/00 |
| JP | 934409 | 2/1997 | | G09G/3/36 |
| JP | 10336983 | 12/1998 | | H02K/7/065 |
| JP | 1118459 | 1/1999 | | H02N/2/00 |
| JP | 2002-150585 | * 5/2002 | | G11B/7/095 |
| JP | 2002150585 | 5/2002 | | G11B/7/095 |
| WO | 9634701 | 11/1996 | | B06B/1/02 |

* cited by examiner (a)

(b)

(a)

(b)

(c)

(d)

(a)

(b)

(a)

(b)

(a)

(b)

(a)

(b)

(a)

(b)

(a)

(b)

(a)

(b)

(a)

(b)

(a)

(b)

OVERLAPPING TYPE PIEZOELECTRIC STATOR, OVERLAPPING TYPE PIEZOELECTRIC ACTUATOR AND APPLICATIONS THEREOF

FIELD OF THE INVENTION

The present invention relates to a piezoelectric actuator using some piezoelectric elements formed in the plate or the thin film, which transfers an object in terms of friction power and inertia by arranging their extension directions on a foundation as they overlap, where one end of each of them is fixed to the foundation and another end is elongated and shrinked in the extension direction.

BACKGROUND OF THE INVENTION

Since a piezoelectric motor (Published Unexamined Japanese Patent Application No. S52-29192) directly converting flexible movement of a piezoelectric element into impelling force of a slider and a rotor was developed, many ultrasonic actuators generating bending wave of a stator (for example, refer to Published Unexamined Japanese Patent Application No. S59-96881, Published Unexamined Japanese Patent Application No. S60-174078) have been developed, mainly using flexible movement of the piezoelectric element pasted up on the stator. Some multi-degree-of-freedom ultrasonic motor rotating a spherical rotor by some stators (refer to Published Unexamined Japanese Patent Application No. S62-228392, Published Unexamined Japanese Patent Application No. H9-34409, Published Unexamined Japanese Patent Application No. H11-18459) also have been developed. The ultrasonic actuators, however, have three major problems. The first is the low conversion efficiency of energy because flexible movement of the piezoelectric element must convert into the bending wave after converting it into vibration in the direction of polarization. The second is the low transfer efficiency of the friction power because a contact area between a stator and a slider or a rotor is small. The third is a complex drive device because sine waves with at least two phases are required for driving the ultrasonic actuators. Although an ultrasonic actuator possible to be driven by a single-phase wave is also developed, because of a good structure of a stator (a principle of operation of ultrasonic actuator, [online]. Seiko Instruments Inc., 2000. [retrieved on 2000 Jul. 30]. Retrieved from the Internet: <URL:http://www.sii.co.jp/wd/new_page_4.htm>), the stator must be processed according to arrangement of piezoelectric elements. Moreover, this actuator is not suitable for applications where high torque is desired, because a contact area between a stator and a slider or a rotor is extremely small.

In addition, as a method converting flexible movement of a piezoelectric element into linear movement, piezoelectric impact mechanism directly generating friction power from the flexible movement of the piezoelectric element (for example, refer to Higuchi, Watanabe, Kudoh, "Precise Positioner Utilizing Rapid Deformations of a Piezoelectric Element", JSPE, Vol. 54, No. 11, pp.2107–2112, 1988; Higuchi, Yamagata, "Precise Positioning Mechanism Utilizing Rapid Deformations of Piezoelectric Elements (2nd Report) —Motion Characteristics with Enhanced Friction—", JSPE, Vol.58, No.10, pp.1759–1764, 1992) has also been developed. The piezoelectric impact mechanism can avoid the above third problem because it can move an object to any of two directions by applying a single-phase saw-tooth wave to the piezoelectric element. Furthermore, since the piezoelectric impact mechanism employs the flexible movement of the piezoelectric element as impelling force of a moving object, it is useful for solving the above first problem, but it has three more problems as follows: First, the piezoelectric element must be the hard quality of the cylindrical material because it must connect two objects and flip them off according to the flexible movement. Therefore, a material usable practically for the piezoelectric element is restricted to piezoelectric ceramics like PZT (Lead Zirconate Titanate). Second, many piezoelectric elements must be stacked, and moreover high voltage must be applied to them because they must vibrate two heavy objects, maintaining their intensity. Third, stress generated by the piezoelectric elements is applied to two objects in the opposite directions, respectively, because the piezoelectric elements move with the two objects, repeating their flexible movement. As a result, the stress of both objects are offset, and then the conversion efficiency of energy becomes low. Thus, the piezoelectric impact mechanism can not be used instead of the conventional actuators, although it is suitable for application desiring minute movement like a micromachine.

Now, as understanding from the piezoelectric impact mechanism, some piezoelectric elements can generate big stress collectively, by stacking them. Moreover, the stress can flip off an object in a case of using a single-phase saw-tooth wave. The hard piezoelectric elements are used to flip off the object in the piezoelectric impact mechanism, but the piezoelectric elements can be soft if they can flip off the object without applying their stress to the object directly. That is, any of a plate and a thin film are sufficient as the piezoelectric elements. As a result, voltage applied to the piezoelectric elements can be made low. Moreover, the stress can be converted into impelling force of the object efficiently, because the stress can move the object in one direction if the piezoelectric elements do not move with the object.

Considering these facts, suppose that a plurality of piezoelectric elements formed in the plate or the thin film are arranged as they overlap, the end of each piezoelectric element is fixed on a foundation, and a saw-tooth wave is applied to them. An object can be flipped off by friction power generated between the piezoelectric elements and itself. Thus, the above first and third problems come to be solved. In addition, the friction between the piezoelectric elements and the object increase by attaching unevenness to contact surface between them. Thus, the above second problem comes to be solved.

By the way, many kinds of small actuators have been recently developed besides an ultrasonic motor. A vibrator is listed as a major application using these actuators (for example, refer to Published Unexamined Japanese Patent Application No. H5-168195, Published Unexamined Japanese Patent Application No. H10-336983). However, when vibrators using a coil are carried in a cellular phone with the remarkable formation of the small lightweight, and so on, they have some problems because of their weight, thickness, and moreover generating lines of magnetic force. For another example, a table moving an object has been developed, where some actuators using a piezoelectric element and a thermoelectric element are arranged on a plane (for example, refer to Karl, F. Böhringer, Bruce R. Donald, Noel C. MacDonald, "Computational methods for design and control of MEMS Micromanipulator Arrays", IEEE Computational Science & Engineering, pp. 17–29, January–March, 1997). However, the piezoelectric element and the thermoelectric element can not generate a force enough for moving a small object around us because they are researched as a micromachine.

Considering these facts, a small lightweight vibrator comes to be made by manufacturing an actuator using a thin and light piezoelectric element. In addition, some actuators, in which many piezoelectric elements are overlapping, comes to move a small object around us, by arranging them on a plate.

In the present invention described in claims, flexible movement of a plurality of piezoelectric elements are directly converted into movement of a stator and a rotor, by arranging the piezoelectric elements formed in the plate or the thin film as they overlap, and moreover, fixing the end of each piezoelectric element on a foundation. In addition, unevenness which makes to increase friction power between the piezoelectric element and the stator or the rotor is developed. Furthermore, a drive device is simplified by applying a saw-tooth wave to the piezoelectric element.

SUMMARY OF THE INVENTION

The invention described in claim 1 is an overlapping type piezoelectric stator comprising a plurality of piezoelectric elements and a foundation, wherein each said piezoelectric element is formed in a plate or a thin film; and a surface and a back of each said piezoelectric element are equipped with an electrode, respectively; wherein, in attaching all said piezoelectric elements to said foundation, all said piezoelectric elements are arranged along said foundation in turn; all said piezoelectric elements are overlapping; at least one of said electrodes on both sides of each said piezoelectric element touches said electrode of an adjacent said piezoelectric element; and an end of each said piezoelectric element is fixed to said foundation; wherein voltage is applied to said electrodes in a head and an end of all said piezoelectric elements arranged in turn. Suppose that said piezoelectric element is elongated in the direction of a plane of said plate and said thin film, polarization is carried out in the thickness direction of said plate and said thin film. A surface electrode and a back electrode are pasted up on said surface and said back of said piezoelectric element, or said electrodes are deposited. By using conductive polimer, in particular, not only friction coefficient of said piezoelectric element becomes large, but also said surface electrode and said back electrode can pass electricity easily even though said piezoelectric element was curved. Form of said foundation may be not only like a line and a polygonal line but also like a curve. In attaching said piezoelectric elements to said foundation, first, extension directions of all said piezoelectric elements are arranged. Next, all said piezoelectric elements are arranged along said foundation as said end of each said piezoelectric element crossing said extension direction touches said foundation. Next, all said piezoelectric elements overlap in turn. Finally, said end of each said piezoelectric element is fixed on said foundation by adhesives, pins and so on. Suppose that said piezoelectric elements overlap, said surface electrode and said back electrode of each said piezoelectric element touch said surface electrode and said back electrode of the adjacent said piezoelectric elements, respectively. Suppose therefore that said voltage is applied to said surface electrode in said head and said back electrode in said end, all said piezoelectric elements are elongated and shrinked in the said extension direction, and then generate stress. Similarly, suppose that said voltage is applied to said back electrode in said head and said surface electrode in said end, all said piezoelectric elements are elongated and shrinked in the said extension direction, and then generate stress. The present invention thus can apply friction power to an object touching said piezoelectric elements. Suppose that a saw-tooth wave is used as said voltage, stresses of said piezoelectric element in extending and constracting are different. The present invention therefore can move said object by the difference of said friction powers. Since the present invention can generate said big stress of said piezoelectric element even though piezoelectric charge coefficient of said piezoelectric element is small, and it operates in a single phase, many problems on a piezoelectric actuator are solved very well.

The invention described in claim 2 is an overlapping type piezoelectric stator comprising a plurality of piezoelectric elements and a foundation, wherein each said piezoelectric element is formed in a thin film; a surface and a back of each said piezoelectric element are equipped with an electrode, respectively; and each said piezoelectric element is folded up in a right-angled direction to extension direction; wherein, in each of all said piezoelectric elements folded up, predetermined parts of both sides are insulated by insulators, wherein, in attaching all said piezoelectric elements to said foundation, all said piezoelectric elements are arranged along said foundation in turn; all said piezoelectric elements are overlapping; at least one of said electrodes on both sides of each said piezoelectric element touches said electrode of an adjacent said piezoelectric element; and an end of each said piezoelectric element is fixed to said foundation; wherein voltage is applied to said electrodes of at least one of all said piezoelectric elements arranged in turn. Suppose that said piezoelectric element is elongated in the direction of a plane of said thin film, polarization is carried out in the thickness direction of said thin film. A surface electrode and a back electrode are pasted up on said surface and said back of said piezoelectric element, or said electrodes are deposited. By using conductive polimer, in particular, not only friction coefficient of said piezoelectric element becomes large, but also said surface electrode and said back electrode can pass electricity easily even though said piezoelectric element was curved. Said thin film of said piezoelectric element is folded up in the said right-angled direction to the said extension direction as it becomes sigmoid. Insulated paint and insulated materials are used as said insulator, and in parallel to the said extension direction, said insulated paint is applied to said predetermined parts in said both sides of said piezoelectric element folded up, or said insulated materials are attached to it. Therefore, when said piezoelectric elements folded up overlap, said insulated paint and said insulated materials can prevent making a short circuit between said surface electrode and said back electrode of said piezoelectric element. Form of said foundation may be not only like a line and a polygonal line but also like a curve. In attaching said piezoelectric elements to said foundation, first, extension directions of all said piezoelectric elements are arranged. Next, all said piezoelectric elements are arranged along said foundation as said end of each said piezoelectric element crossing said extension direction touches said foundation. Next, all said piezoelectric elements overlap in turn. Finally, said end of each said piezoelectric element is fixed on said foundation by adhesives, pins and so on. Suppose that said piezoelectric elements overlap, said surface electrodes and said back electrodes of two adjacent said piezoelectric elements touch the same side, respectively. Suppose therefore that said voltage is applied to said surface electrode and said back electrode of any said piezoelectric element, all said piezoelectric elements are elongated and shrinked in the said extension direction, and then generate stress. Of course, even though said voltage is applied to said surface electrode of one of said piezoelectric elements and said back electrode of another said piezoelectric element, all said piezoelectric elements are elongated and shrinked in the said extension direction, and then generate stress. The present invention thus can apply friction power to an object touching said piezoelectric elements. Suppose that a saw-tooth wave is used as said voltage, stresses of said piezoelectric element in extending and constracting are different. The present invention therefore can move said object by the difference of said friction powers. Since the present invention can generate said big stress of said piezoelectric element even though piezoelectric charge coefficient of said piezoelectric element is small, and it operates in a single phase, many problems on a piezoelectric actuator are solved very well.

The invention described in claim 3 is an overlapping type piezoelectric stator comprising a plurality of piezoelectric elements and a foundation, wherein each said piezoelectric element is formed in a thin film; and a surface and a back of each said piezoelectric element are equipped with an electrode, respectively; wherein, in each of all said piezoelectric elements folded up, predetermined parts of both sides are insulated by insulators; a part of said electrode on said back and a part of said electrode on said surface are covered by at least one tunica electrode; and a part of said electrode on said back and a part of said surface are covered by at least one said tunica electrode; wherein, in attaching all said piezoelectric elements to said foundation, all said piezoelectric elements are arranged along said foundation in turn; all said piezoelectric elements are overlapping; at least one of said electrodes on both sides of each said piezoelectric element touches said electrode of an adjacent said piezoelectric element via a plurality of said tunica electrodes; and an end of each said piezoelectric element is fixed to said foundation; wherein voltage is applied to said electrodes of at least one of all said piezoelectric elements arranged in turn. Suppose that said piezoelectric element is elongated in the direction of a plane of said thin film, polarization is carried out in the thickness direction of said thin film. A surface electrode and a back electrode are pasted up on said surface and said back of said piezoelectric element, or said electrodes are deposited. By using conductive polimer, in particular, not only friction coefficient of said piezoelectric element becomes large, but also said surface electrode and said back electrode can pass electricity easily even though said piezoelectric element was curved. Insulated paint and insulated materials are used as said insulator, and said insulated paint is applied to said part in said both sides of said piezoelectric element or said insulated materials are attached to it. Therefore, at least one said tunica electrode can prevent making a short circuit between said surface electrode and said back electrode of said piezoelectric element. At least one said tunica electrode is stuck to said surface electrode by pressure, or pasted up to said surface electrode by conductive adhesives. Moreover, it is stuck to said back electrode insulated, or pasted up to said back electrode by adhesives. Similarly, at least one said tunica electrode is stuck to said back electrode by pressure, or pasted up to said back electrode by conductive adhesives. Moreover, it is stuck to said surface electrode insulated, or pasted up to said surface electrode by adhesives. Form of said foundation may be not only like a line and a polygonal line but also like a curve. In attaching said piezoelectric elements to said foundation, first, extension directions of all said piezoelectric elements are arranged. Next, all said piezoelectric elements are arranged along said foundation as said end of each said piezoelectric element crossing said extension direction touches said foundation. Next, all said piezoelectric elements overlap in turn. Finally, said end of each said piezoelectric element is fixed on said foundation by adhesives, pins and so on. Suppose that said piezoelectric elements overlap, said surface electrodes and said back electrodes of two adjacent said piezoelectric elements touch the same side, respectively, via a plurality of said tunica electrodes. Suppose therefore that said voltage is applied to said surface electrode and said back electrode of any said piezoelectric element, all said piezoelectric elements are elongated and shrinked in the said extension direction, and then generate stress. Of course, even though said voltage is applied to said surface electrode of one of said piezoelectric elements and said back electrode of another said piezoelectric element, all said piezoelectric elements are elongated and shrinked in the said extension direction, and then generate stress. The present invention thus can apply friction power to an object touching said piezoelectric elements. Suppose that a saw-tooth wave is used as said voltage, stresses of said piezoelectric element in extending and constracting are different. The present invention therefore can move said object by the difference of said friction powers. Since the present invention can generate said big stress of said piezoelectric element even though piezoelectric charge coefficient of said piezoelectric element is small, and it operates in a single phase, many problems on a piezoelectric actuator are solved very well.

The invention described in claim 4 is an overlapping type piezoelectric stator according to any one of claim 1, 2 or 3, wherein, for each of a plurality of said piezoelectric elements, resistance is reduced by connecting said surface electrode, said back electrode and said tunica electrode of said piezoelectric element with said back electrode, said surface electrode and said tunica electrode of adjacent said piezoelectric elements, respectively, via at least one lead or at least one conductive sponge. In the present invention, said lead and said conductive sponge are pasted up or stuck by pressure to said surface electrodes, said back electrodes and said tunica electrodes of the adjacent said piezoelectric elements each other, respectively. Since at least one said lead and at least one said conductive sponge can be transformed easily, a plurality of said piezoelectric elements are not transformed even though said foundation was transformed. Since the present invention can make said resistance between said surface electrode and said back electrode of the adjacent said piezoelectric elements smaller than contact resistance, many problems on a piezoelectric actuator are solved very well.

The invention described in claim 5 is an overlapping type piezoelectric stator according to claim 4, wherein said foundation can be transformed. In the present invention, said foundation can be transformed in the shape of a line, a polygonal line and a curve like a curved rule. Since a crevice between said surface electrode and said back electrode of the adjacent said piezoelectric elements is not fixed, a plurality of said piezoelectric elements do not bend and break. Since the present invention can make said foundation transform according to applications, many problems on a piezoelectric actuator are solved very well.

The invention described in claim 6 is an overlapping type piezoelectric stator according to claim 1, 4 or 5, wherein all said piezoelectric elements are arranged circularly; a spacer is inserted between said electrodes in said head and said end of said piezoelectric elements of said overlapping type piezoelectric stator; two sides of said spacer touching said electrode in said head and said electrode in said end are equipped with electrodes, respectively; and said voltage is applied to said electrode in said head and said electrode in said end, via two said electrodes of said spacer. Said piezoelectric elements are arranged circularly, and a circular rotor and a spherical rotor, which are a slider, touch said piezoelectric elements. Said spacer consists of insulators, and it is put between said electrodes for said spacer. A saw-tooth wave, which is said voltage, is applied to said piezoelectric elements via two said electrodes of said spacer. Since the present invention can rotate said circular rotor and said spherical rotor, many problems on a piezoelectric motor are solved very well.

The invention described in claim 7 is an overlapping type piezoelectric stator according to any one of claims 2 to 5, wherein all said piezoelectric elements are arranged circularly. Said piezoelectric elements are arranged circularly, and a circular rotor and a spherical rotor, which are a slider, touch said piezoelectric elements. A saw-tooth wave, which is said voltage, is applied to all said piezoelectric elements via two said electrodes of at least one said piezoelectric element. Since the present invention can rotate said circular rotor and said spherical rotor, many problems on a piezoelectric motor are solved very well.

The invention described in claim 8 is an overlapping type piezoelectric stator according to any one of claims 1 to 7, wherein at least one of said electrodes of at least one said piezoelectric element has skid at an end opposite to said end fixed on said foundation. The present invention can make friction power to an object touching said surface electrodes and said back electrodes of said piezoelectric elements large, by pasting up said skid whose friction coefficient is large to said opposite ends of said surface electrodes and said back electrodes of said piezoelectric elements. Section of said skid is a polygon or a half-ellipse. In addition, said skid is pasted up to a part of said surface electrodes and said back electrodes of said piezoelectric elements, which touches said object, as it becomes right-angled to the extension direction of said piezoelectric element. Since the present invention can generate large friction power even though friction coefficient of said surface electrode and said back electrode of said piezoelectric element is small, many problems on materials of said surface electrode and said back electrode are solved very well.

The invention described in claim 9 is an overlapping type piezoelectric stator according to any one of claims 1 to 7, wherein, in each said electrode of said piezoelectric elements, a ceiling plate is attached to an end opposite to said end fixed on said foundation. The present invention can change friction coefficient between said surface electrode and said back electrode of said piezoelectric element and an object, by pasting up said ceiling plate to said opposite end of said surface electrodes and said back electrodes of said piezoelectric elements. Moreover, it can protect that said object enters a crevice between said piezoelectric element and the adjacent said piezoelectric element. Said ceiling plate is an insulator like a plastic or metal by which the leather film was carried out. Said ceiling plate is even or bent. When said ceiling plate is folded up, in particular, an area at which said ceiling plate touches to said object is small. Friction power applied to said object therefore becomes small. Furthermore, even though said foundation is formed like said polygonal line and said curve, said ceiling plate does not bend. Since the present invention can prevent wear of said surface electrode and said back electrode of said piezoelectric element, many problems on materials of said surface electrode and said back electrode are solved very well.

The invention described in claim 10 is an overlapping type piezoelectric stator according to any one of claims 1 to 9, wherein, even in a case that said foundation is curved, a plurality of said piezoelectric elements are pressed down by at least one guide rail arranged along said extension direction, by fixing both sides of said guide rail on said foundation by attachment of said guide rail. Said guide rail is made from a plate and a bar made by soft insulators like a plastic or metal by which the leather film was carried out. Since said both ends of said guide rail are fixed on said foundation by said attachment for said guide rail, said guide rail presses down said piezoelectric elements to said foundation, by curving said guide rail together. Therefore, a surface electrode and a back electrode of said piezoelectric element can make contact resistance between said back electrode and said surface electrode of the adjacent piezoelectric elements small, respectively. Of course, in a case that said piezoelectric element is folded up, or that said piezoelectric element is covered by said tunica electrode, a surface electrode and a back electrode of said piezoelectric element can make contact resistance between said surface electrode and said back electrode of the adjacent piezoelectric elements small, respectively. Moreover, said guide rail can prevent that said open ends of said piezoelectric elements separate from said foundation because said foundation curves. Since said overlapping type piezoelectric stator can move a curved slider in the present invention, many problems on form of said slider are solved very well.

The invention described in claim 11 is a multi-degree-of-freedom overlapping type piezoelectric stator comprising: a first overlapping type piezoelectric stator according to any one of claims 6 to 10, all of whose said piezoelectric elements are arranged circularly; and a plurality of second overlapping type piezoelectric stators according to at least one of claims 1 to 5, 8 to 10, all of whose said piezoelectric elements are arranged linearly; wherein first said overlapping type piezoelectric stator and second said overlapping type piezoelectric stators are arranged on a plane, second said overlapping type piezoelectric stators surround first said overlapping type piezoelectric stator; first said overlapping type piezoelectric stator and all of second said overlapping type piezoelectric stators operate independently. On said plane, suppose that second said overlapping type piezoelectric stator like a line is arranged as forming a square in top view of said plane around first said overlapping type piezoelectric stator like a circle. The present invention can move an object vertically and horizontally, and rotate said object. Since the present invention can realize a multi-degree-of-freedom overlapping type piezoelectric actuator with easy structure, and moreover said multi-degree-of-freedom overlapping type piezoelectric actuator is controlled very simply, many problems on said multi-degree-of-freedom overlapping type piezoelectric actuator are solved very well.

The invention described in claim 12 is a multi-degree-of-freedom overlapping type piezoelectric stator according to claim 11, wherein a convex and a concave are used instead of said plane. On said concave or said convex whose curvature is constant, suppose that second said overlapping type piezoelectric stator like an arc is arranged as forming a square in top view of said concave and said convex around first said overlapping type piezoelectric stator like a circle. The present invention can rotate said object whose contact area touches said concave and said convex on three axes. In addition, suppose that at least one point of said contact area of said object touches at least one said piezoelectric element. Said object can be moved in any direction, even though curvature of said concave or said convex is not constant. Since the present invention can realize a multi-degree-of-freedom overlapping type piezoelectric actuator with easy structure, and moreover said multi-degree-of-freedom overlapping type piezoelectric actuator is controlled very simply, many problems on said multi-degree-of-freedom overlapping type piezoelectric actuator are solved very well.

The invention described in claim 13 is an overlapping type piezoelectric actuator comprising at least one overlapping type piezoelectric stator or multi-degree-of-freedom overlapping type piezoelectric stator according to any one of claims 1 to 12, and at least one drive device, wherein a slider touching said piezoelectric elements of said overlapping type piezoelectric stator moves, by said drive device's generating a saw-tooth wave as said voltage. Suppose that said drive device applies said saw-tooth wave to said piezoelectric element, said piezoelectric element generates different stresses during being elongated and shrinked. That is, in a case that said piezoelectric element is elongated and shrinked, friction powers that said piezoelectric element applies to said slider are also different. The present invention can move said slider because of difference of said friction powers. Of course, suppose that said piezoelectric elements apply said friction powers whose directions are opposite each other to at least two points of said slider, said slider can also rotate. In a case that said slider which is like a circle rotates on only one axis, said slider becomes a circular rotor. Since said piezoelectric element overlaps in the present invention, length of an overlapped part is appended to length of said piezoelectric element in the extension direction. Therefore, since the present invention can generate big said stress of said piezoelectric element even though piezoelectric charge coefficient of said piezoelectric element is small, and operate with a single phase, many problems on a piezoelectric actuator are solved very well.

The invention described in claim 14 is an overlapping type piezoelectric actuator according to claim 13, wherein a contact surface of said slider touching said piezoelectric elements of said overlapping type piezoelectric stator is trenched, or projections are attached to said contact surface. The present invention can make friction power applied to said contact area large, by trenching in the shape of a V charactor at said contact area of said slider or attaching polygonal projections to it. Since the present invention can generate large said friction power even though friction coefficients of said surface electrode and said back electrode of said piezoelectric element are small, many problems on materials of said surface electrode and said back electrode are solved very well.

The invention described in claim 15 is an overlapping type piezoelectric actuator comprising a plurality of overlapping type piezoelectric stators according to any one of claims 6 to 10, and a plurality of drive devices, wherein all said overlapping type piezoelectric stators surround said spherical rotor; and said drive devices generate a saw-tooth wave as said voltage, wherein said spherical rotor touching said piezoelectric elements of said overlapping type piezoelectric stators rotates with multi degrees of freedom. Suppose that said spherical rotor is put between two opposite said overlapping type piezoelectric stators, said spherical rotor can rotate on an axis. Suppose that said spherical rotor is surrounded by four said overlapping type piezoelectric stators in the shape of a squre, said spherical rotor can rotate on two axes. Suppose that said spherical rotor is put between six said overlapping type piezoelectric stators, intersecting from three directions perpendicularly, said spherical rotor can rotate on three axes. Suppose that said spherical rotor is surrounded by three said overlapping type piezoelectric stators in the shape of a triangle, said spherical rotor can rotate on three axes. Since the present invention can realize a multi-degree-of-freedom motor with easy structure, many problems on said multi-degree-of-freedom motor are solved very well.

The invention described in claim 16 is an overlapping type piezoelectric actuator drive method for an overlapping type piezoelectric actuator according to claim 13 or 14, wherein one said drive device applies same said voltage to all said overlapping type piezoelectric stators. Said overlapping type piezoelectric stators are prepared in the present invention. Since said drive device applies the same said saw-tooth wave to all said overlapping type piezoelectric stators, all said piezoelectric elements generate stresses simultaneously. Since the present invention can apply large friction power to said slider, by adding together said stresses generated by all said piezoelectric elements, many problems on said friction power of said overlapping type stator are solved very well.

The invention described in claim 17 is an overlapping type piezoelectric actuator drive method for an overlapping type piezoelectric actuator according to claim 13 or 14, wherein all said overlapping type piezoelectric stators are classified into a same number of sets as a number of said drive devices; each said drive device generates one of said voltages whose phases are different each other; each said drive device applies said voltage to one of said sets of said overlapping type piezoelectric stators which are different each other. Said overlapping type piezoelectric stators are prepared in the present invention. Suppose that each said drive device generates a saw-tooth wave, and phases of these said saw-tooth waves have shifted at a fixed rate, all said overlapping type piezoelectric stators generate said stress in turn without pausing. Since the present invention can apply uniformly and effectively friction power to said slider touching said piezoelectric elements, many problems on said friction power of said overlapping type stator are solved very well.

The invention described in claim 18 is an overlapping type piezoelectric actuator drive method for an overlapping type piezoelectric actuator according to claim 13 or 14, wherein at least one said drive device applies said voltage to at least one set of said overlapping type piezoelectric stators by classifying all said overlapping type piezoelectric stators into a plurality of sets; attaching a switch to each of all said drive devices; and selecting at least one set of said overlapping type piezoelectric stators by said switch. Said overlapping type piezoelectric stators are prepared in the present invention. Moreover, said switches whose number is the same as the number of said drive devices are prepared in the present invention, and they are connected one to one. Suppose that said drive devices generate said saw-tooth waves, and these said saw-tooth waves are applied to at least one set of said overlapping type piezoelectric stators by said switches, the present invention can apply friction power to only a part of said slider touching said piezoelectric elements. In addition, the present invention can apply said saw-tooth waves to only said piezoelectric elements touching said slider. The present invention therefore can reduce electric power consumed by said overlapping type piezoelectric stator. Thus, many problems on said friction power and said electric power of said overlapping type stator are solved very well.

The invention described in claim 19 is an overlapping type piezoelectric actuator according to claim 13 or 14, wherein said piezoelectric elements of at least two said overlapping type piezoelectric stators overlap in a same direction. Said overlapping type piezoelectric stators are prepared in the present invention. Suppose that all said piezoelectric elements of at least two said overlapping type piezoelectric stators are arranged in the same said direction of their overlapping, the present invention can arrange the direction of stresses generated by said piezoelectric elements. Since the present invention can apply large friction power to said slider, by uniting directions of said stresses generated by said piezoelectric elements, many problems on said friction power of said overlapping type stator are solved very well.

The invention described in claim 20 is an overlapping type piezoelectric actuator according to claim 13 or 14, wherein said piezoelectric elements of at least two said overlapping type piezoelectric stators overlap in an opposite direction. Said overlapping type piezoelectric stators are prepared in the present invention. Suppose that all said piezoelectric elements of at least two said overlapping type piezoelectric stators are arranged in said directions of their overlapping opposite each other, the present invention can arrange stresses generated by said piezoelectric elements in two said directions of their overlapping. Since the present invention can apply uniform friction power to said slider, in spite of said directions of said stresses generated by said piezoelectric elements, many problems on said friction power of said overlapping type stator are solved very well.

The invention described in claim 21 is an overlapping type piezoelectric actuator according to claim 13 or 14 comprising two said overlapping type piezoelectric stators, and one or two said drive devices, wherein said slider moves between said piezoelectric elements of two said overlapping type piezoelectric stators, by arranging said piezoelectric elements of two said overlapping type piezoelectric stators face to face. In the present invention, suppose that said slider is put between two said overlapping type piezoelectric stators, said slider receives friction power from said piezoelectric elements of these two said overlapping type piezoelectric stators. Moreover, said piezoelectric elements can apply easily said friction power to said slider. Of course, it is similar even though said slider is a circular rotor. Said extension directions of said piezoelectric elements of two said overlapping type piezoelectric stators may be the same, opposite or make any angle. In a case that said extension directions of said piezoelectric elements of two said overlapping type piezoelectric stators are the same, suppose that these said piezoelectric elements of said overlapping type piezoelectric stators input the same said saw-tooth wave from said drive device. Said slider receives said friction power in the same direction from these said piezoelectric elements of said overlapping type piezoelectric stators. In a case that said extension directions of said piezoelectric elements of two said overlapping type piezoelectric stators are opposite each other, suppose that said piezoelectric elements of these said overlapping type piezoelectric stators input the opposite said saw-tooth waves, which are positive and negative, from said drive device. Said slider receives said friction power in the same direction from these said piezoelectric elements of said overlapping type piezoelectric stators. Here, said extension directions of said piezoelectric elements of these said overlapping type piezoelectric stators are opposite each other. If performance of these said overlapping type piezoelectric stators is the same, said slider can move uniformly in any direction. In a case that said extension directions of said piezoelectric elements of two said overlapping type piezoelectric stators make a right angle, suppose that said piezoelectric elements of these said overlapping type piezoelectric stators input two different said saw-tooth waves from two said drive device, respectively. Said slider can move horizontally in any direction, between these said piezoelectric elements of said overlapping type piezoelectric stators. In the present invention, since said slider receives said friction power from said piezoelectric elements of two said overlapping type piezoelectric stators, said slider can move smoothly. Thus, many problems on movement of said slider are solved very well.

DETAILED DESCRIPTION

It is described below about some enforcement forms of an overlapping type piezoelectric actuator using a stator 11 in this invention. With reference to the drawings, then, I explain the enforcement forms.

Figure 1:
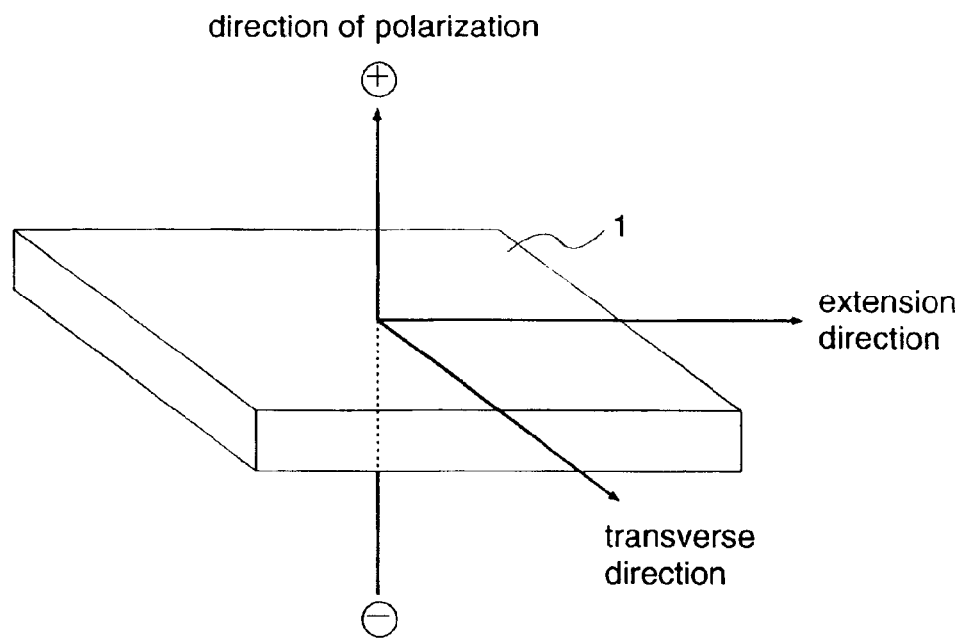
FIG. 1 is an explanation view for a piezoelectric element extended in one axis.

First, as shown in FIG. 1, the polarization of a piezoelectric element 1 formed in the plate or the thin film is carried out in the direction of polarization (refer to an arrow in FIG. 1), by extending it in the extension direction, along one axis. Since the piezoelectric element 1 extended along one axis is anisotropic, the piezoelectric element 1 is elongated in the extension direction and seldom elongated in the transverse direction when an electric field is applied to it in the direction opposite to its direction of polarization. In order to apply the electric field to the piezoelectric element 1, the piezoelectric element 1 must have two electrodes in its both sides. When the piezoelectric element 1 is a piezoelectric ceramic like PZT (Lead Zirconate Titanate), metal can be stuck by adhesives 5. On the other hand, when the piezoelectric element 1 is a piezoelectric polymer like PVDF (Polyvinylidene Fluoride Plastics), metal like aluminum and nickel can be deposited (for example, KF Piezofilm made by Kureha Chemical Industry Co., Ltd.).

Figure 2:
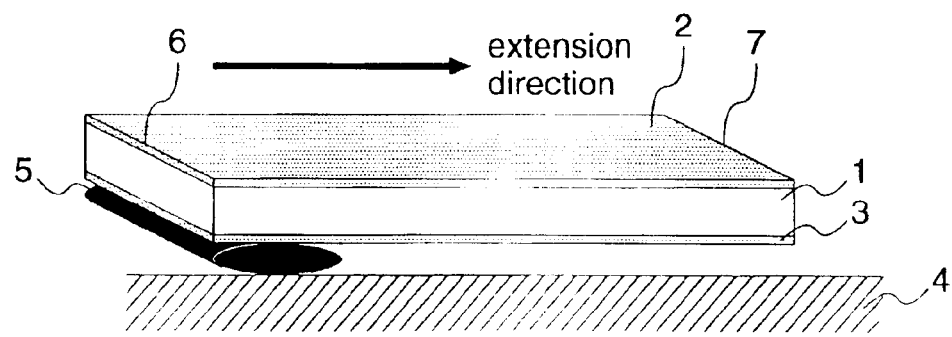
FIG. 2 is an explanation view in a case that a piezoelectric element put between two electrodes is fixed by adhesives on a foundation.

Next, in a case that a fixed end 6 of a piezoelectric element 1 is fixed by adhesives 5 on a foundation 4, as shown in FIG. 2, an open end 7 facing with the fixed end 6 is elongated and shrinked in the extension direction if voltage is applied to its surface electrode 2 and back electrode 3. Therefore, the open end 7 can generate stress proportional to expansion and contraction.

Figure 3:
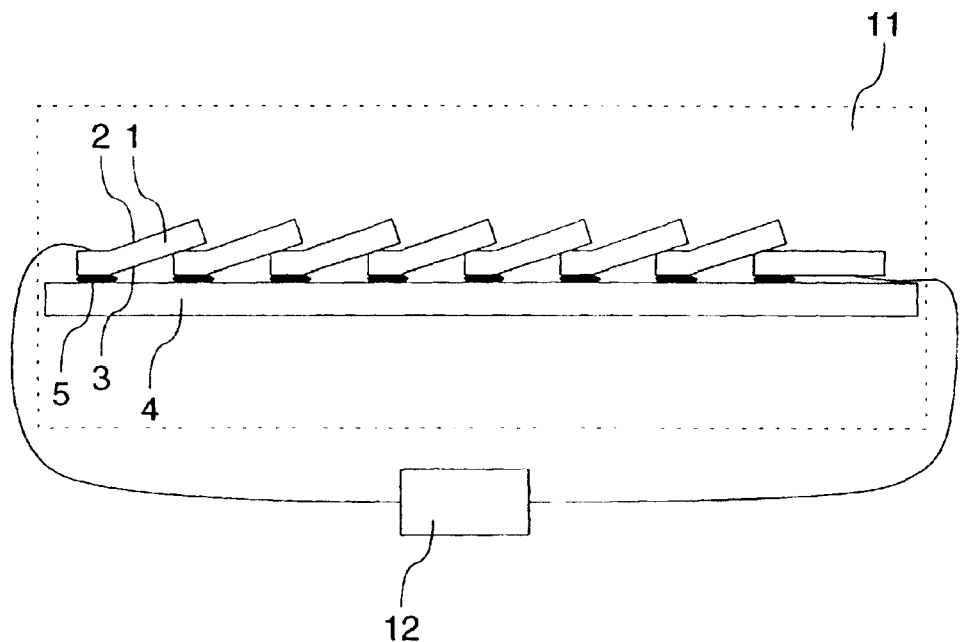
FIG. 3 is an explanation view for a stator which has some piezoelectric elements turning to the same direction are arranged on a foundation as they overlap.

As shown in FIG. 3, then, suppose that some piezoelectric elements 1 overlap on a foundation 4 as domino effect, the invention described in claim 1 is a stator 11 possible to generate a large force in the direction in which the piezoelectric elements 1 overlap. Note that, in this invention, this stator 11 is called an overlapping type piezoelectric stator, because these piezoelectric elements 1 overlap on the foundation 4 as domino effect. The form of the foundation 4 is not always linear, and may be arbitrary curves. A surface electrode 2 and a back electrode 3 of two adjacent piezoelectric elements 1 touch each other because of weight of the piezoelectric elements 1 and adhesive strength of adhesives 5. If a drive device 12, therefore, applies voltage to a surface electrode 2 of the head of piezoelectrode elements 1 and a back electrode 3 of the end of piezoelectrode elements 1, electric fields in the same direction are applied to all piezoelectric elements 1 of the stator 11.

Figure 4:
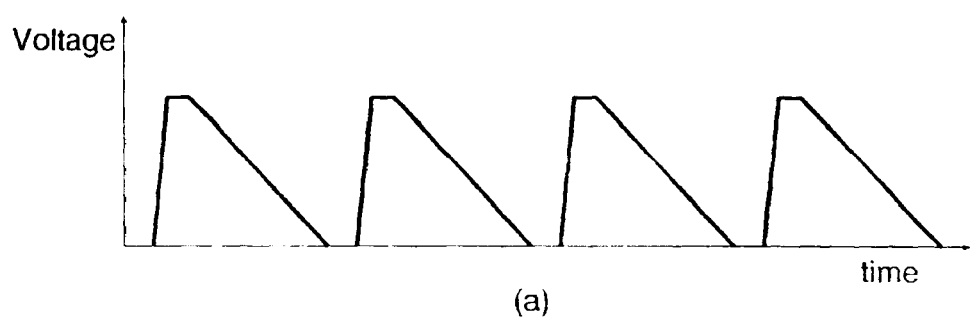
FIG. 4 is an explanation view for two saw-tooth waves generated by a drive device.
Figure 4:
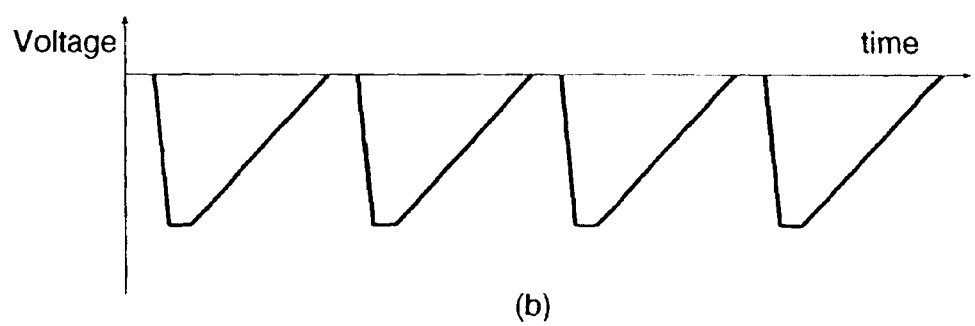

Now, a drive device 12 generates a saw-tooth wave like FIG. 4, where an analog circuit generating the saw-tooth wave is well-known. It is described here about operation of a stator 11 in a case that the drive device 12 generates the saw-tooth wave like FIG. 4(*a*), referring to FIG. 5.

Figure 5:
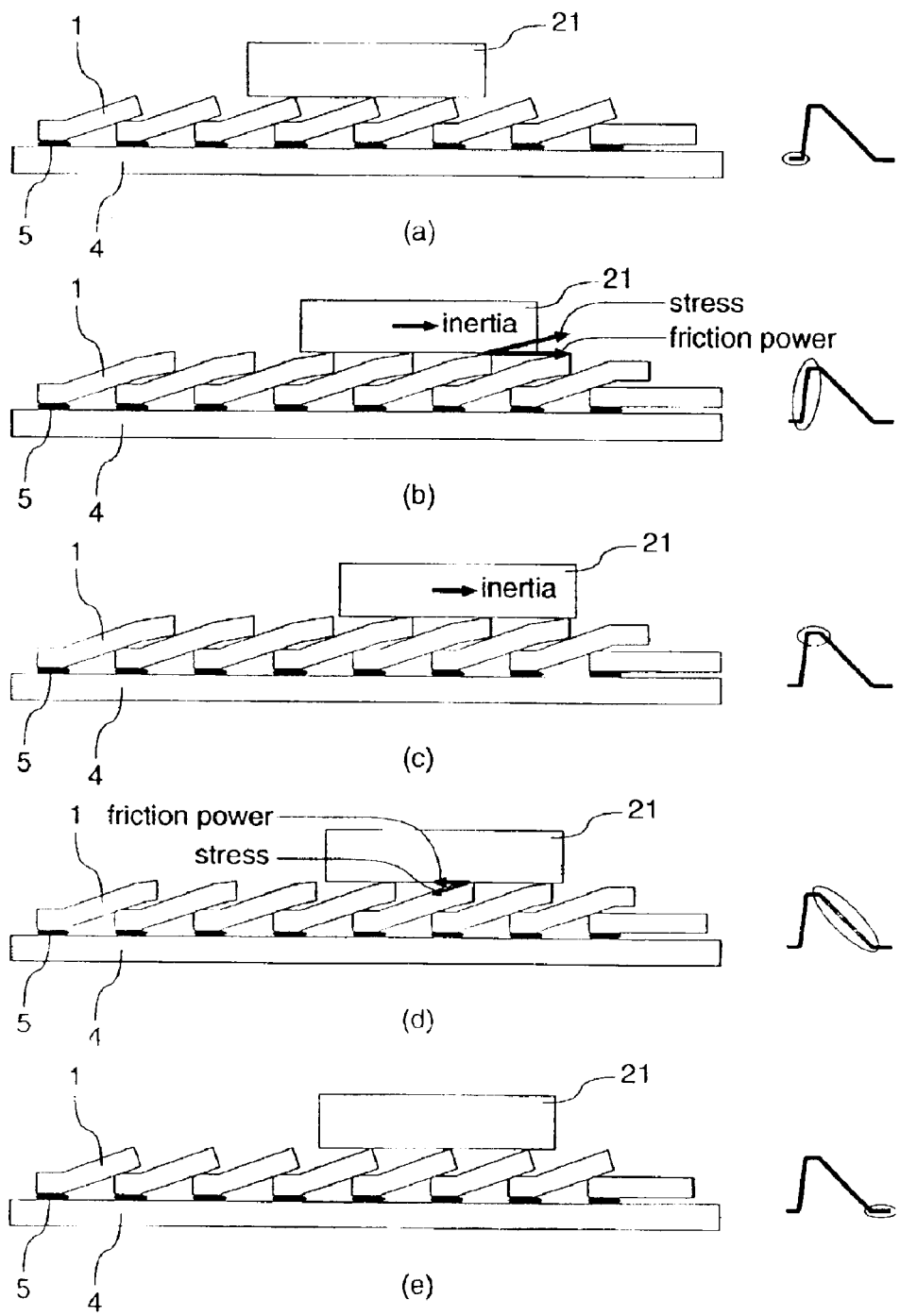
FIG. 5 is an explanation view in a case that a stator moves an object to right-hand side.

As shown in FIG. 5(*a*), a slider 21 has stopped when the drive device 12 does not apply voltage to the stator 11. Note that the slider 21 is held by friction power between a surface electrode 2 and itself.

As shown in FIG. 5(*b*), suppose that the drive device 12 raises voltage rapidly. Since the piezoelectric elements 1 are also elongated in the extension direction rapidly, big stress is generated by their open ends 7. After the slider 21 is flipped off by the friction power between the surface electrode 2 and itself, the slider 21 moves in the extension direction, according to inertia.

As shown in FIG. 5(*c*), the slider 21 moves in the extension direction, according to inertia even though variance of voltage of the drive device 12 once stops.

As shown in FIG. 5(*d*), suppose that the drive device 12 lowers voltage gradually. Since the piezoelectric elements 1 are also shrinked in the extension direction gradually, only small stress is generated by their open ends 7. The slider 21, therefore, is pulled back slightly by the friction power between the surface electrode 2 and itself.

As shown in FIG. 5(*e*), when voltage of the drive device 12 returns again, length of the piezoelectric element 1 also returns, and then the slider 21 stops.

FIG. 5 shows the operation of the stator 11 in a case that the drive device 12 generates the saw-tooth wave in FIG. 4(*a*), but the slider 21 moves in the opposite direction when the drive device 12 generates a saw-tooth wave in FIG. 4(*b*). Moreover, suppose that the stator 11 is made into vertical contrary. When the ground, instead of the slider 21, touches the surface electrode 2, the stator 11 can be moved in the direction opposite to the friction power.

Figure 6:
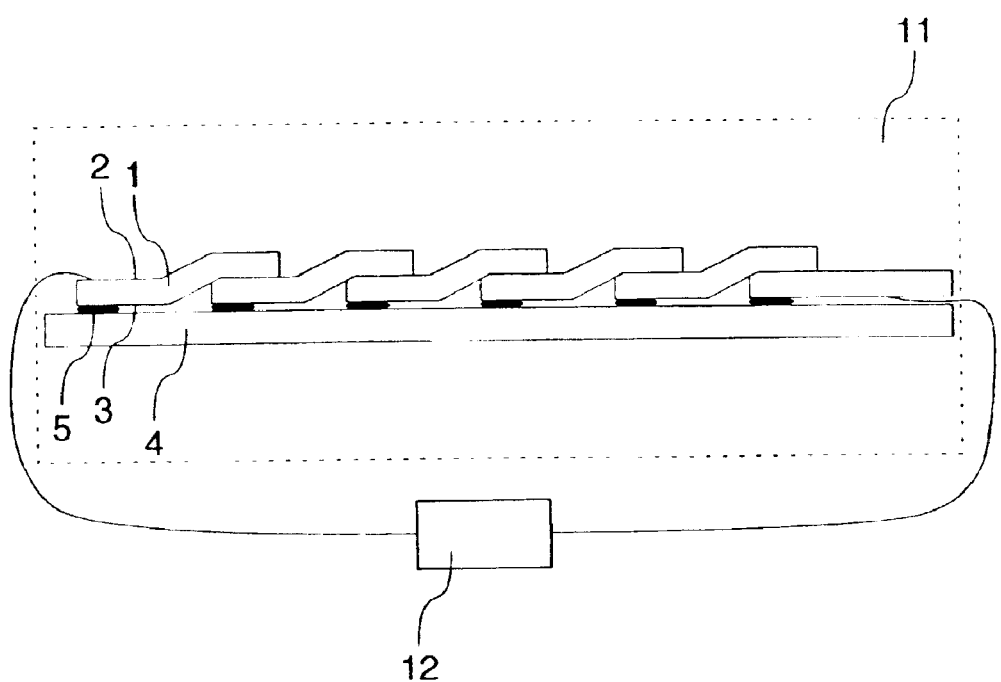
FIG. 6 is an explanation view for a stator which has some piezoelectric elements turning to the same direction are arranged on a foundation as their surface electrodes are overlapped horizontally.
Figure 7:
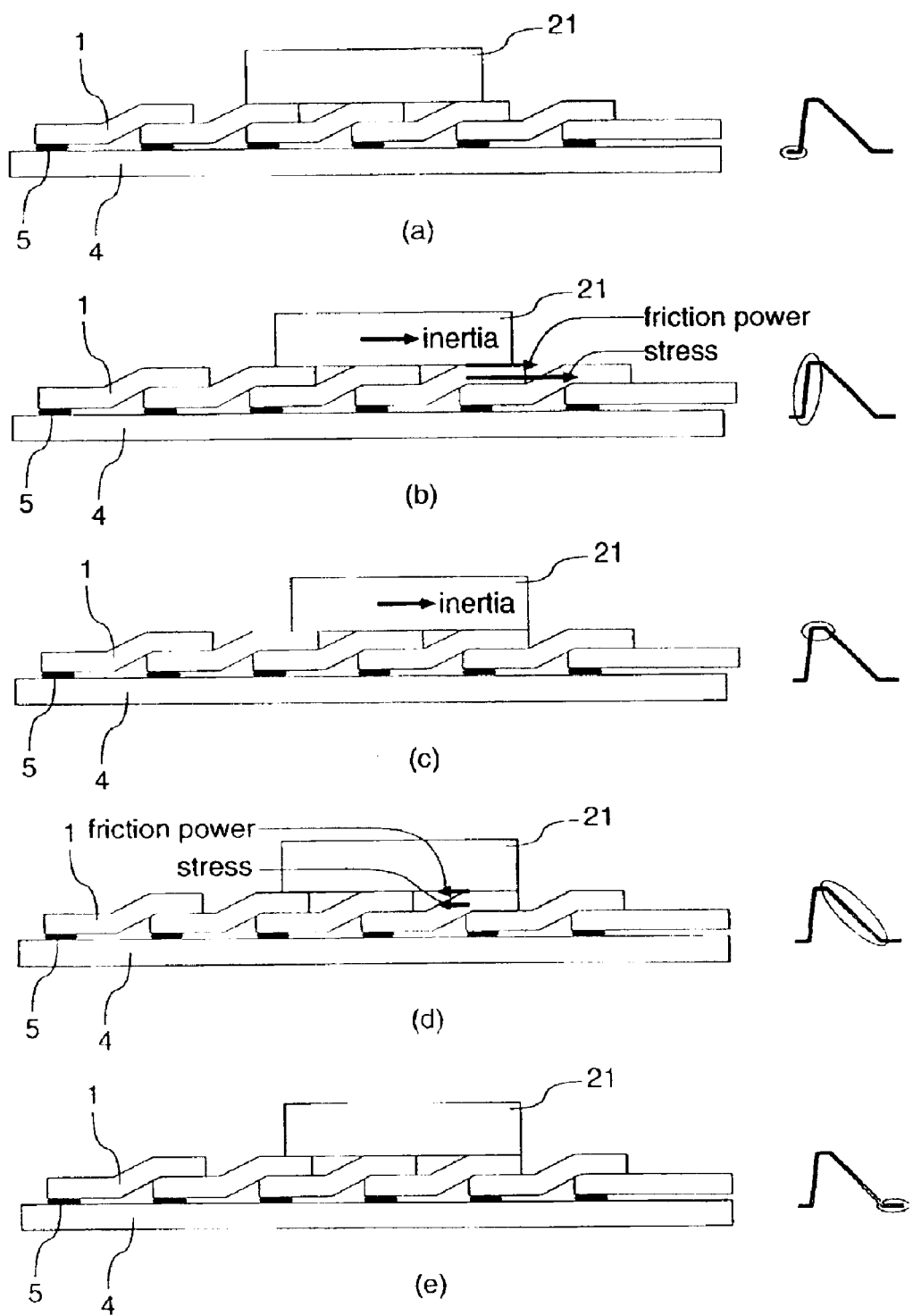
FIG. 7 is an explanation view in a case that a friction coefficient between a surface electrode of a piezoelectric element and a slider is large.

By the way, Suppose that the piezoelectric element 1 shown in FIG. 3 is cut along the extension direction as its length becomes longer than FIG. 3. As shown in FIG. 6, a surface electrode 2 and a back electrode 3 of two adjacent piezoelectric elements 1 touch each other widely. In this case, as shown in FIG. 7(*a*) to FIG. 7(*e*), a stator 11 can move a slider 21, similarly to FIG. 5. However, when dynamic friction coefficient between the surface electrode 2 of the piezoelectric element 1 and the slider 21 is large, inertia of the slider 21 is more denied by the friction power between the surface electrode 2 and itself, as a contact area between the surface electrode 2 and the slider 21 becomes large. Therefore, the stator 11 can not move the slider 21 as shown in FIG. 7(*a*) to FIG. 7(*e*). On the other hand, in a case that the dynamic friction coefficient between the surface electrode 2 and the slider 21 is small enough, the piezoelectric element 1 can apply friction power, which is represented by the difference of dynamic friction coefficienct and static friction coefficient between the surface electrode 2 and the slider 21, to the slider 21, where the drive device 12 must elongate and shrink the piezoelectric element 1 rapidly, by making frequency of a saw-tooth wave high. It is described here about operation of the stator 11 in a case that the drive device 12 generates the saw-tooth wave shown in FIG. 4(*a*), referring to FIG. 8.

Figure 8:
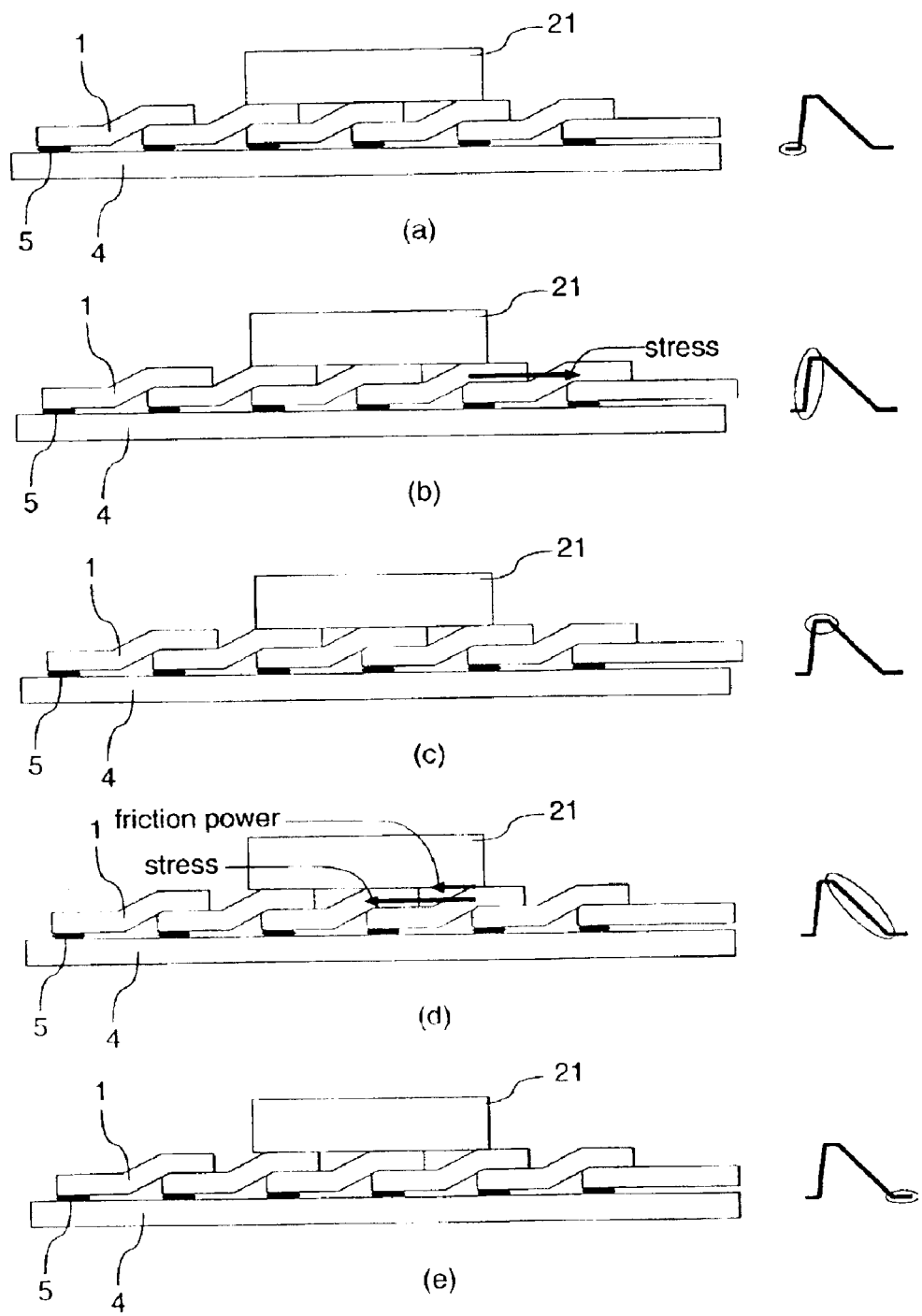
FIG. 8 is an explanation view in a case that a friction coefficient between a surface electrode of a piezoelectric element and a slider is small.

As shown in FIG. 8(*a*), a slider 21 has stopped when the drive device 12 does not apply voltage to the stator 11. Note that the slider 21 is held by friction power between a surface electrode 2 and itself.

As shown in FIG. 8(*b*), suppose that the drive device 12 raises voltage rapidly. Since the piezoelectric elements 1 are also elongated in the extension direction rapidly, big stress is generated by their open ends 7. Since dynamic friction coefficient between the slider 21 and the surface electrode 2 is small enough, the slider 21 slides on the surface electrode 2. That is, the slider 21 has been stopped by inertia.

As shown in FIG. 8(*c*), the slider 21 has been stood still, according to inertia even though variance of voltage of the drive device 12 once stops.

As shown in FIG. 8(*d*), suppose that the drive device 12 lowers voltage gradually. Since the piezoelectric elements 1 are also shrinked in the extension direction gradually, only small stress is generated by their open ends 7. The slider 21, therefore, is pulled back slightly by the friction power between the surface electrode 2 and itself.

As shown in FIG. 8(*e*), when voltage of the drive device 12 returns again, length of the piezoelectric element 1 also returns, and then the slider 21 stops.

FIG. 8 shows the operation of the stator 11 in a case that the drive device 12 generates the saw-tooth wave in FIG. 4(*a*), but the slider 21 moves in the opposite direction when the drive device 12 generates a saw-tooth wave in FIG. 4(*b*). Moreover, suppose that the stator 11 is made into vertical contrary. When the ground, instead of the slider 21, touches the surface electrode 2, the stator 11 can be moved in the same direction to the friction power. Note that the present invention includes a stator 11 whose piezoelectric elements 1 overlap more than two times even though FIG. 8 shows that the piezoelectric elements 1 overlap twice. The more the duplicating degree of the piezoelectric elements 1 becomes, the longer they can be cut in the extension direction. Therefore, the piezoelectric elements 1 can generate more stress.

Now, as is clear by FIG. 3 and FIG. 6, the more the number of overlapping piezoelectric elements 1 becomes, the more voltage the drive device 12 must generate, even though it applies constant voltage to the piezoelectric elements 1. However, suppose that character of all piezoelectric elements 1 is the same, voltage applied to the piezoelectric elements 1 is also the same. If surface electrodes 2 and back electrodes 3 of all piezoelectric elements 1 on a stator 11 shown in FIG. 3 and FIG. 6 pass electricity, respectively, the same voltage can be applied to all of the piezoelectric elements 1. The drive device 12, thus, only have to generate voltage applied to one piezoelectric element 1. It is explained here about a method using a piezoelectric element 1 which are sigmoidally folded up.

Figure 9:
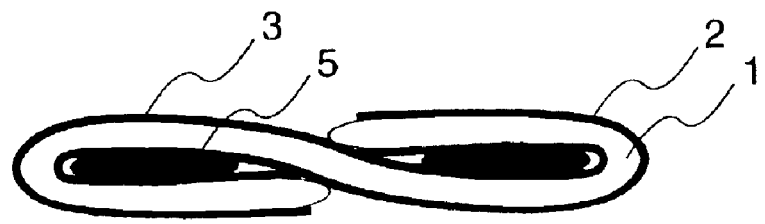
FIG. 9 is an explanation view for a piezoelectric element sigmoidally folded up.
Figure 9:
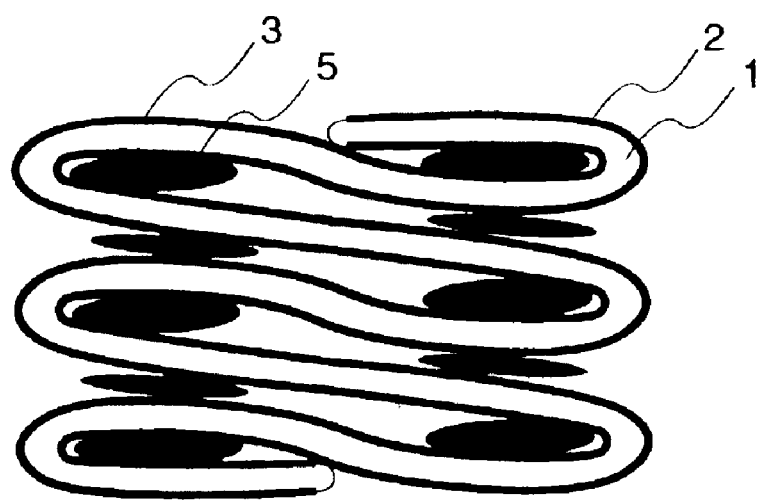
Figure 9:
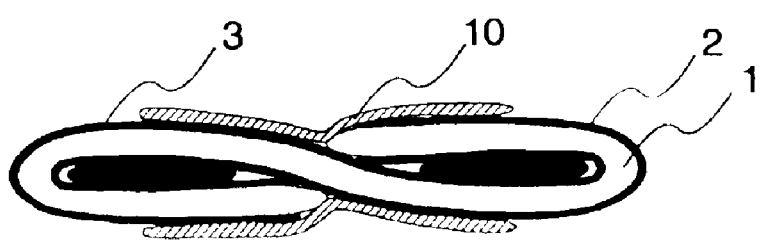
Figure 9:
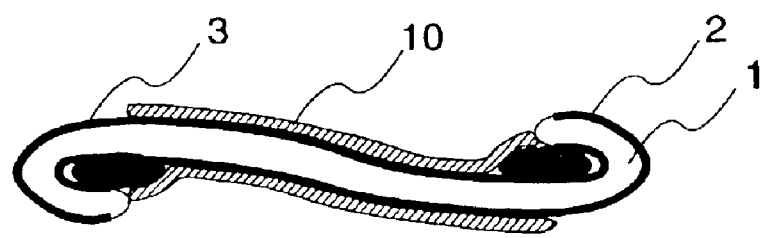

As shown in FIG. 9, the invention described in claim 2 is a stator 11 which uses some piezoelectric elements 1 sigmoidally folded up. In a case that the piezoelectric element 1 is a thin film like PVDF (Polyvinylidene Fluoride Plastics), the piezoelectric element 1 is bent by two place along the extension direction, as shown in FIG. 9(*a*). In order for the piezoelectric element 1 folded up not to be opened, the inner side of the piezoelectric element 1 turned up is fixed by adhesives 5 at a suitable interval. Note that the reason why the adhesives 5 are adhered at a interval is for the adhesives 5 not to prevent expansion and contraction of the piezoelectric element 1 in the extension direction, when voltage is applied to the piezoelectric element 1. Generally speaking, it is enough for the piezoelectric element 1 to be adhered by the adhesives 5 at two points, that is, a fixed end 6 and an open end 7, but it may be adhered by the adhesives 5 at the center of the fixed end 6 and the open end 7 if necessary. Of course, arbitrary places can be adhered. As shown in FIG. 9(b), moreover, intensity of the piezoelectric element 1 can be maintained along the extension direction if the piezoelectric element 1 is folded up even times. Therefore, when a thin film like PVDF (Polyvinylidene Fluoride Plastics) is used as a piezoelectric element 1 on the stator 11 shown in FIG. 3, the thin film can be folded up many times, as shown in FIG. 9(b).

Figure 10:
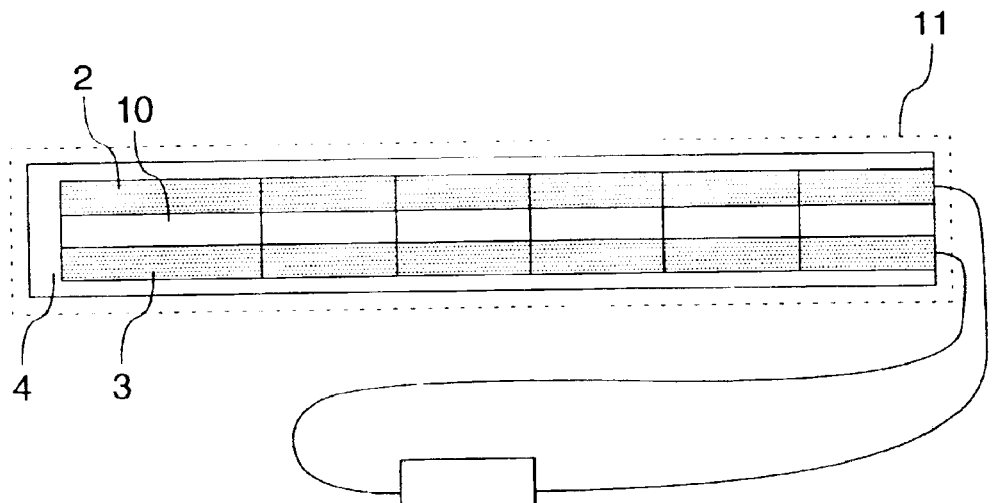
FIG. 10 is an explanation view for a stator whose piezoelectric elements sigmoidally folded up are arranged on a founcation, turning to the same direction, as their surface electrodes are overlapped horizontally.
Figure 10:
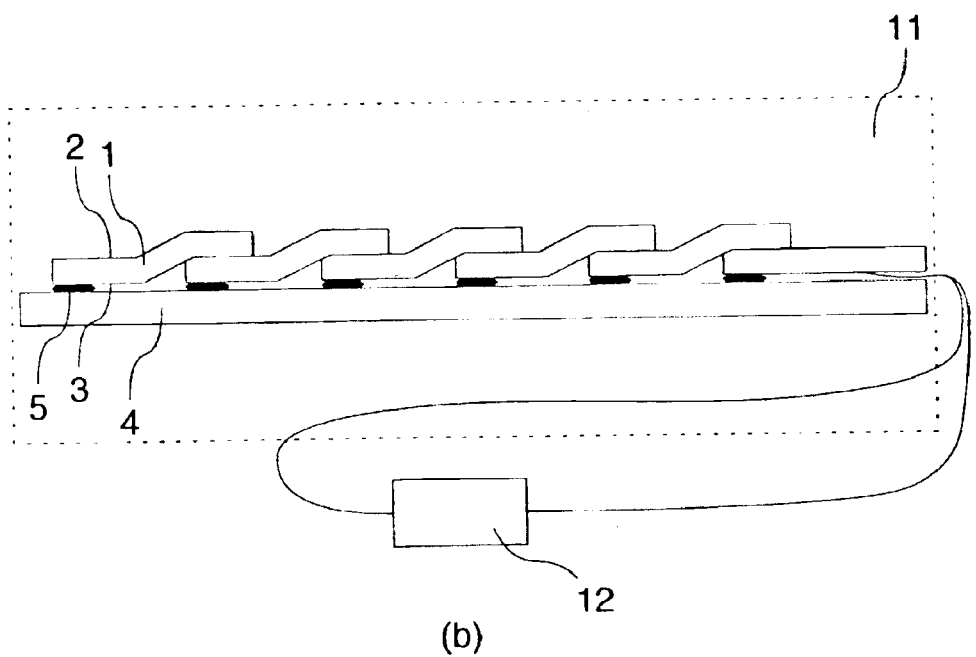

By the way, as shown in FIG. 3, suppose that some piezoelectric elements 1 like FIG. 9(a) and FIG. 9(b) overlaps in turn on a foundation 4. In each of the piezoelectric elements 1 sigmoidally folded up, a surface electrode 2 and a back electrode 3 make a short circuit via a surface electrode 2 and a back electrode 3 of the adjacent piezoelectric element 1. As shown in FIG. 9(c), however, suppose that an insulated domain 10 is prepared at a center of this piezoelectric element 1, and insulated paint is applied to the insulated domain 10 or an insulator is pasted on it. In each of all piezoelectric elements 1 sigmoidally folded up, a surface electrode 2 touches only a surface electrode 2 of the adjacent piezoelectric element 1, and moreover, a back electrode 3 touches only a back electrode 3 of the adjacent piezoelectric element 1, as shown in FIG. 10. That is, the surface electrodes 2 and the back electrodes 3 do not make a short circuit between a piezoelectric element 1 sigmoidally folded up and the adjacent piezoelectric element 1. Furthermore, in a case that an end of a transverse side of a piezoelectric element 1 is bent slightly, as shown in FIG. 9(d), not only it becomes easy to apply insulated paint to an insulated domain 10, but also a surface electrode 2 and a back electrode 3 of the adjacent piezoelectric element 1 can easily touch the corresponding electrodes, respectively, in a stator 11 shown in FIG. 10.

Figure 11:
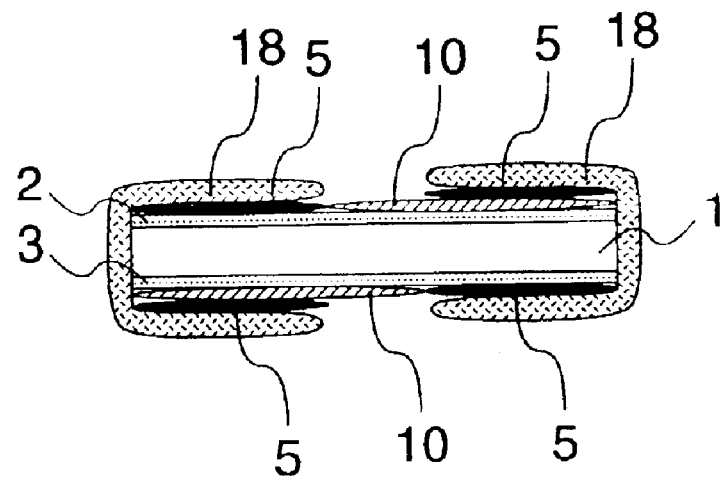
FIG. 11 is an explanation view in a case that a surface electrode and a back electrode are covered, crossing both sides of a piezoelectric element.
Figure 11:
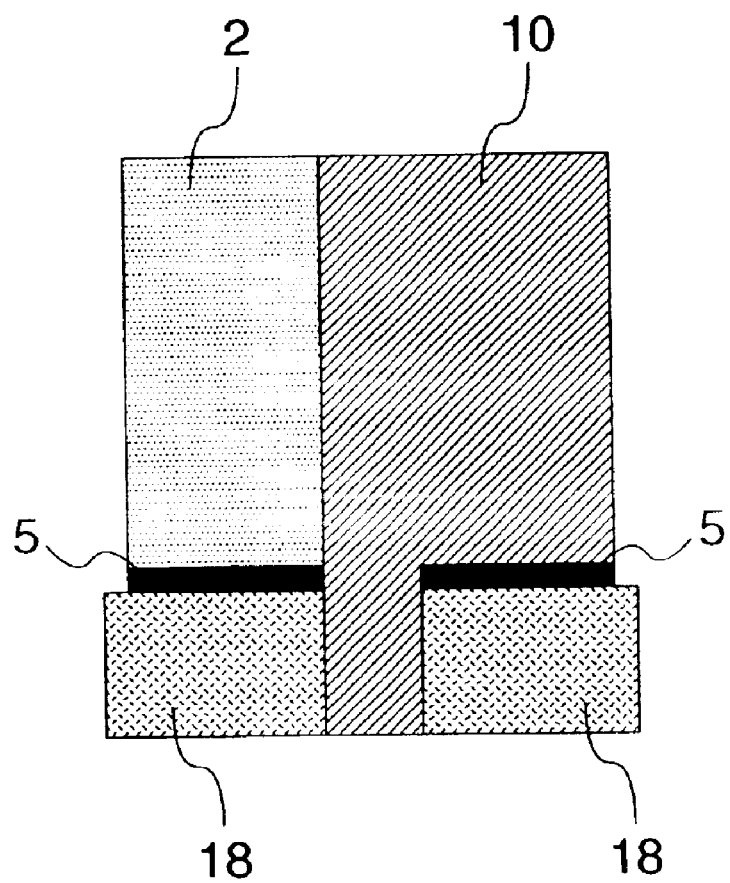

As shown in FIG. 11(a) and FIG. 11(b), the invention described in claim 3 is a stator 11 which uses some piezoelectric elements 1 covered by tunica electrodes 18. A surface electrode 2 and a back electrode 3 of a piezoelectric element 1 have an insulated domain 10, respectively, and these insulated domain 10 are insulated by insulated paint and insulated materials. Note that a surface electrode 2 not including in the insulated domain 10 and the insulated domain 10 of the back electrode 3 is covered by the tunica electrode 18. The tunica electrode 18 is stuck by pressure to the piezoelectric element 1 or fixed by adhesives 5 to it, where conductive adhesives 5 are used to fix the surface electrode 2 and the tunica electrode 18. Similarly, a back electrode 3 not including in the insulated domain 10 and the insulated domain 10 of the surface electrode 2 is also covered by the tunica electrode 18.

Figure 12:
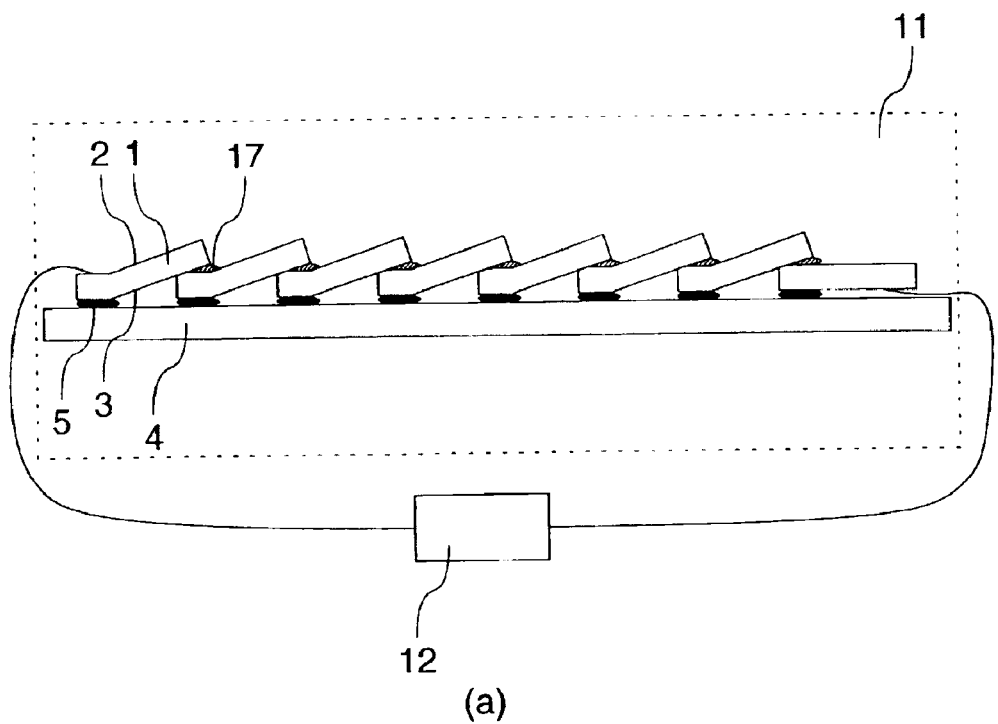
FIG. 12 is an explanation view for a stator, some surface electrodes and back electrodes of whose piezoelectric elements turning to the same direction are connected by conductive sponges.
Figure 12:
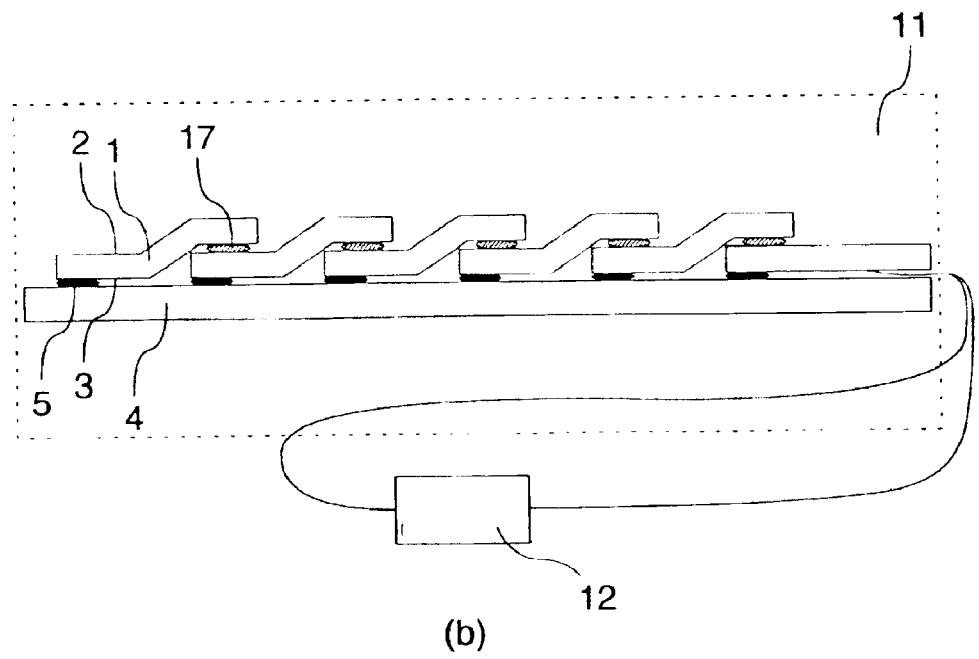

Moreover, as shown in FIG. 12, the invention described in claim 4 is a stator 11, where a surface electrode 2 and a back electrode 3 of any two adjacent piezoelectric elements 1 are connected by a leading wire or a conductive sponge 17. Similarly, they are also connected in a case that some tunica electrodes 18 cover the piezoelectric elements 1. Therefore, resistance between the surface electrode 2 and the back electrode 3 becomes less than contact resistance. Suppose moreover that the leading wire connects between the surface electrode 2 and the back electrode 3, a foundation 4 of the stator 11 can be easily transformed because the leading wire is elongated or shrinked. Note that some piezoelectric elements 1 of the stator 11 do not shift and roll up, by using some leading wires. On the other hand, suppose that a conductive sponge 17 connects between the surface electrode 2 and the back electrode 3, some piezoelectric elements 1 can touch a slider 21 easily because the conductive sponge 17 becomes a buffer agent. Note that some piezoelectric elements 1 of the stator 11 do not shift and roll up, by using some conductive sponges 17. For example, as shown in FIG. 12(a), suppose that the conductive sponge 17 passes electricity between a surface electrode 2 and a back electrode 3 of these piezoelectric elements 1 even though the adjacent piezoelectric elements 1 touch each other via a small domain. Resistance between the surface electrode 2 and the back electrode 3 becomes less than contact resistance. In addition, the piezoelectric elements 1 do not roll up against friction power between them and the slider 21 because the conductive sponge 17 prevents the surface electrode 2 and the back electrode 3 separating. Moreover, as shown in FIG. 12(b), suppose that the adjacent piezoelectric elements 1 overlap via a large domain. Each of the piezoelectric elements 1 can apply suitable friction power to the slider 21, regardless of a position and a weight of the slider 21, because a large conductive sponge 17 can be used at this domain.

Figure 13:
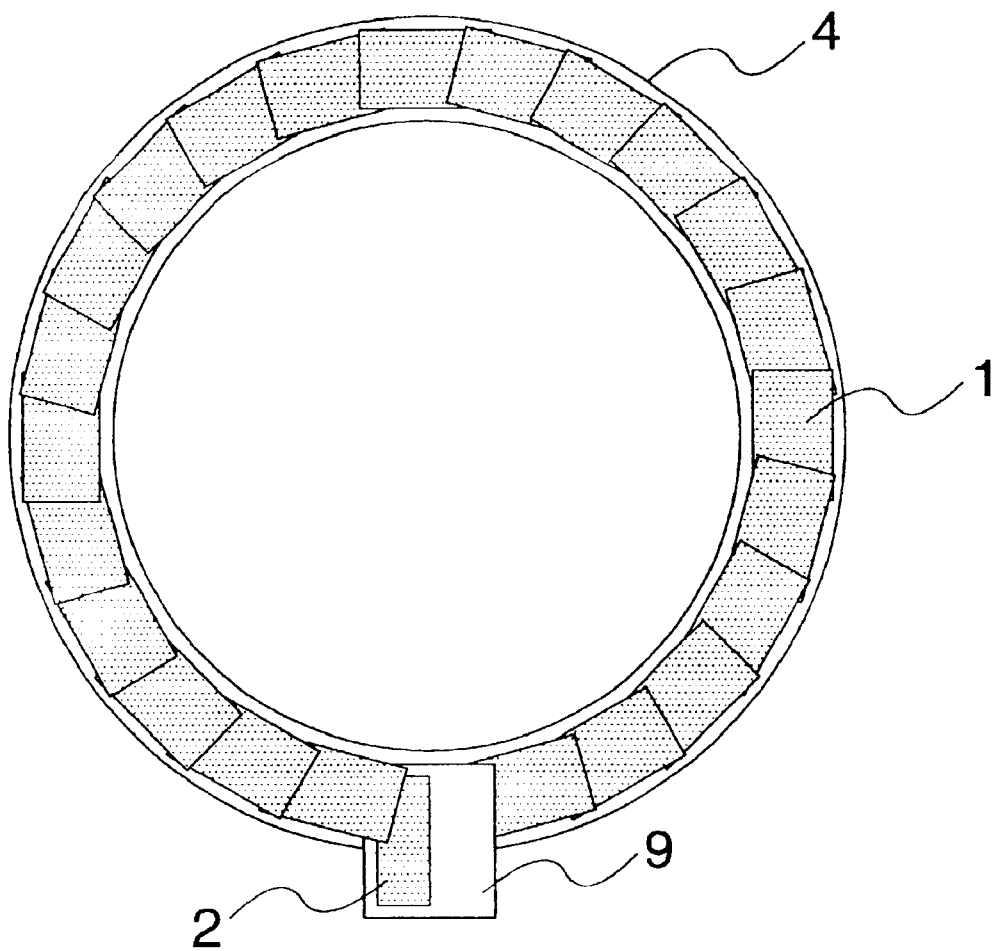
FIG. 13 is an explanation view for a stator whose piezoelectric elements are arranged circularly.
Figure 13:
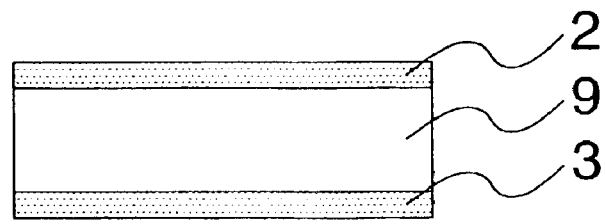
Figure 14:
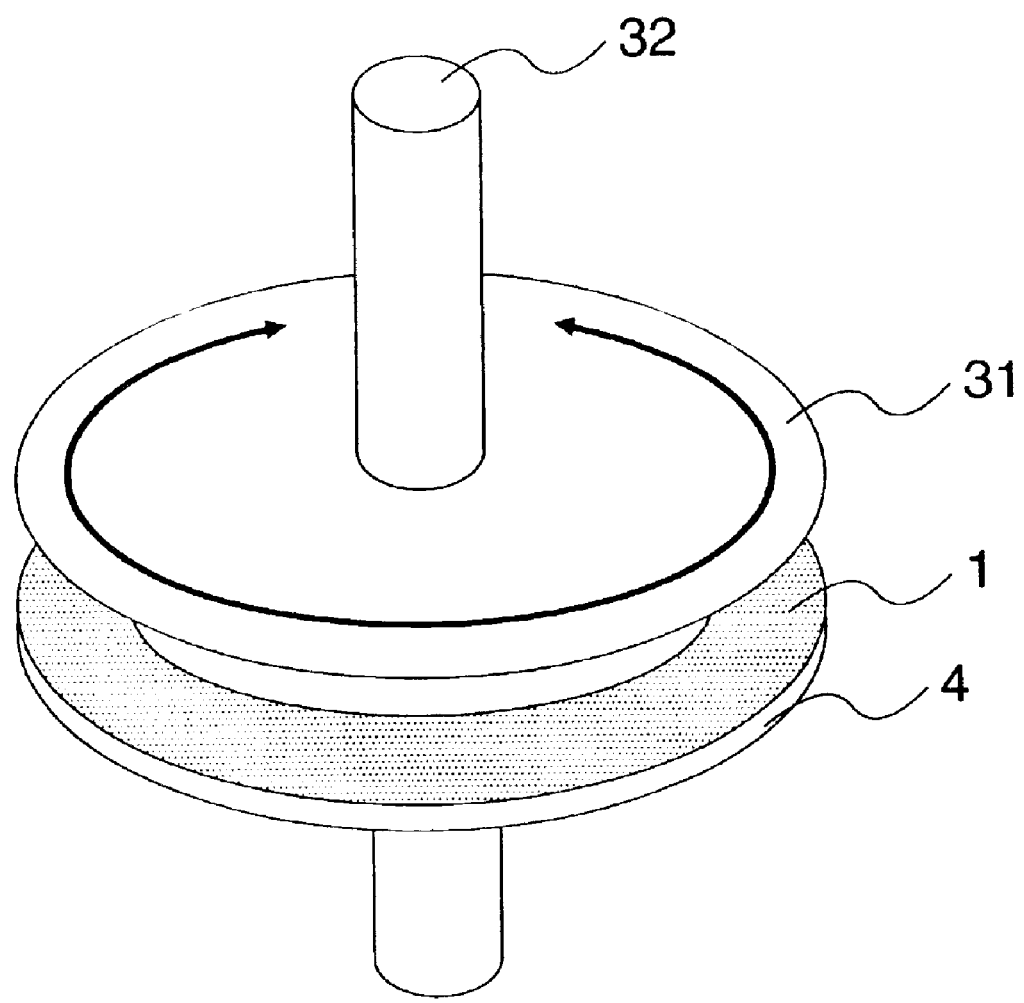
FIG. 14 is an explanation view in a case that a stator rotates a circular rotor.

Now, as shown in FIG. 13(a), the invention described in claim 6 is a stator 11 which has a circular foundation 4, along which some piezoelectric elements 1 are arranged regularly. Note that a spacer 9 is inserted between the head of piezoelectric elements 1 and the end of piezoelectric elements 1. The spacer 9 is an insulator, and has a surface electrode 2 and a back electrode 3 on its both sides, respectively, as shown in FIG. 13(b). Therefore, the surface electrode 2 of the spacer 9 touches the back electrode 3 of a piezoelectric element 1, and the back electrode 3 of the spacer 9 touches the surface electrode 2 of a piezoelectric element 1. When a drive device 12 applies a saw-tooth wave to the back electrode 3 and the surface electrode 2 of the spacer 9, all piezoelectric elements 1 can be elongated and shrinked along a circle of the foundation 4. As shown in FIG. 14, suppose that a circular rotor 31 having an axis of rotation 32 is put on some piezoelectric elements 1 attached to the circular foundation 4, these piezoelectric elements 1 can rotate the circular rotor 31 clockwisely and counterclockwisely, centering on the axis of rotation 32.

Figure 15:
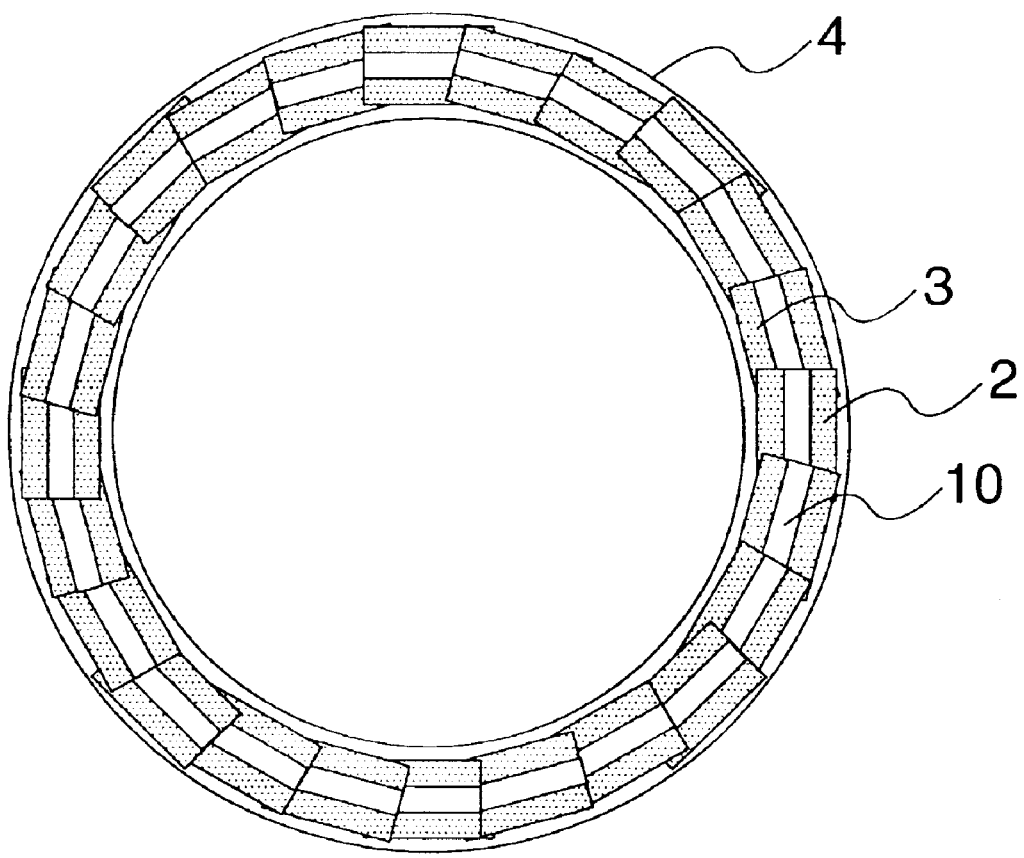
FIG. 15 is an explanation view for a stator whose sigmoid piezoelectric elements are arranged circularly.

On the other hand, as shown in FIG. 15, the invention described in claim 7 is a stator 11 which has a circular foundation 4, along which some piezoelectric elements 1 are arranged regularly. Note that surface electrodes 2 and back electrodes 3 of all piezoelectric elements 1 pass electricity, respectively. Therefore, this stator 11 does not need a spacer 9 (refer to FIG. 13(a)). When a drive device 12 applies a saw-tooth wave to a back electrode 3 and a surface electrode 2, all piezoelectric elements 1 can be elongated and shrinked along a circle of the foundation 4. Of course, in a case of using these piezoelectric elements 1, a circular rotor 31 can also rotate as shown in FIG. 14.

Figure 16:
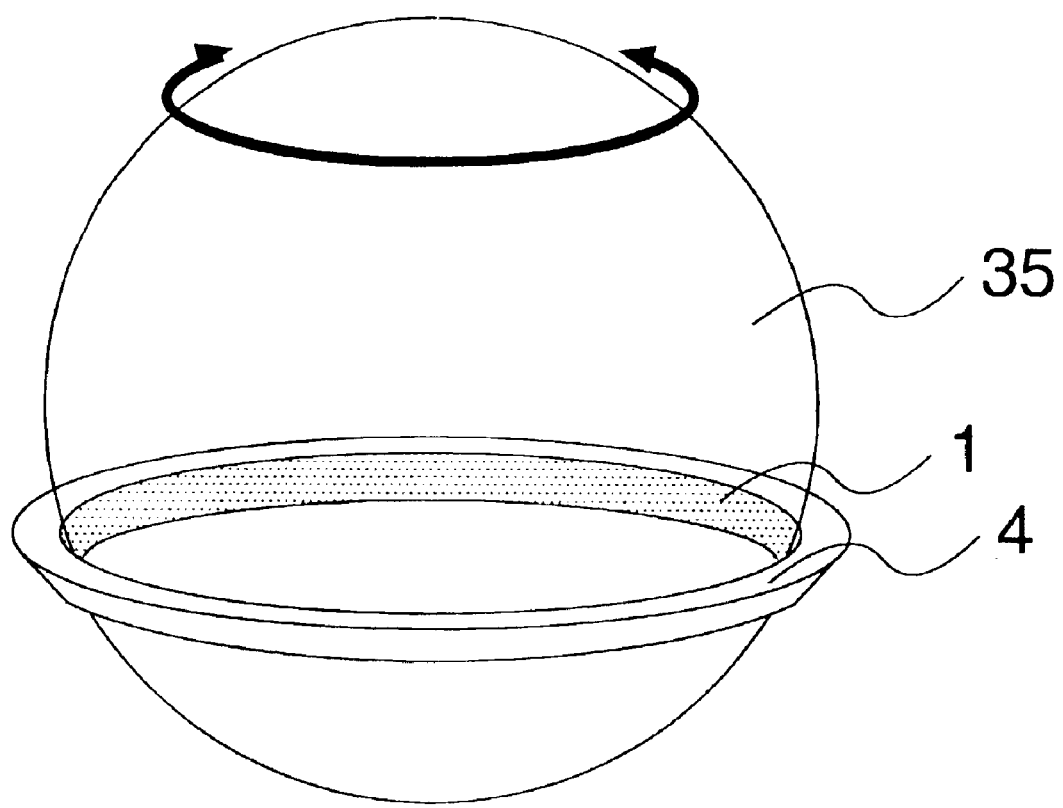
FIG. 16 is an explanation view in a case that a stator rotates a spherical rotor.

As shown in FIG. 16, suppose now that some piezoelectric elements 1 are arranged in an inner side of a foundation 4 as they touch a surface of a spherical rotor 35, the piezoelectric elements 1 can rotate the spherical rotor 35. The invention described in claim 15 is, therefore, an overlapping type piezoelectric actuator which can rotate a spherical rotor 35 with one or more degrees of freedom, by attaching such two or more circular stators 11 to the spherical rotor 35.

Figure 17:
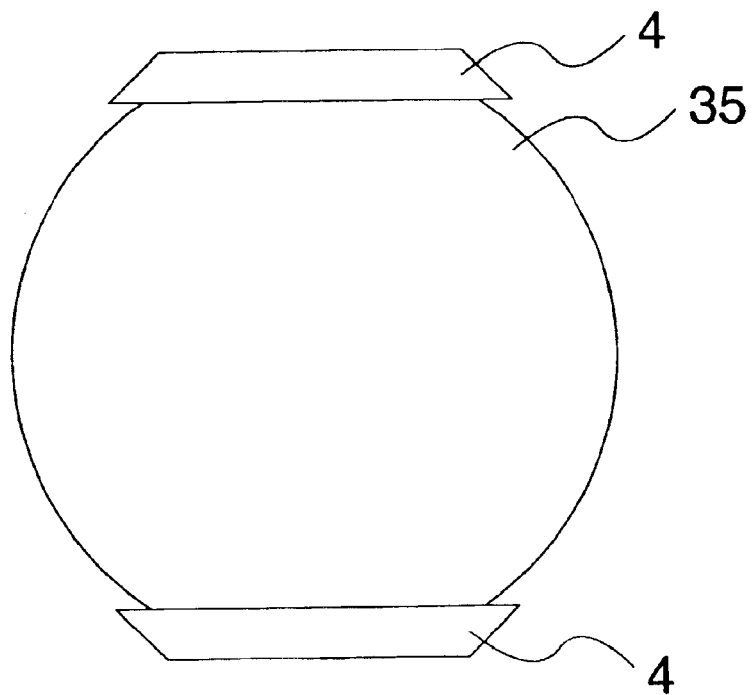
FIG. 17 is an explanation view in a case that a spherical rotor are put between two stators.

For example, as shown in FIG. 17, suppose that a spherical rotor 35 is put between two opposite circular stators 11, the spherical rotor 35 rotates on an axis crossing two center points of the two circular stators 11.

Figure 18:
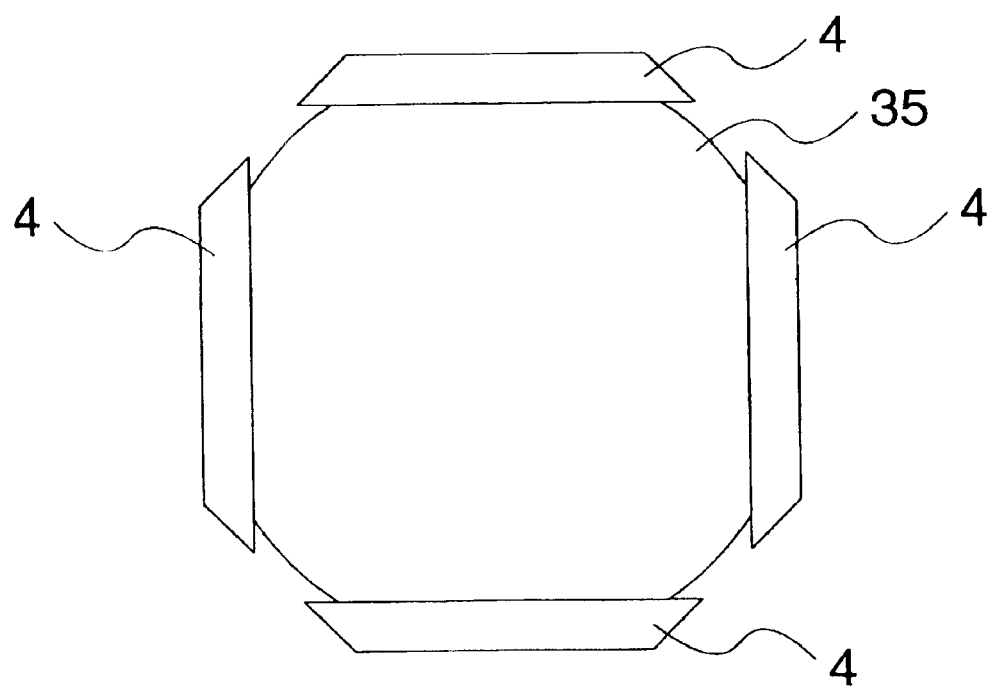
FIG. 18 is an explanation view in a case that a spherical rotor are surrounded by four stators in the shape of a square.

Moreover, as shown in FIG. 18, suppose that four circular stators 11 are divided into two sets, and a spherical rotor 35 is put between two opposite circular stators 11 of each set, the spherical rotor 35 rotates on two axes crossing two center points of the two circular stators 11 of each set. In a case of using two drive device 12 according to FIG. 34, the overlapping type piezoelectric actuator becomes a motor with two degrees of freedom.

Figure 19:
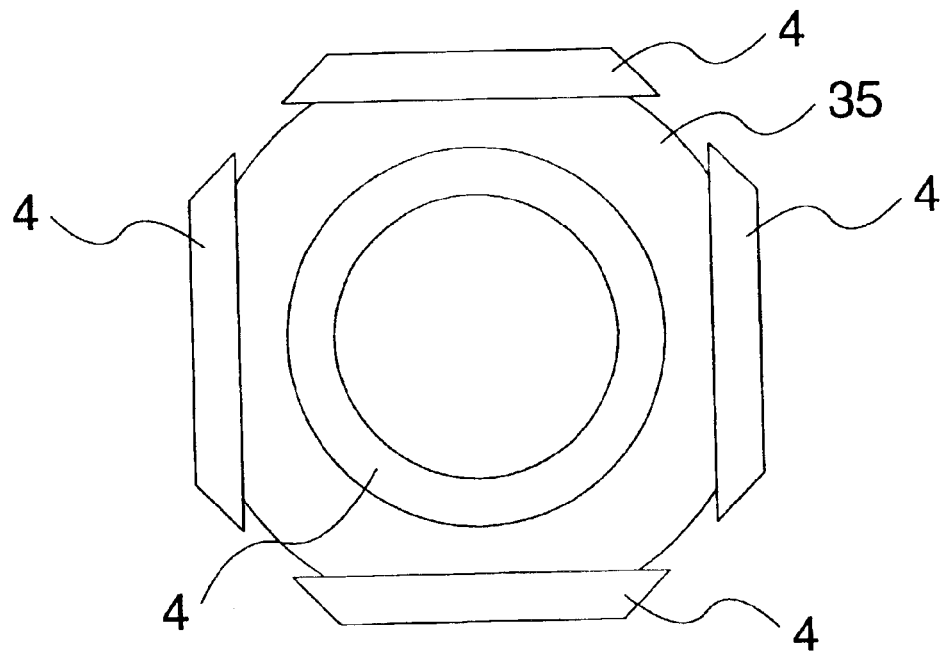
FIG. 19 is an explanation view in a case that a spherical rotor are surrounded by six stators, intersecting perpendicularly.

In addtion, as shown in FIG. 19, suppose that six circular stators 11 are divided into three sets, and a spherical rotor 35 is put between two opposite circular stators 11 of each set, the spherical rotor 35 rotates on three axes crossing two center points of the two circular stators 11 of each set. In a case of using three drive device 12, the overlapping type piezoelectric actuator becomes a motor with three degrees of freedom.

Figure 20:
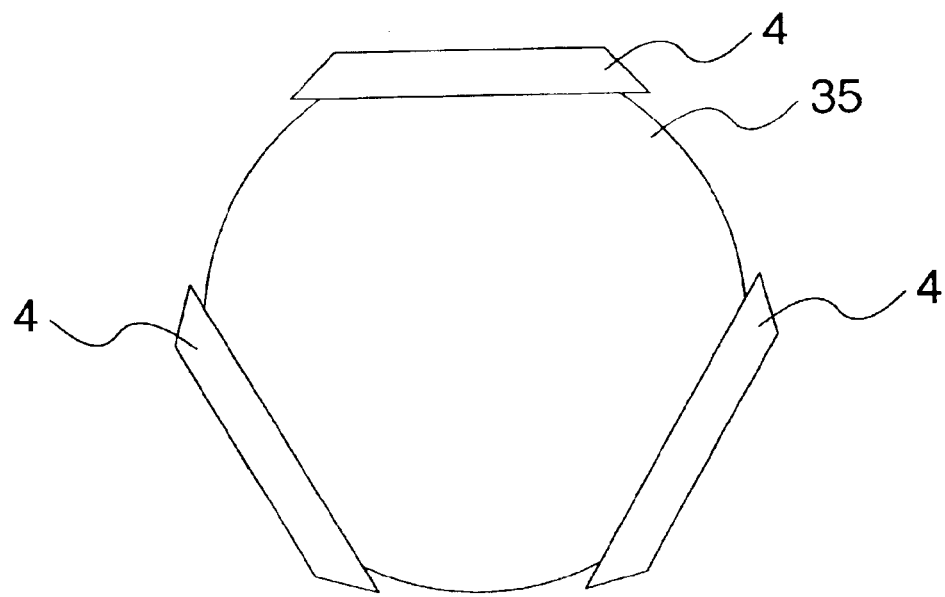
FIG. 20 is an explanation view in a case that a spherical rotor are surrounded by three stators in the shape of a triangle.

Finally, as shown in FIG. 20, suppose that a spherical rotor 35 is put between three circular stators 11 which make a triangle, the spherical rotor 35 rotates on three axes crossing three center points of the three circular stators 11, respectively. In a case of using three drive device 12, the overlapping type piezoelectric actuator becomes a motor with three degrees of freedom.

Note that a circular stator 11 can rotate not only a spherical rotor 35 but also many kinds of solid of revolution like a hemisphere rotor and a cone rotor, even though FIG. 16 and so on show the cases that the circular stator 11 rotates the spherical rotor 35. An axis of rotation 32 (refer to FIG. 14) is not required in these overlapping type piezoelectric actuator, if a slider 21 and a stator 11 is designed suitably.

Figure 21:
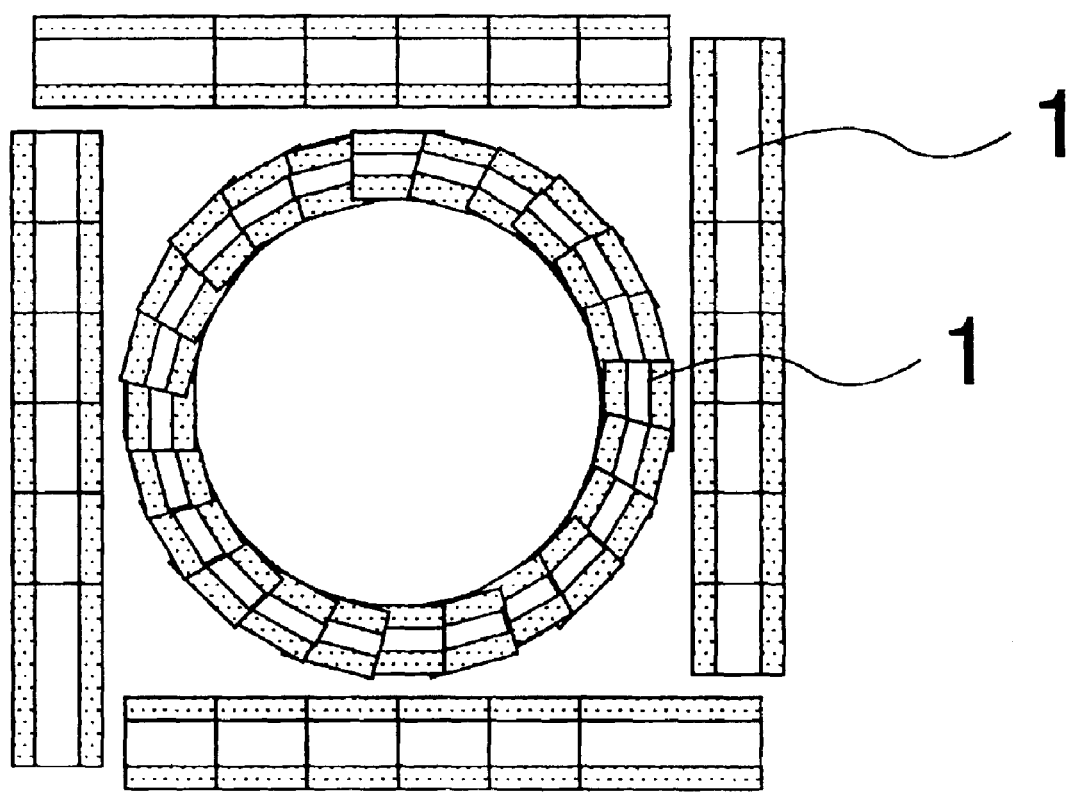
FIG. 21 is an explanation view for a stator which can move a circular rotor vertically and horizontally, and rotate it.

Now, the invention described in claim 11 is a stator 11 consisting of four stators 11 corresponding to the invention described in claim 1 and a stator 11 corresponding to the invention described in claim 6, which can move a slider 21 vertically and horizontally on a plane, and moreover rotate it clockwisely and counter-clockwisely. In addition, the invention described in claim 11 is a stator 11 consisting of four stators 11 corresponding to the invention described in claim 2 and a stator 11 corresponding to the invention described in claim 7, which can move a slider 21 vertically and horizontally on a plane, and moreover rotate it clockwisely and counter-clockwisely. FIG. 21 shows an example of a stator 11 using some piezoelectric elements 1 sigmoidally folded up. Note that two stator 11 described in claim 6 and claim 7, respectively, can rotate a slider 21 efficiently and make its control easy, while the slider 21 can be rotated clockwisely and counter-clockwisely by using only the stators described in claim 1 and claim 2, respectively.

Figure 22:
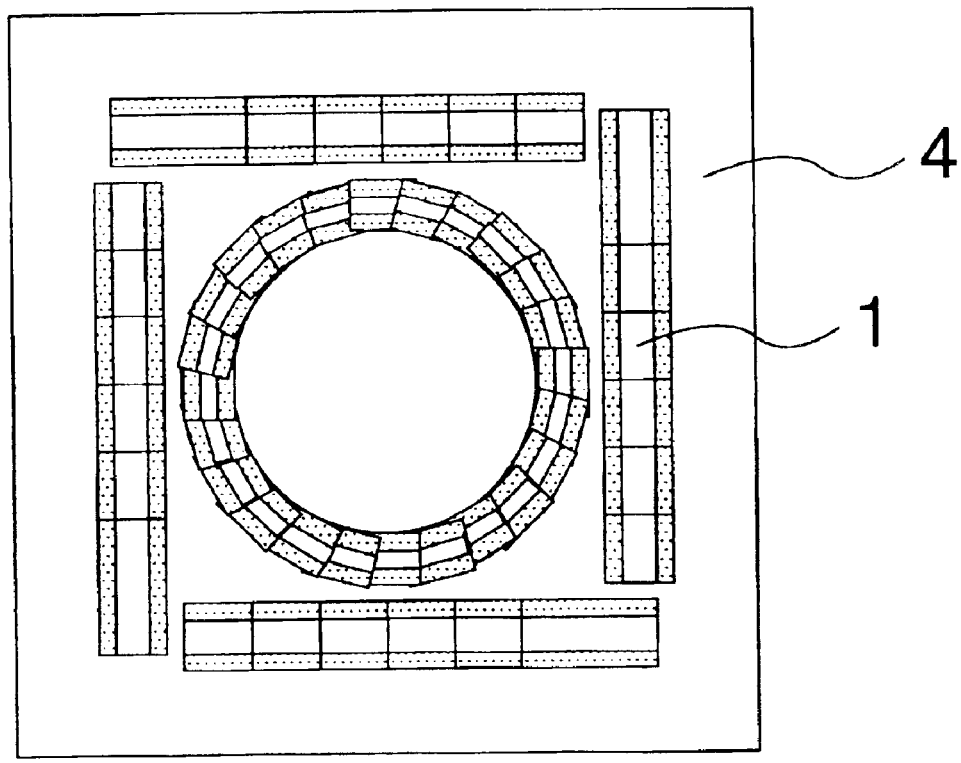
FIG. 22 is an explanation view for a stator which can rotate a spherical rotor in three degrees of freedom.
Figure 22:
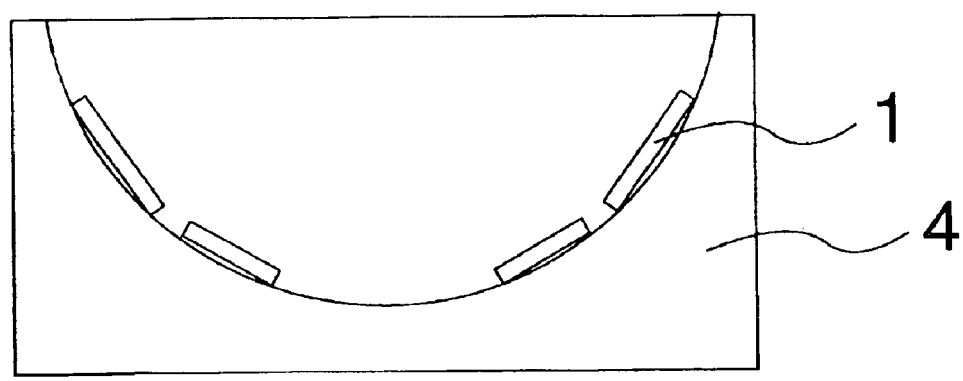
Figure 23:
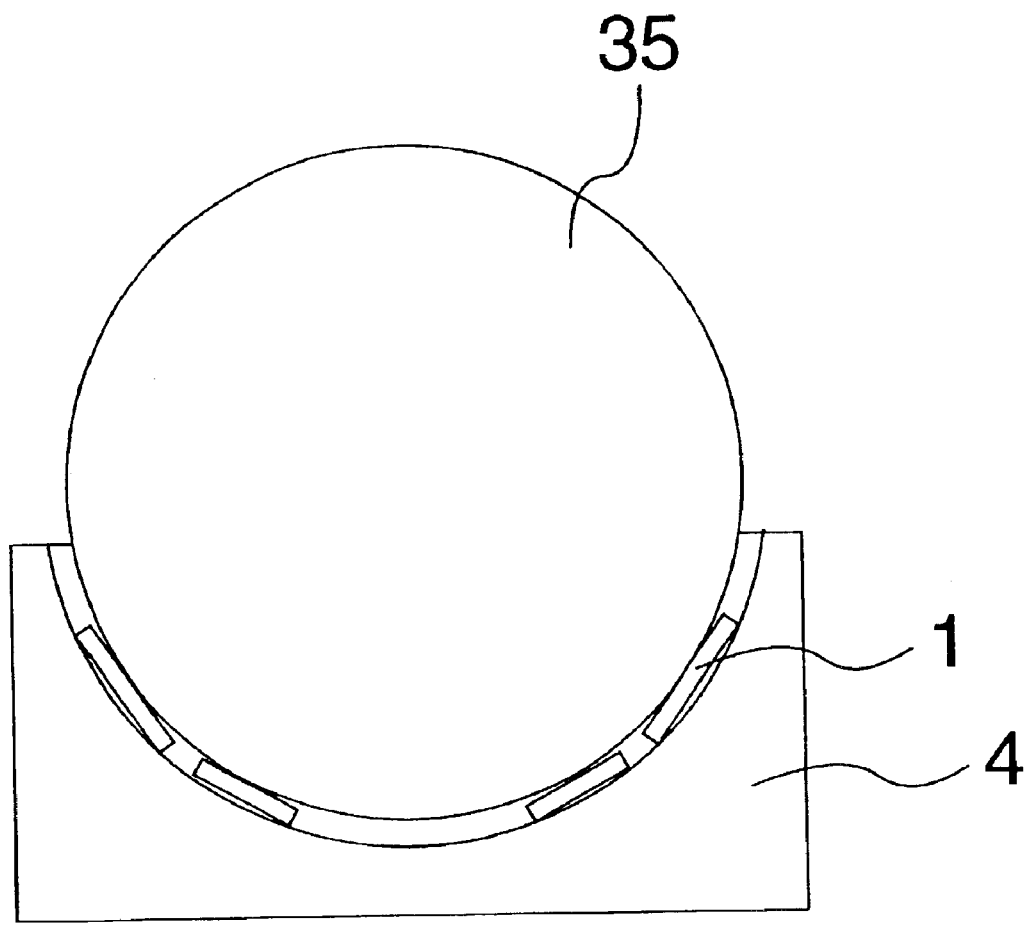
FIG. 23 is an explanation view in a case that a stator rotates a spherical rotor in three degrees of freedom.

As shown in FIG. 22 and FIG. 23, the invention described in claim 12 is a stator 11 whose foundation 4 is processed into concave as its piezoelectric elements 1 uniformly touch a spherical rotor 35 or an object with a convex whose curvature is equal to the spherical rotor 35. FIG. 22(a) shows a top view of the stator 11, and FIG. 22(b) shows its sectional view in a case of cutting at a center. As is clear by FIG. 22(b), a circular stator 11 rotates an object like a spherical rotor 35, where an axis of the circular stator 11 is a vertical line crossing its center point. On the other hand, for two set of opposite arc stators 11, each set rotates the object like a spherical rotor 35, where an axis of the set is crossing a center point of an arc formed by the opposite stators 11. In addition, as shown in FIG. 24, suppose that two stators 11 described in claim 12 are arranged as a spherical rotor 35 is put between them, the spherical rotor 35 can be rotated more smoothly.

Figure 24:
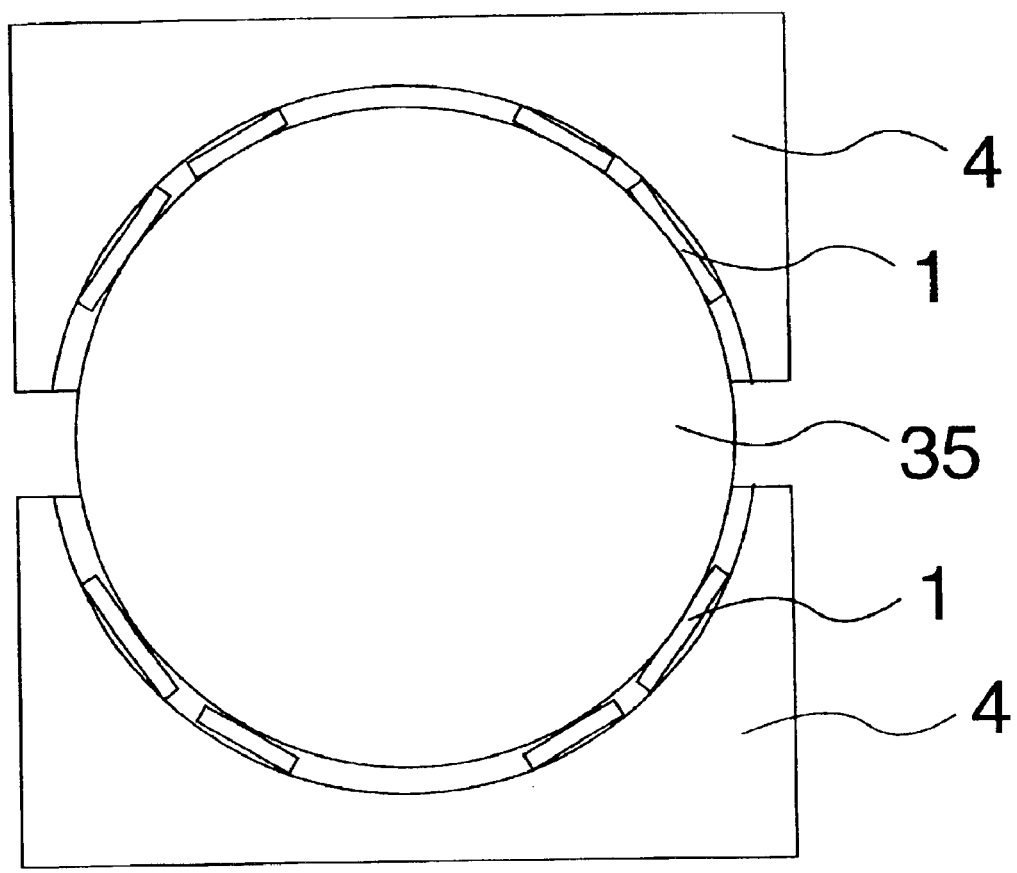
FIG. 24 is an explanation view in a case that two stators rotate a spherical rotor in three degrees of freedom.

Note that a rotor can rotate with three degrees of freedom similarly even though a stator 11 has a convex and the rotor has a concave, while FIG. 23 and FIG. 24 show two cases of using a spherical rotor 35.

Although it was described in the above about piezoelectric elements 1 directly touching a slider 21 and a spherical rotor 35 in stators 11 described in claim 1 and claim 2, the piezoelectric elements 1 may not be able to apply suitably friction power to the slider 21 and the spherical rotor 35 because friction coefficient of a surface electrode 2 and a back electrode 3 of the piezoelectric element 1 varies sharply according to materials used as the surface electrode 2 and the back electrode 3. It is explained here about a method that a piezoelectric element 1 applies suitable friction power to a slider 21, in a case that a surface electrode 2 and a back electrode 3 of the piezoelectric element 1 have some skids 8. Note that it is also similar for some piezoelectric elements 1 to rotate a spherical rotor 35, as shown in FIG. 16.

Figure 25:
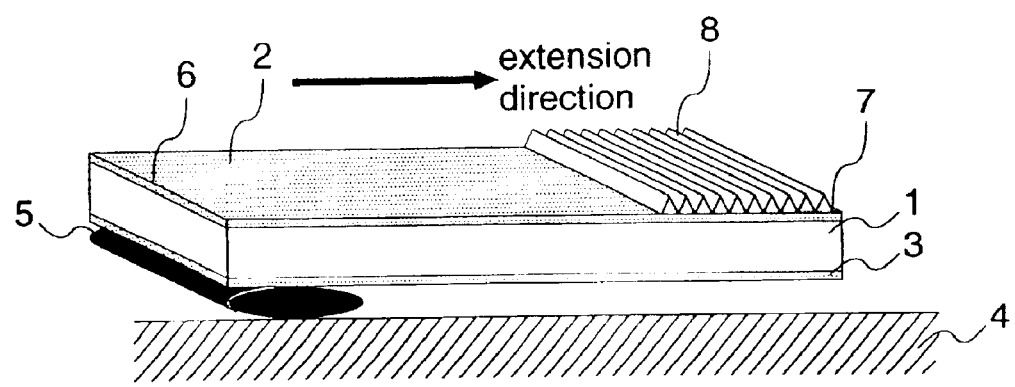
FIG. 25 is an explanation view in a case that some skids are attached in a piezoelectric element.

As shown in FIG. 25, a piezoelectric element 1 can have some skids 8 on a surface electrode 2 from its open end 7. The elasticity like a rubber or the ease of processing like a plastic is suitable for quality of the skids 8. In addition, the skids 8 can be deleted from the surface electrode 2, by cutting or etching of the thick surface electrode 2. Of course, the skids 8 can be formed into the surface electrode 2 by processing technique like welding and soldering. Polygon and semiellipse are suitable for form of a section of the skid 8. If some skids 8 are arranged as their sequence intersects perpendicularly for the extension direction, effect of the skids 8 is high. Suppose that such piezoelectric elements 1 are used, a stator 11 of the invention described in claim 8 can be manufactured. With reference to the drawings, then, I explain about operation of a stator 11 in a case that a section of a skid 8 is a triangle.

Suppose first that a drive device 12 generates a saw-tooth wave shown in FIG. 4(a).

In a case that a surface electrode 2 of a piezoelectric element 1 has been stopped, as shown in FIG. 26(a), a slider 21 is held by friction power between skids 8 and itself.

When the surface electrode 2 of the piezoelectric element 1 moves to the right rapidly, as shown in FIG. 26(b), the skids 8 bends because of inertia of the slider 21. After that, the slider 21 is flipped off by the friction power between the skids 8 and itself.

When the surface electrode 2 of the piezoelectric element 1 once stopped, as shown in FIG. 26(c), the slider 21 sharply moves to the right because of inertia of the slider 21.

When the surface electrode 2 of the piezoelectric element 1 moves to the left slowly, as shown in FIG. 26(d), the slider 21 moves to the left together with the skids 8.

As shown in FIG. 26(e), suppose that the surface electrode 2 of the piezoelectric element 1 returns. As a result, the slider 21 had moved to the right.

Figure 26:
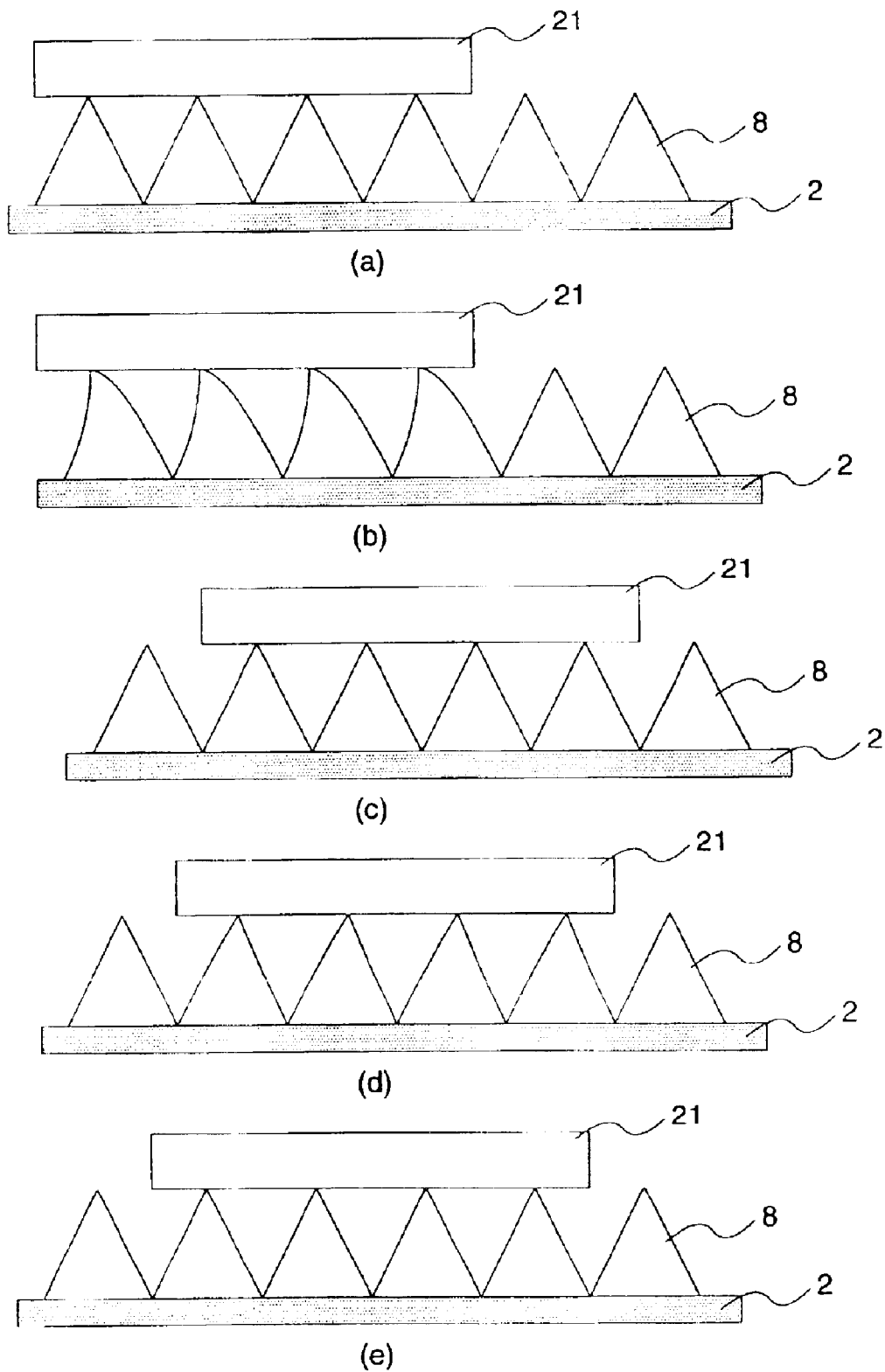
FIG. 26 is an explanation view in a case that some skids on the isosceles triangle attached in a piezoelectric element move an object to right-hand side.

As shown in FIG. 26, suppose that a section of the skid 8 is an isosceles triangle, the slider 21 moves similary even though it moves to any of the left and the right. However, in a case that the slider 21 only has to move in the either direction of both sides, the section of the skid 8 is not always the isosceles triangle. It is described here about a case that the section of the skid 8 is a right triangle.

Figure 27:
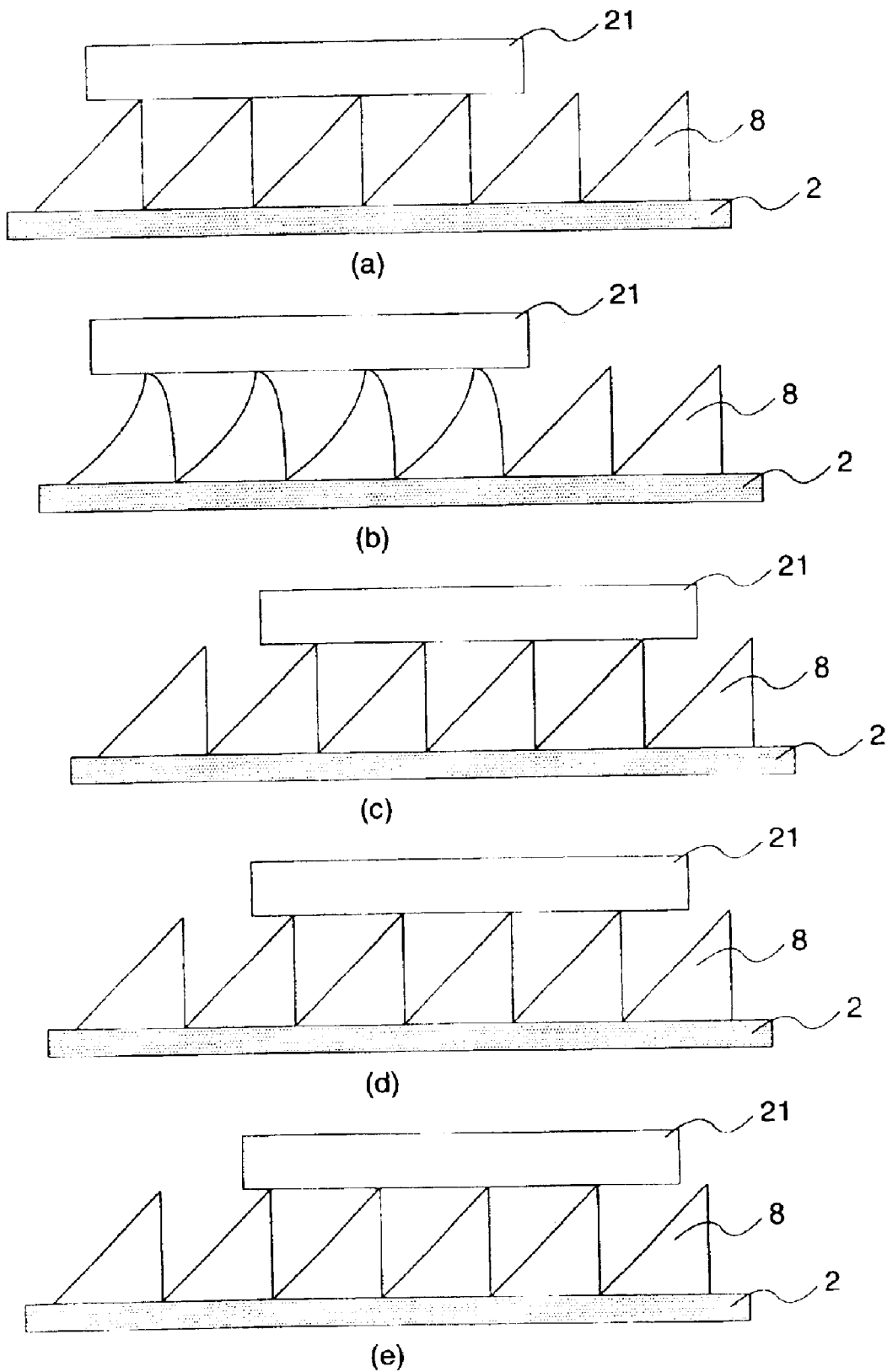
FIG. 27 is an explanation view in a case that some skids on the right triangle attached in a piezoelectric element move an object to right-hand side.

As shown in FIG. 27(a), a slider 21 is held by friction power between skids 8 and itself.

When the surface electrode 2 of the piezoelectric element 1 moves to the right rapidly, as shown in FIG. 27(b), the skids 8 bends more because of inertia of the slider 21. After that, the slider 21 is flipped off by the friction power of the skids 8.

When the surface electrode 2 of the piezoelectric element 1 once stopped, as shown in FIG. 27(c), the slider 21 moves to the right more sharply because of inertia of the slider 21.

When the surface electrode 2 of the piezoelectric element 1 moves to the left slowly, as shown in FIG. 27(d), the slider 21 seldom moves because of the small friction power of the skids 8.

As shown in FIG. 27(e), suppose that the surface electrode 2 of the piezoelectric element 1 returns. As a result, the slider 21 had moved to the right more sharply.

Figure 28:
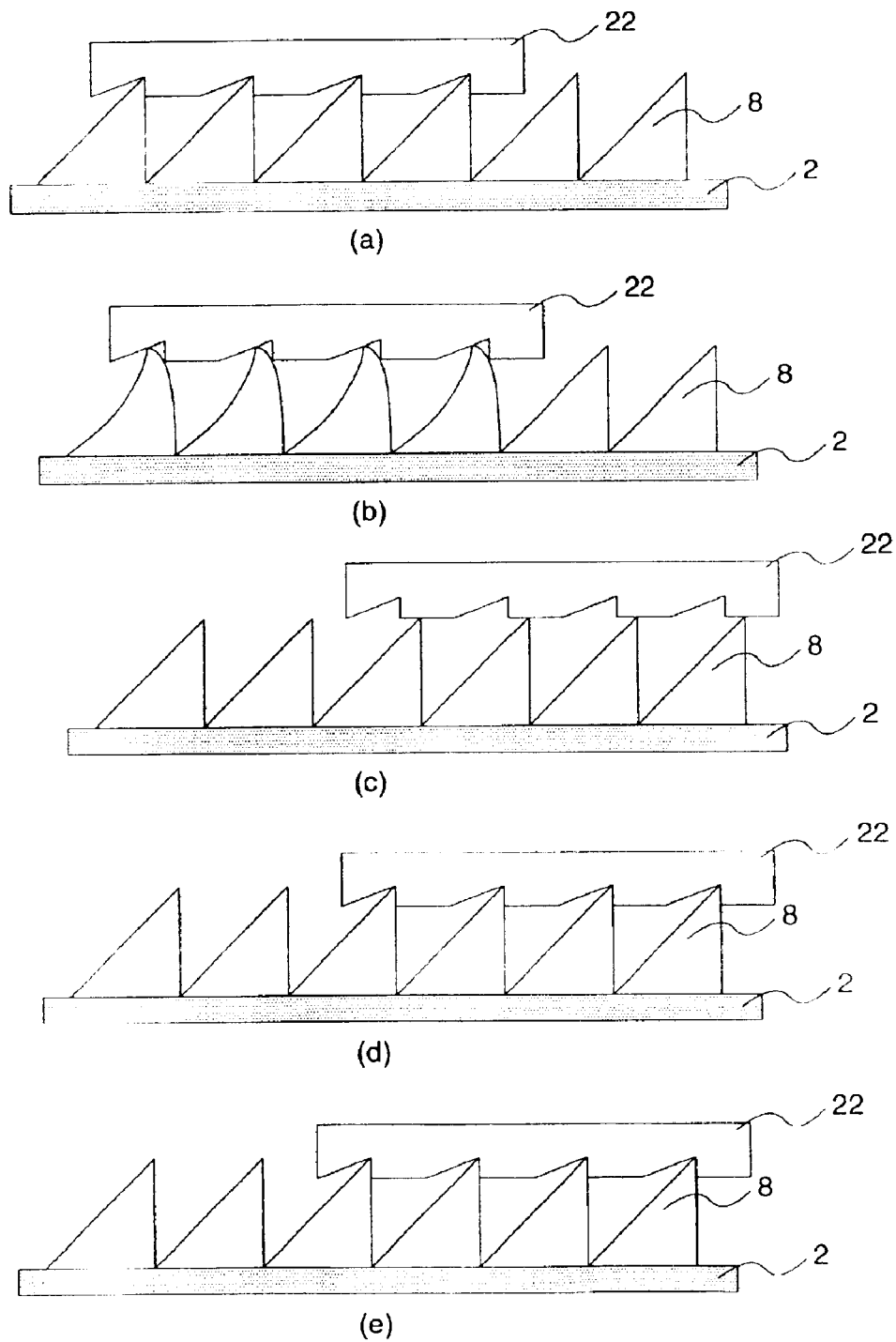
FIG. 28 is an explanation view in a case that some skids on the right triangle attached in a piezoelectric element move an object with a slot to right-hand side.

Moreover, suppose that the slider 21 is trenched or some projections are attached to it. Since the skids 8 can get into gear to these slots and projections, the skids 8 can conduct stress of the piezoelectric element 1 to the slider 21, converting the stress into friction power effciently. For example, as shown in FIG. 28, suppose that a slider with slots 22 has some slots whose shape is like a V character. In a case of FIG. 28(b), the skids 8 can conduct the stress to the slider with slots 22 directly, getting into gear to it. They, therefore, can flip off the slider with slots 22 to the right more sharply than skids 8 of FIG. 27(b).

FIG. 25 shows such a piezoelectric element 1 as it has some skids 8 on a surface electrode 2. However, in a case of a piezoelectric element 1 sigmoidally folded up (refer to FIG. 9), some skids 8 can be attached to a contact surface of the piezoelectric element 1 touching a slider 21.

Figure 29:
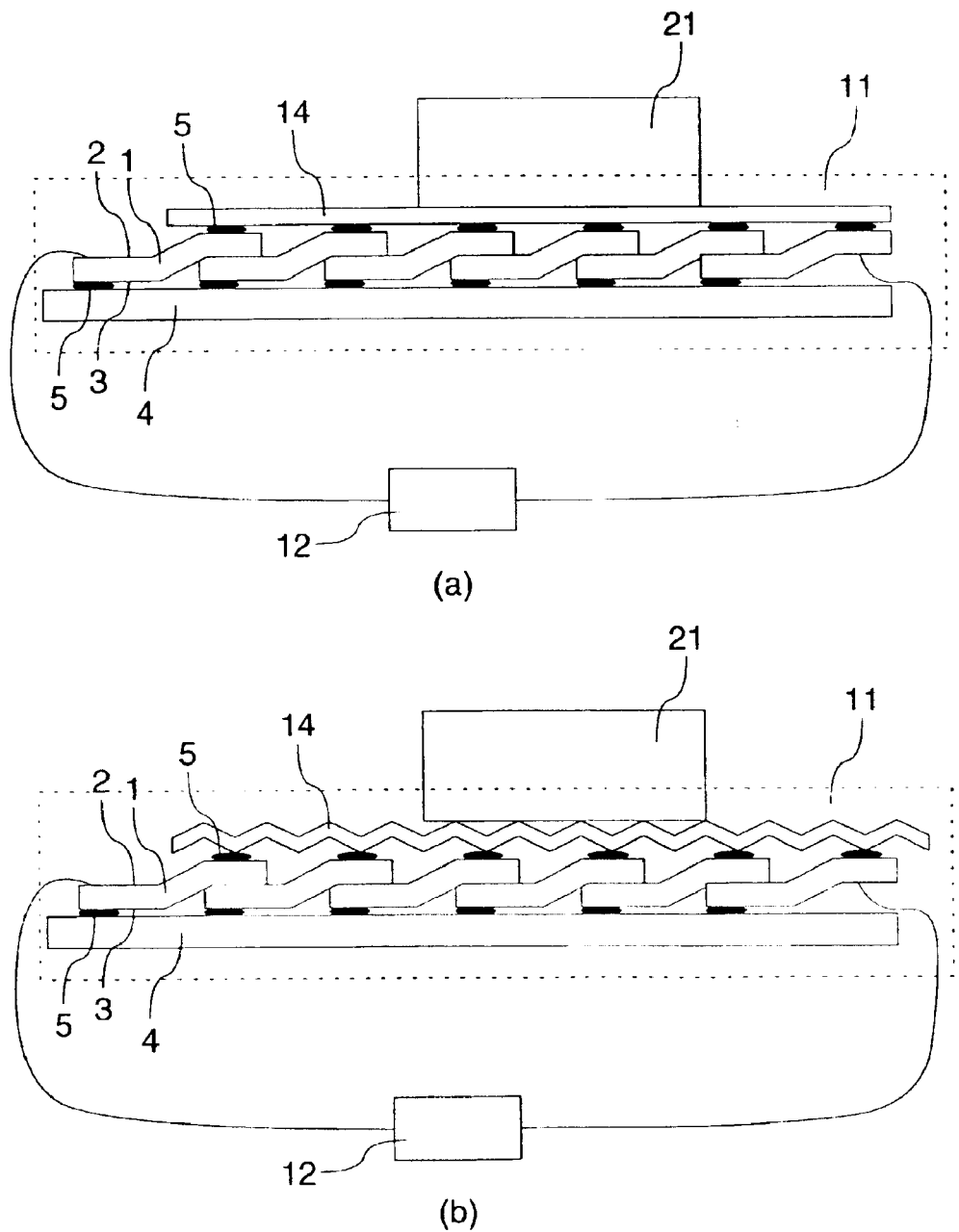
FIG. 29 is an explanation view in a case that a ceiling plate is attached in some piezoelectric elements.

By the way, it is very troublesome for us to past up some skids 8 to a surface electrode 2 of each piezoelectric element 1. Instead of pasting up the skids 8 to the surface electrode 2 of each piezoelectric element 1, therefore, suppose that a ceiling plate 14 (refer to FIG. 29) is pasted up to all surface electrodes 2 of piezoelectric elements 1. Then, a stator 11 can be manufactured easily. It is described here about a stator 11 with a ceiling plate 14.

As shown in FIG. 29(a), the invention described in claim 9 is a stator 11 which has a ceiling plate 14, where the ceiling plate 14 is pasted up by adhesives 5 to all surface electrodes 2 of piezoelectric elements 1. Since the ceiling plate 14 is an insulator like a plastic or metal by which the leather film was carried out, all surface electrodes 2 do not make a short circuit. Since quality of the ceiling plate 14 may be anything if it is an insulator, friction coefficient between the ceiling plate 14 and a slider 21 can be set freely, according to quality of the slider 21. If the friction coefficient between the ceiling plate 14 and the slider 21 is large, the stator 11 moves the slider 21 like FIG. 5 and FIG. 7. Otherwise, the stator 11 moves the slider 21 like FIG. 8. Even though the slider 21 moves in the direction opposite to the extension direction of the piezoelectric elements 1, as is clear by FIG. 29(a), the slider 21 is not caught in the piezoelectric elements 1. Moreover, as shown in FIG. 29(b), a bent ceiling plate 14 can be used. In this case, friction power applied to the slider 21 can be made small because a contact area between the ceiling plate 14 and the slider 21 is extremely small. In addition, intervals of open ends 7 of the piezoelectric elements 1 are not restrainded by the ceiling plate 14, because of bending the ceiling plate 14. Therefore, a foundation 4 can be bent freely.

Figure 30:
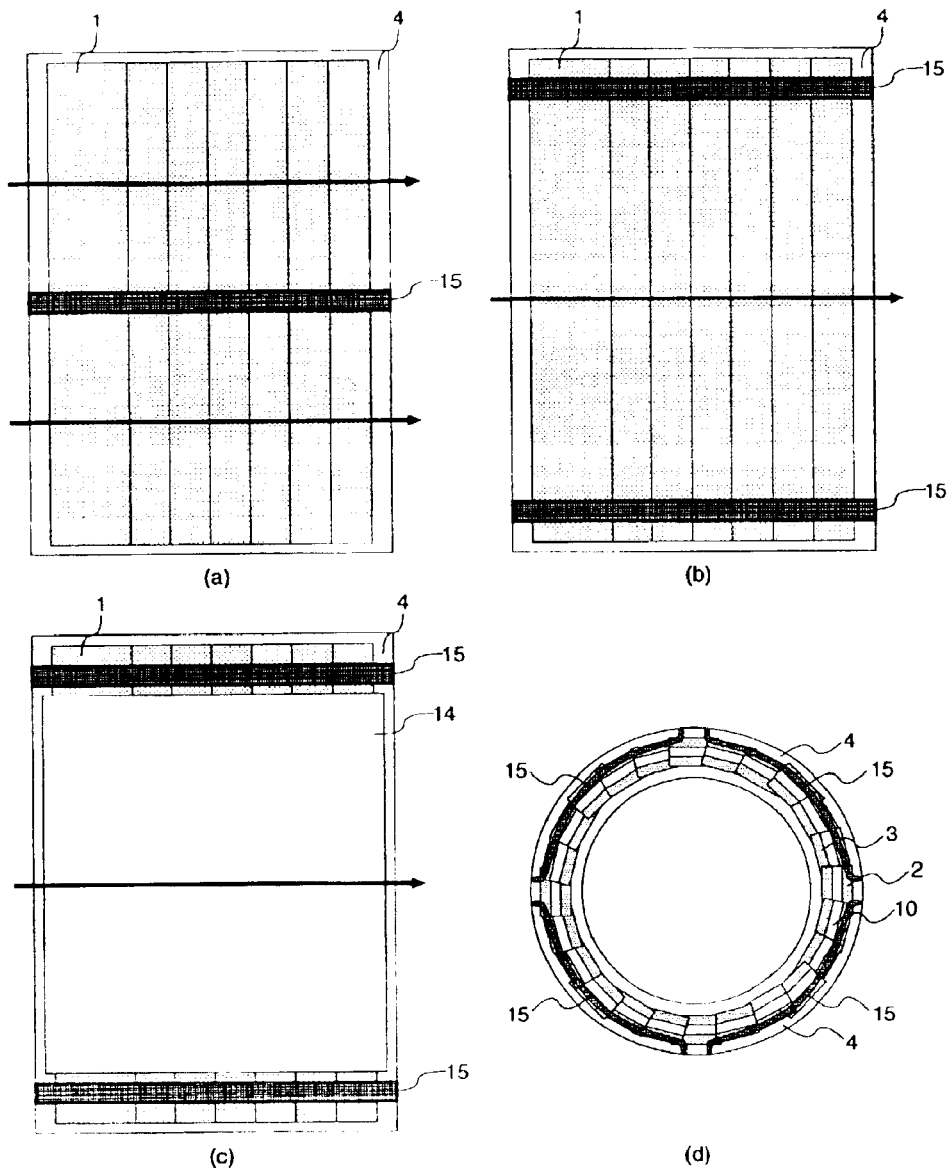
FIG. 30 is an explanation view for an overlapping type piezoelectric stator with guide rails.

Although it was described in the above about a stator 11 whose foundation 4 is fixed, and a stator 11 whose foundation 4 is bent horizontally against piezoelectric elements 1, the foundation 4 can be bent vertically against the piezoelectric elements 1 (refer to FIG. 30). However, there is a problem that the piezoelectric elements 1 get turned up from the foundation 4. It is explained here about a stator 11 having some guide rails 15 which press down the piezoelectric elements 1.

As shown in FIG. 30, the invention described in claim 10 is a stator 11 which has some guide rails 15 along the extension direction of piezoelectric elements 1. Note that the guide rail 15 is a plate or a bar made by an insulator like a plastic or metal by which the leather film was carried out, and it is soft enough. In a case of FIG. 30(a), a guide rail 15 is arranged at the center of piezoelectric elements 1. A contact area between the piezoelectric elements 1 and the guide rail 15 is small. When the piezoelectric elements 1 are elongated and shrinked, threfore, load resistance by friction between the guide rail 15 and itself is also small. Note that a slider 21 must touch either one of two surface electrodes 2 of the piexoelectric elements 1, which is divided by the guide rail 15, or it must straddle the guide rail 15, because the guide rail 15 is located in the center of the piezoelectric elements 1. In addition, both sides of the piezoelectric element 1 may be bent. In a case of FIG. 30(b), two guide rails 15 are arranged at both ends of the piezoelectric elements 1. A contact area between the piezoelectric elements 1 and the guide rails 15 becomes twice than one in a case of using one guide rail 15. When the piezoelectric elements 1 are elongated and shrinked, threfore, load resistance by friction between the guide rails 15 and itself also becomes large. However, there are no fear of the piezoelectric elements 1 getting turned up. In both cases, the slider 21 does not climb over the guide rails 15 if the slider 21 moves as shown in FIG. 5, FIG. 7 and FIG. 8. Therefore, the guide rails 15 play a role of moving the slider 21 along the extension direction. Moreover, supose that a ceiling plate 14 is arranged between two guide rails 15 shown in FIG. 30(b), as shown in FIG. 30(c). Even though a foundation 4 is bent, the slider 21 is not caught in the piezoelectric elements 1. Since the ceiling plate 14 is not also restrainded by the guide rails 15, the ceiling plate 14 can vibrate enough. Finally, the guide rails 15 can also press down the piezoelectric elements 1 arranged circularly. For example, in a case of using four guide rails 15, these guide rails 15 are arranged as shown in FIG. 30(d).

Figure 31:
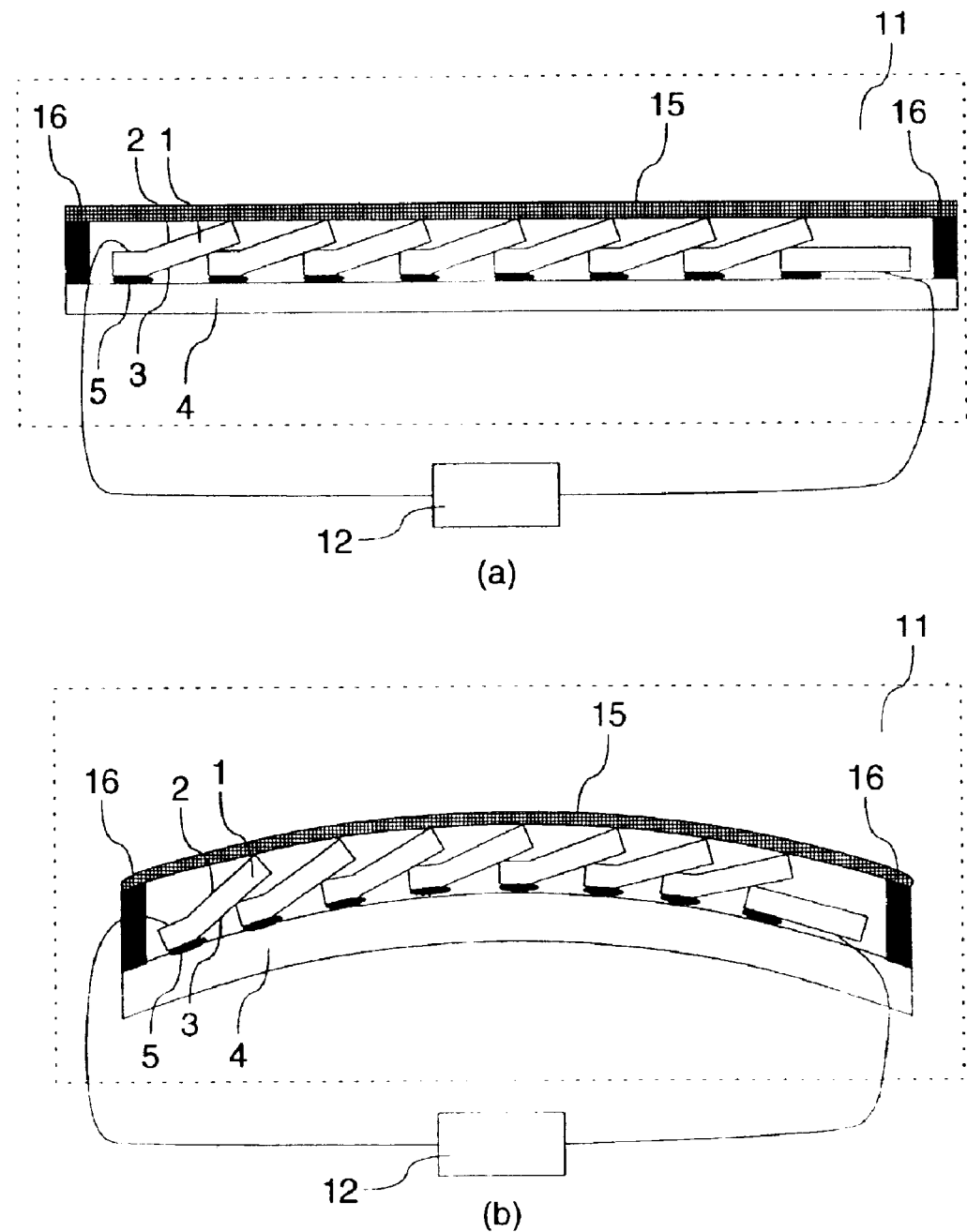
FIG. 31 is an explanation view in a case that an overlapping type piezoelectric stator with guide rails curves.
Figure 32:
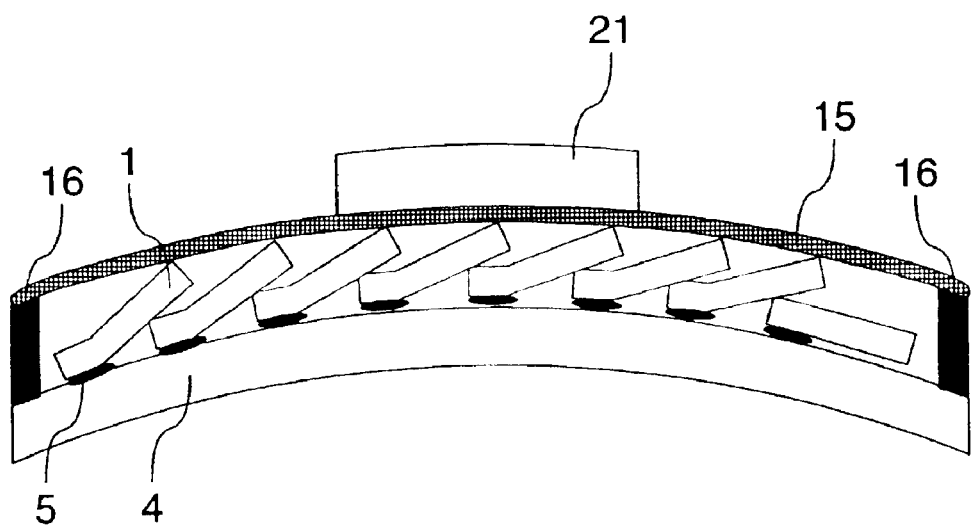
FIG. 32 is an explanation view in a case that a slider moves along an overlapping type piezoelectric stator, which is curving.

Now, as shown in FIG. 31(a), both ends of a guide rail 15 are attached to a foundation 4 by two attachments of guide rail 16. Suppose that the guide rail 15 presses down the piezoelectric elemetns 1, a surface electrode 2 and a back electrode 3 of the piezoelectric element 1 strongly contact to a back electrode 3 and a surface electrode 2 of the adjacent piezoelectric elements 1, respectively, without weight of a slider 21. A drive device 12 therefore certainly applies a saw-tooth wave to all of the piezoelectric elements 1 on a stator 11. Moreover, suppose that the slider 21 curves as shown in FIG. 31(b). The surface electrode 2 and the back electrode 3 of the piezoelectric element 1 can contact strongly to the back electrode 3 and the surface electrode 2 of the adjacent piezoelectric elements 1, respectively, without each piezoelectric element 1 getting turned up. As shown in FIG. 32, thus, the stator 11 can move even a slider 21 whose bottom is curving. Of course, the stator 11 can become round like a drum. Therefore, the slider 21 can rotate around the stator 11.

It has been described in the above about the relation between a drive device 12 generating a saw-tooth wave and a stator 11 moving a slider 21. The relation mainly showed that the stator 11 moves the slider 21 in one direction.

However, if only one stator 11 is used, it is difficult for the stator 11 to apply large friction power to the slider 21, and moreover it becomes easy to produce unevenness in operation of the stator 11. Referring to a case of using a stator 11 shown in FIG. 3, it is explained here about the relation of wiring between a drive device 12 and the stator 11. Note that it is also similar for some piezoelectric elements 1 to rotate a spherical rotor 35, as shown in FIG. 16.

Figure 33:
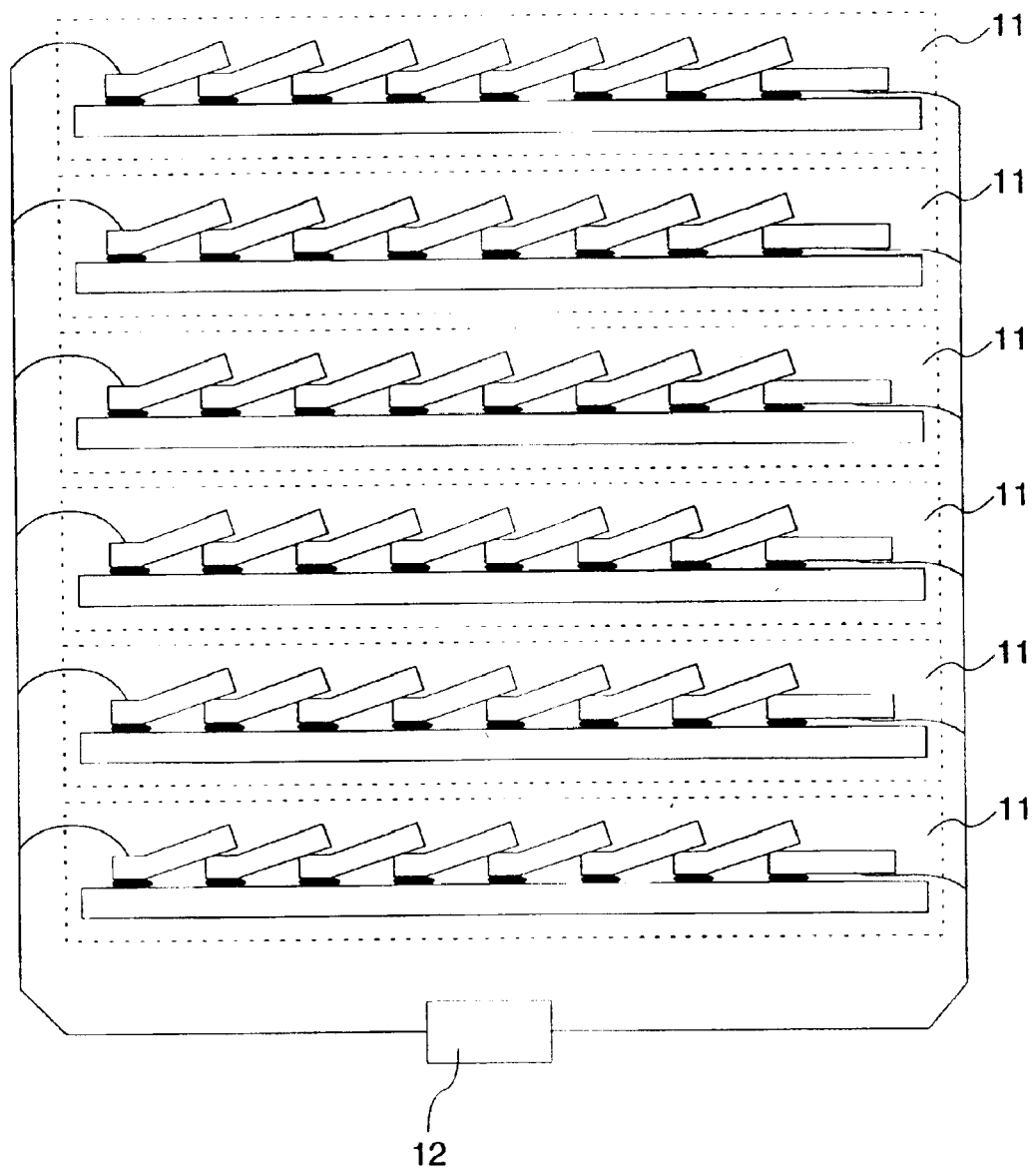
FIG. 33 is an explanation view in a case that a drive device gives the same saw-tooth wave to all stators.

As shown in FIG. 33, the invention described in claim 16 is an overlapping type piezoelectric actuator whose stators 11 are connected in parallel. A drive device 12, therefore, can apply the same saw-tooth wave to all of the stators 11. That is, all piezoelectric elements 1 of the stators 11 can be elongated and shrinked simultaneously. These stators 11 then can apply large friction power to a slider 21 at the same timing.

Figure 34:
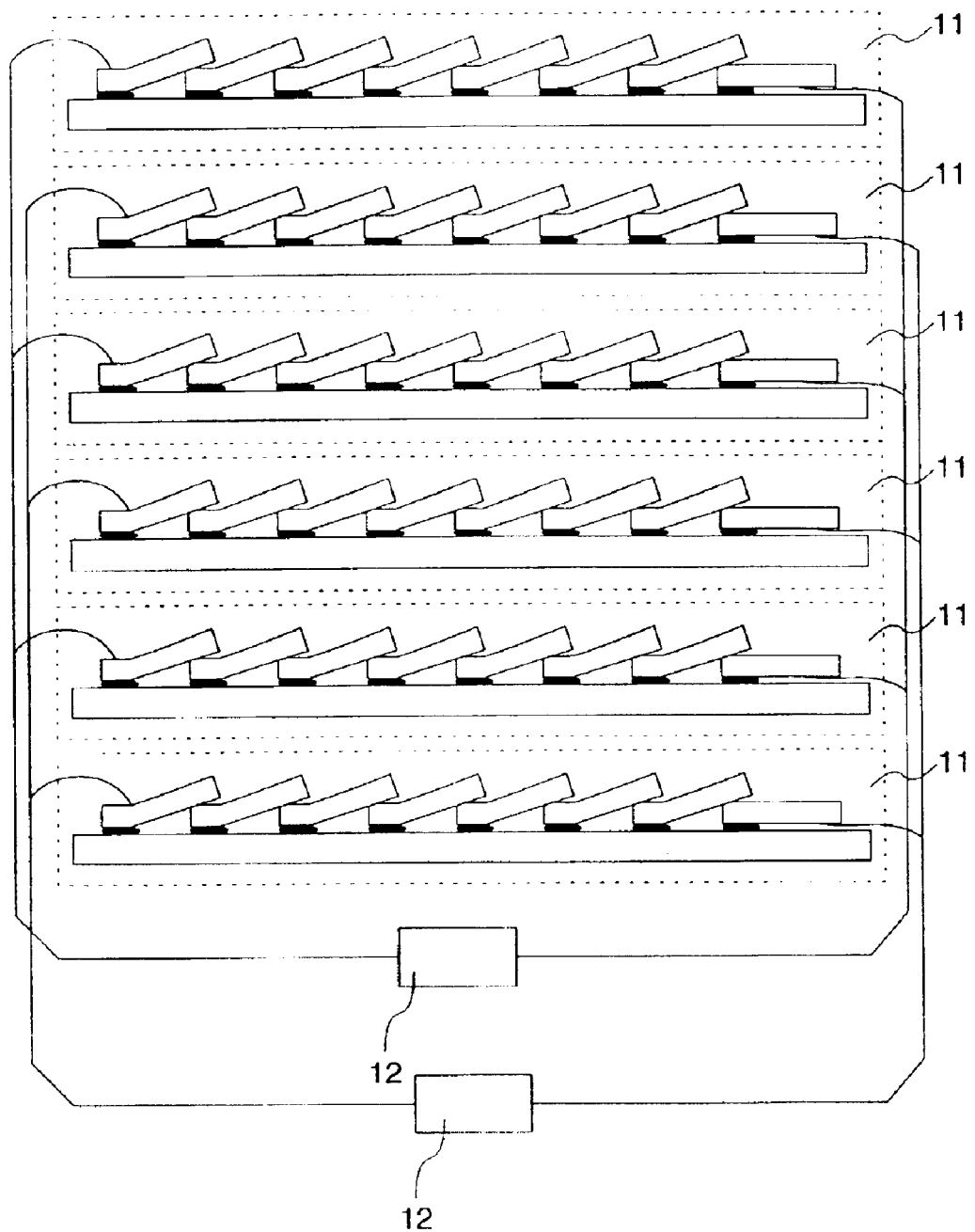
FIG. 34 is an explanation view in a case that two drive device give the different phases of saw-tooth waves to two set of stators.

As shown in FIG. 34, the invention described in claim 17 is an overlapping type piezoelectric actuator which has two overlapping type piezoelectric actuators like FIG. 33, where two drive devices 12 generate two saw-tooth waves whose phases shift 180 degrees. When either one of two set of piezoelectric elements 1 is shrinked, another set of the piezoelectric elements 1 is elongated. Stress generated by the shrinked piezoelectric elements 1, therefore, is seldom conducted to a slider 21. FIG. 34 shows that all stators 11 are divided into two sets. If the number of drive devices 12 and the number of sets of stators 11 increase, the stators 11 can generate stress without intermission. The stators 11 therefore can move a slider 21 smoothly. Note that phases of some saw-tooth waves generated by some drive device 12 shift at a fixed rate, according to the number of the drive device 12.

Figure 35:
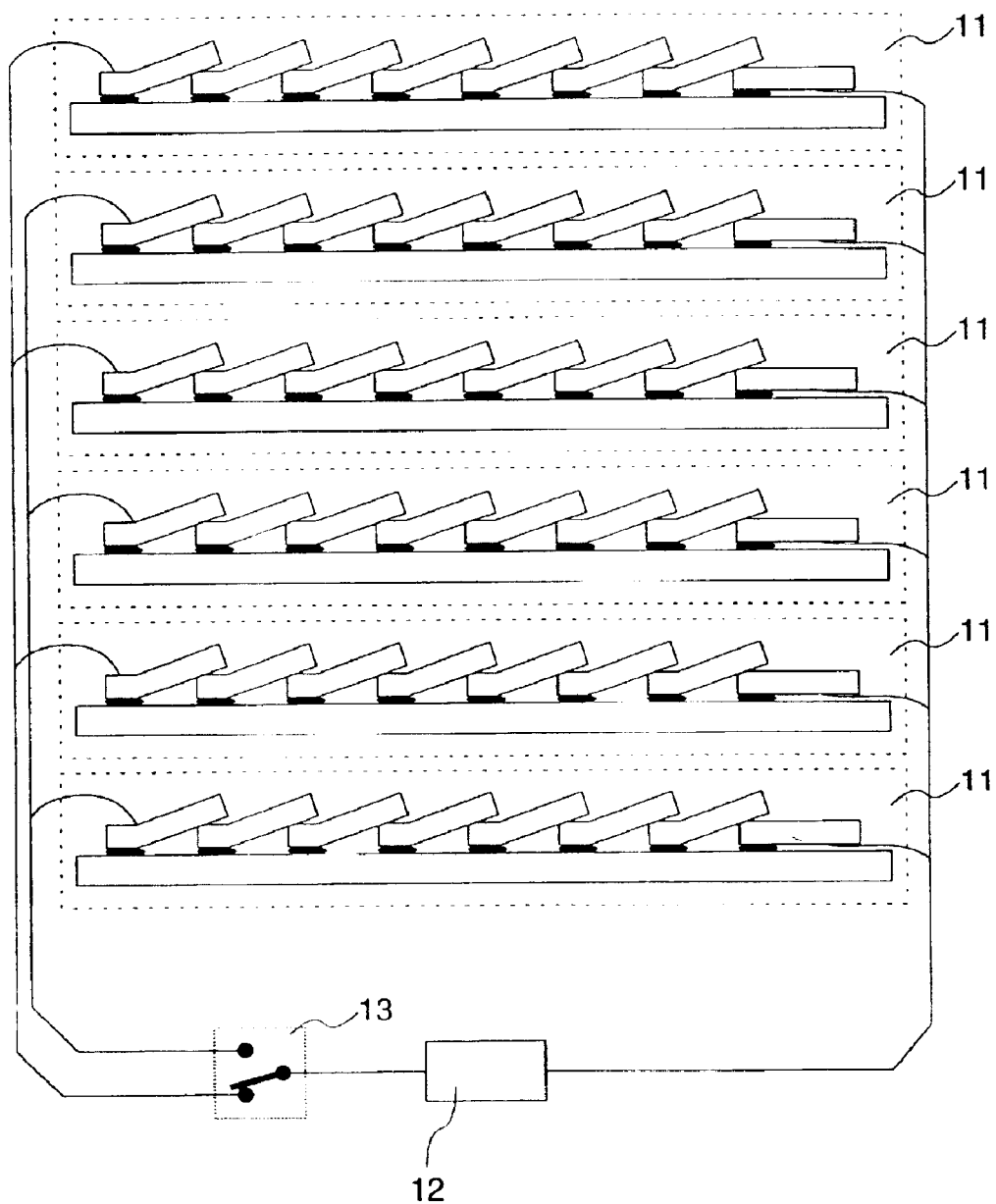
FIG. 35 is an explanation view in a case that a drive device gives the same saw-tooth wave to either of two set of stators.

As shown in FIG. 35, the invention described in claim 18 is an overlapping type piezoelectric actuator whose stators 11 are divided into two sets, where a drive device 12 applies a saw-tooth wave to either one set by a switch 13. Since either one set of piezoelectric elements 1 generates stress, only a half of all stators 11 can apply friction power to a slider 21. FIG. 35 shows that all stators 11 are divided into two sets. Suppose here that all stators 11 are divided into many sets. The stators 11 can also apply friction power only a part of the slider 21 by switching the switch 13 in order to apply the saw-tooth wave to some selected sets. Of course, the stators 11 can also change delicately the magnitude of the friction power applied to the slider 21. In a case of moving the slider 21 finely, thus, the overlapping type piezoelectric actuator is effective.

Note that some stators 11 shown in FIG. 33, FIG. 34 and FIG. 35 are assumed to flip off a slider 21 in the extension direction. Of course, however, even a stator 11 shown in FIG. 6 can move a slider 21, where the slider 21 is moved in the opposite direction.

It has been described in the above about a driving method of some stators 11. It is explained here about arrangement of some stators 11 shown in FIG. 33, FIG. 34 and FIG. 35, where some arrows shown in FIG. 36, FIG. 37, FIG. 38 and FIG. 39 represent the extension direction of piezoelectric elements 1.

Figure 36:
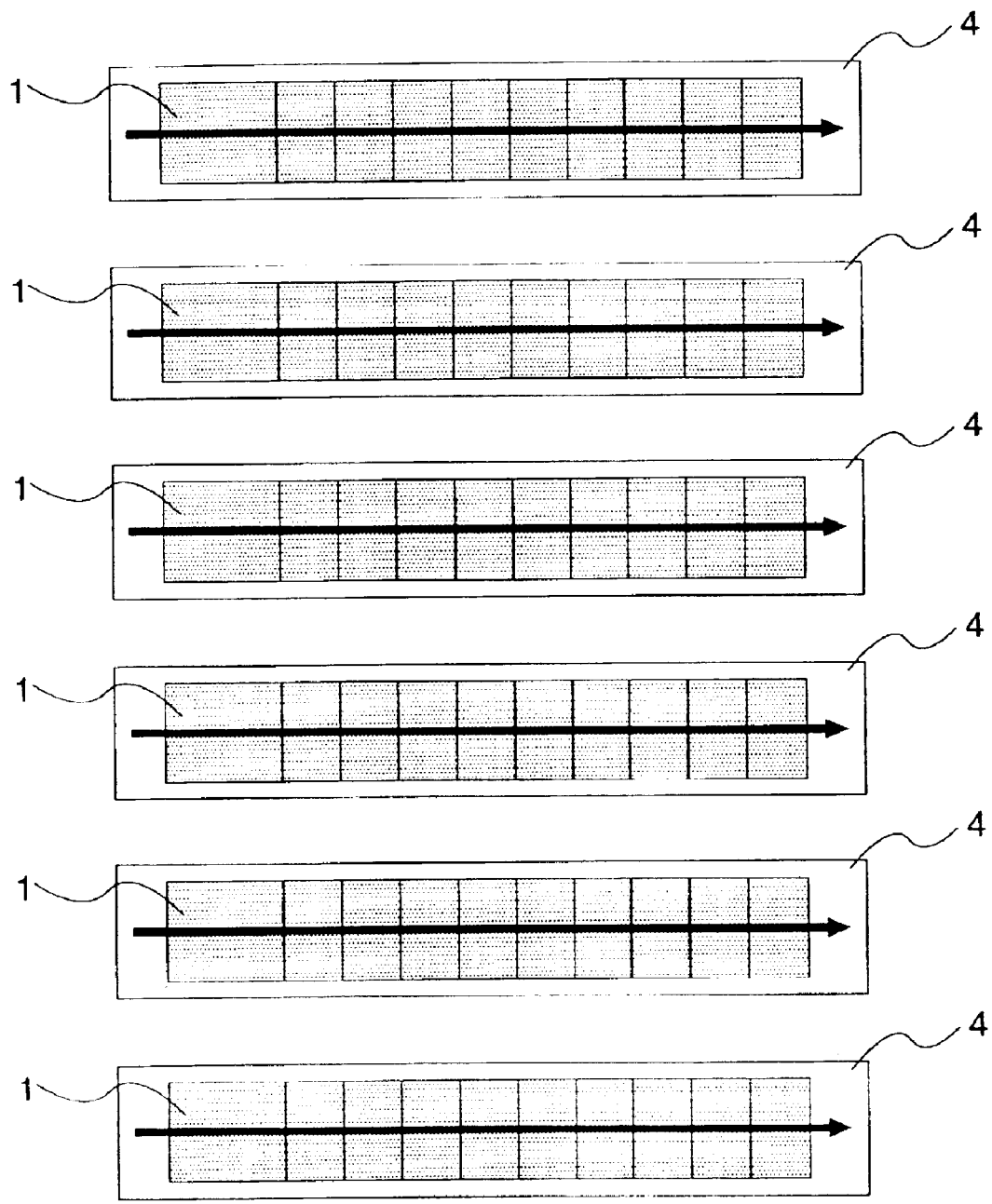
FIG. 36 is an explanation view in a case that some stators turning to the same direction are arranged in parallel.
Figure 37:
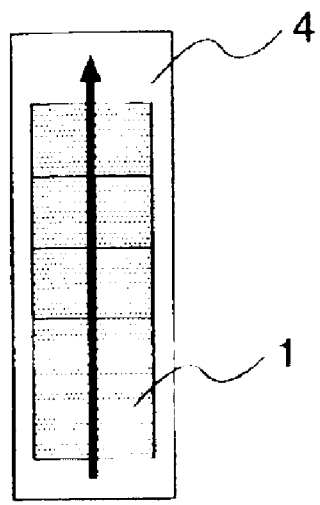
FIG. 37 is an explanation view in a case that some stators turning to the same direction are arranged in series.
Figure 37:
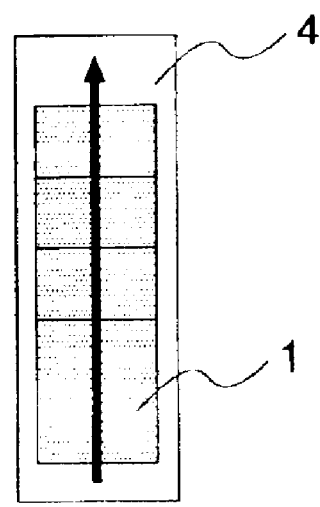
Figure 37:
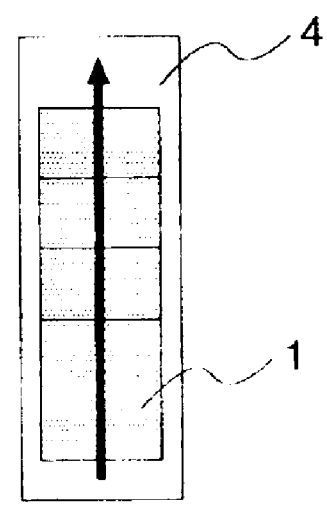

The invention described in claim 19 is an overlapping type piezoelectric actuator which is arranged as shown in FIG. 36 and FIG. 37. Suppose here that some stators 11 are wired as shown in FIG. 33. Since all piezoelectric elements 1 generate stress in the same direction simultaneously, the overlapping type piezoelectric actuator can add together friction powers of all stators 11. Suppose also that some stators 11 are wired as shown in FIG. 34. Since some piezoelectric elements 1 of two sets of stators 11 generate stress in the same direction by turns, the overlapping type piezoelectric actuator can move a slider 21 smoothly.

Figure 38:
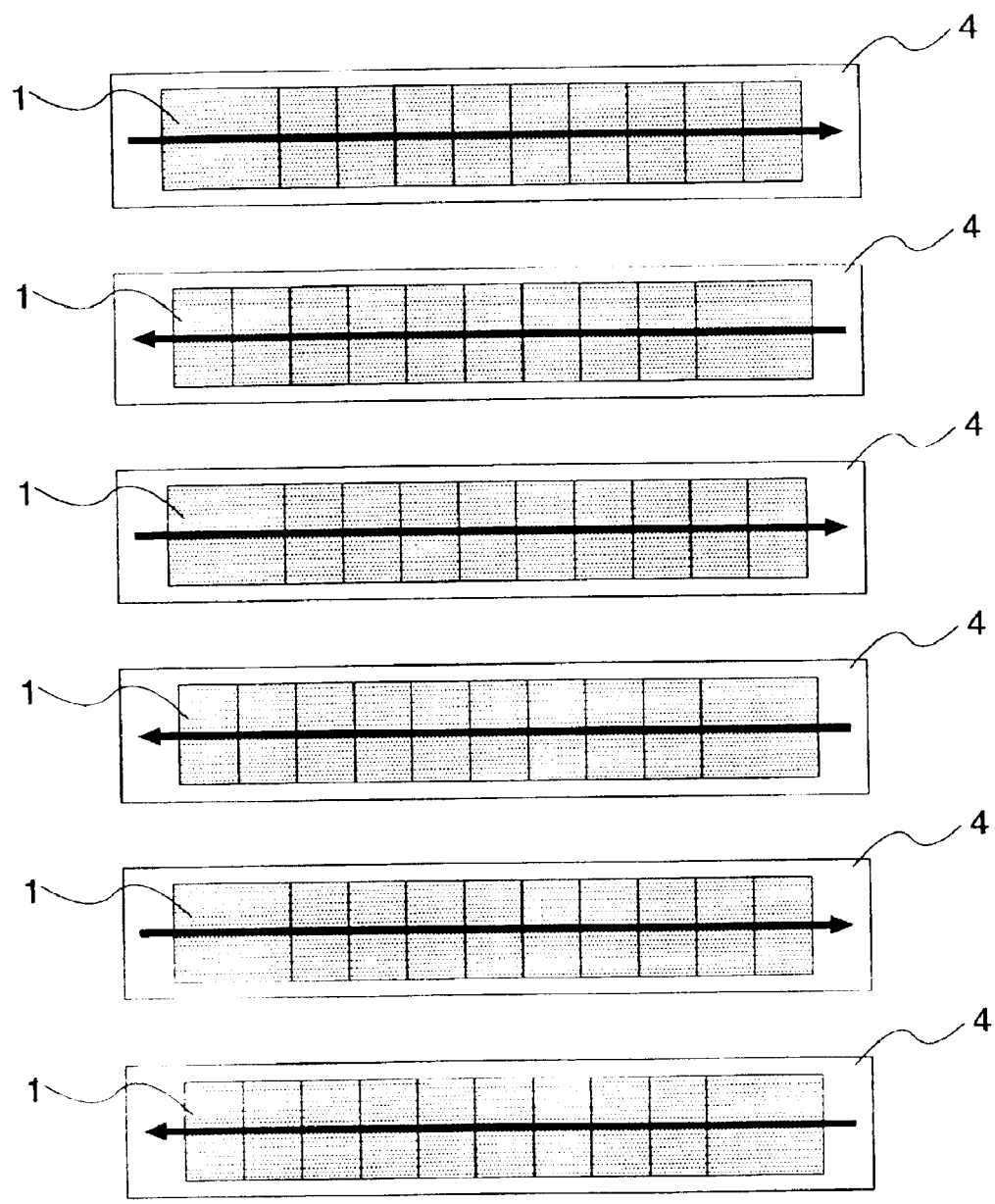
FIG. 38 is an explanation view in a case that some stators turning to the opposite direction by turns are arranged in parallel.
Figure 39:
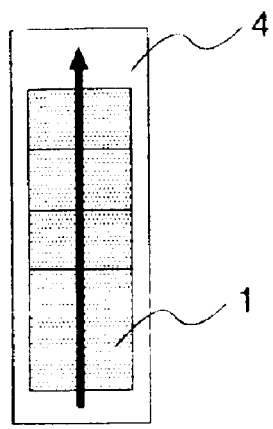
FIG. 39 is an explanation view in a case that some stators turning to the opposite direction by turns are arranged in series.
Figure 39:
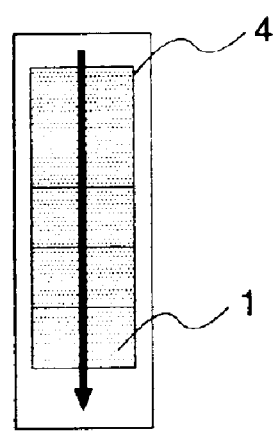
Figure 39:
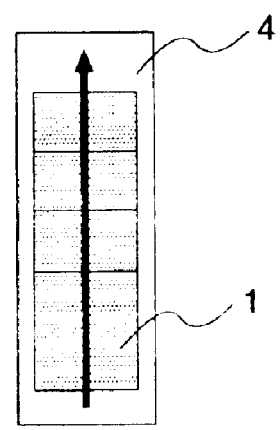

The invention described in claim 20 is an overlapping type piezoelectric actuator which is arranged as shown in FIG. 38 and FIG. 39. As is clear by FIG. 3, it can not necessarily be said that friction power applied to a slider 21 in a case that a piezoelectric element 1 is elongated coincidence with friction power applied to the slider 21 in a case that the piezoelectric element 1 is shrinked, even though the piezoelectric element 1 generates the same stress during being elongated and shrinked. In a case that the length of piezoelectric element 1 in the extension direction is long, and moreover a contact area with some skids 8 is large, these two friction powers are the almost same, but such condition can not always be satisfied in any use. Suppose that some stators 11 having the same number of piezoelectric elements 1 are arranged as shown in FIG. 35. Since the piezoelectric elements 1 in two sets of stators 11 generate stress in the opposite direction by turns, the overlapping type piezoelectric actuator can move the slider 21 by the same friction power in each direction.

Note that some stators 11 shown in FIG. 36, FIG. 37, FIG. 38 and FIG. 39 are linear. Of course, similarly to FIG. 37 and FIG. 39, some stators 11 are arranged on the same circle. In addition, similarly to FIG. 36 and FIG. 38, some stators 11 are arranged on the same circle. Furthermore, as shown in FIG. 33, FIG. 34 and FIG. 35, a drive device 12 can apply some saw-tooth waves with suitable phases to these stators 11 if needed. Similarly to FIG. 14 and FIG. 16, the stators 11 can rotate a circular rotor 31 and a spherical rotor 35. The circular rotor 31 and the spherical rotor 35 therefore can output arbitrary torque, respectively, according to the number of the stators 11 and performance of the drive device 12.

Figure 40:
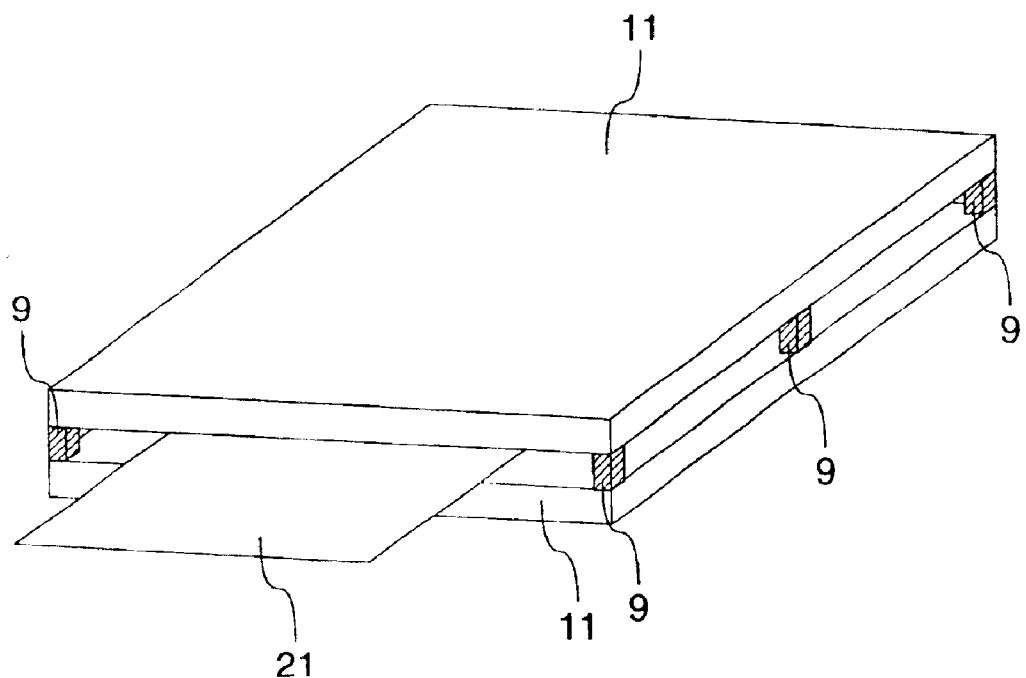
FIG. 40 is an explanation view for a sheet conveyance equipment in which two overlapping type piezoelectric stators face each other as a slider is put between them.
Figure 41:
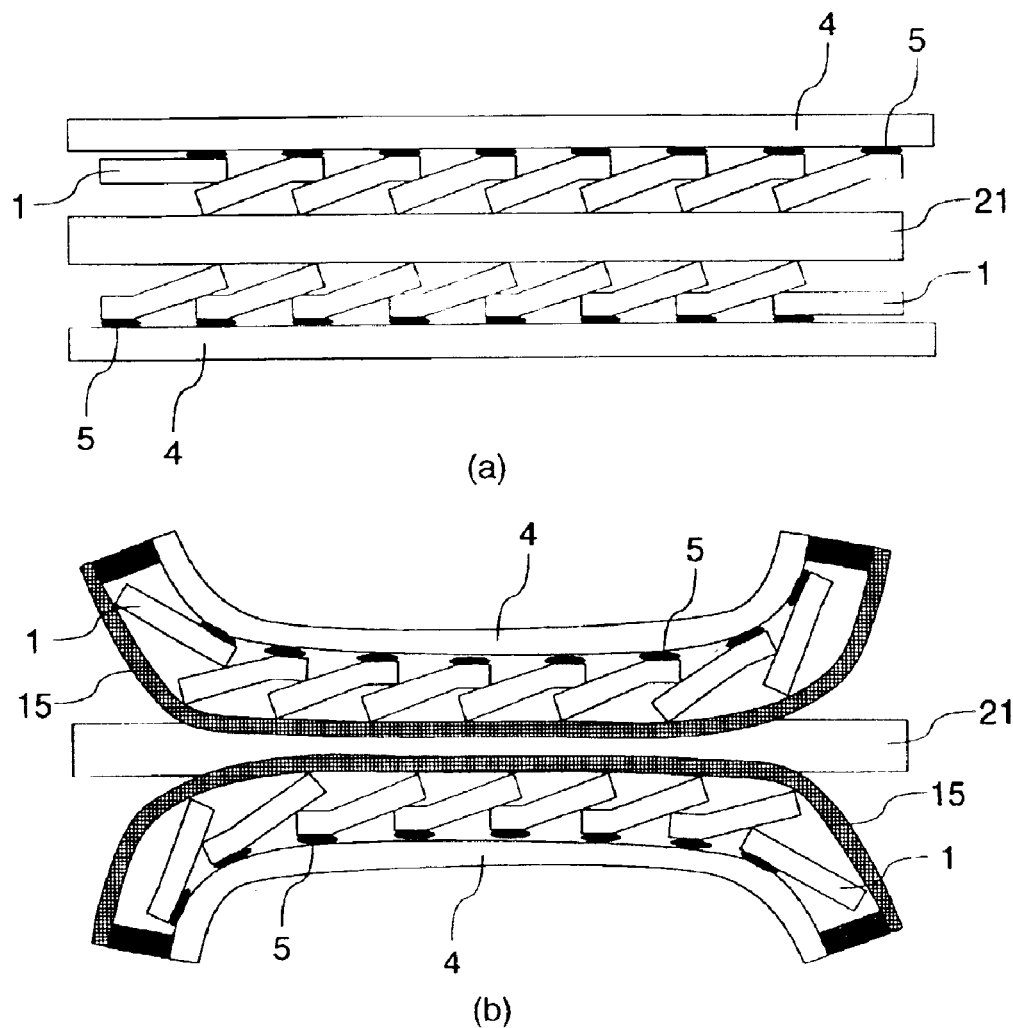
FIG. 41 is an explanation view for a sheet conveyance equipment in which two opposite overlapping type piezoelectric stators are arranged as their extension directions become opposite.

By the way, instead of arranging some stators 11 on the same plane, suppose that two stators 11 are stacked as piezoelectric elements 1 face each other, as shown in FIG. 40, and these stators 11 are fixed by some spacers 9. A slider 21 can receive friction powers from the upper and lower sides. The invention described in claim 21 is an overlapping type piezoelectric actuator whose two stators 11 are arranged as a slider 21 is put between them, as shown in FIG. 41. Note that an angle, which is made by extension directions of piezoelectric elements 1 in some sliders 21 each other, may be within 0 degree to 180 degrees. In a case of FIG. 41(a), an angle, which is made by extension directions of piezoelectric elements 1 in two sliders 21, is 180 degrees. Suppose here that a positive voltage and a negative voltage shown in FIG. 4 are applied by drive devices 12 to stators 11. The piezoelectric elements 1 in the stators 11 can apply friction power to a slider 21 in the same direction. In addition, since extension directions of the piezoelectric elements 1 in these stators 11 are opposite, the slider 21 can move equally to any direction if performances of these stators 11 are equal. Of course, in a case that an angle, which is made by extension directions of piezoelectric elements 1 in two sliders 21, is 0 degree, the slider 21 can receive strong friction power along the extension direction. Moreover, suppose that at least one guide rail 15 is attached to each of two foundations 4, respectively, as shown in FIG. 41(b). Even before a slide 21 is put between some piezoelectric elements 1 fixed on these foundations 4, the piezoelectric elements 1 fixed on the upper foundation 4 do not separate from the foundation 4. In addition, the slider 21 can be inserted smoothly between some piezoelectric elements 1 fixed on these foundations 4, by curving both sides of them.

It has been described in the above about stators 11, a slider 21, a circular rotor 31 and a drive device 12 of which an overlapping type piezoelectric actuator consists, and arrangement and wiring of the stators 11. Referring to the drawings, it is explained here about some applications of an overlapping type piezoelectric actuator.

Figure 42:
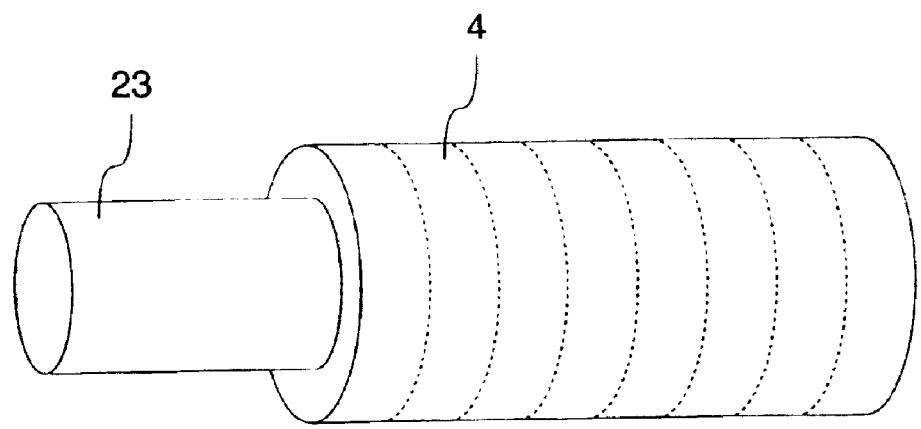
FIG. 42 is an explanation view for a cylinder whose stators are rounded in cylinder form.
Figure 42:
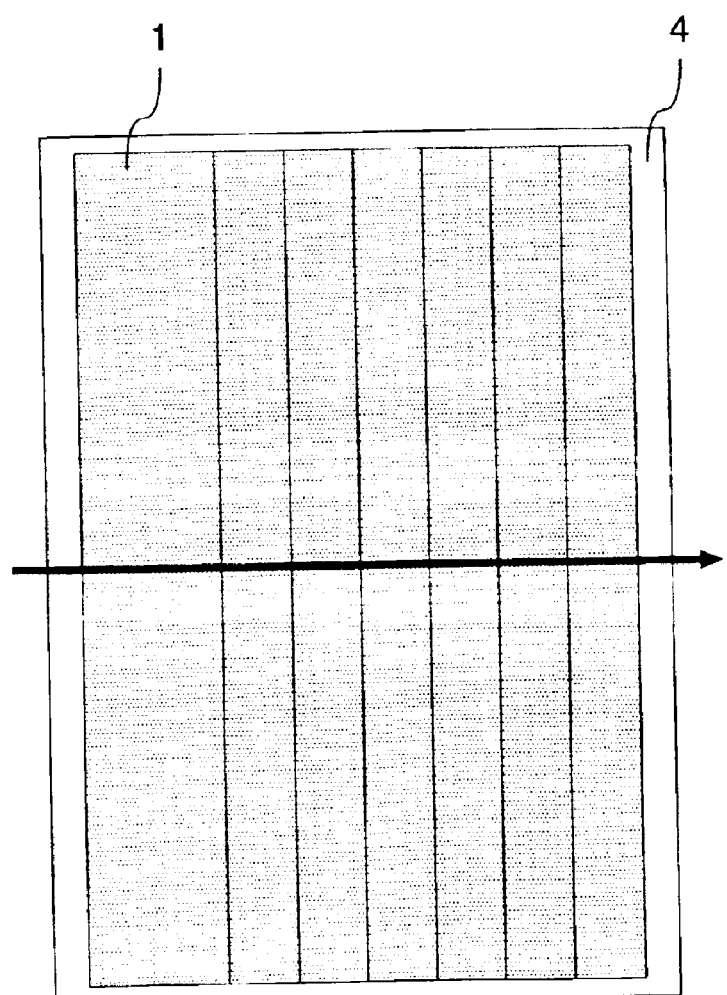

Suppose that a foundation 4 on which some wide piezoelectric elements 1 shown in FIG. 42(*b*) are fixed is rounded cylindrically as shown in FIG. 42(*a*), where the foundation 4 is made from a soft material like a rubber or a synthetic resin. A cylinder using an overlapping type piezoelectric actuator can reciprocate a pillar slider 23 inside a cylindrical foundation 4. Note that a drive device 12 and wiring are omitted in FIG. 42 (refer to FIG. 33, FIG. 34 and FIG. 35). Each piezoelectric element 1 fixed on the cylindrical foundation 4 is not fixed to the adjacent piezoelectric elements 1. Therefore, if all piezoelectric elements 1 are fixed on the foundation 4 as the piezoelectric elements 1 have a margin around them, the cylindrical slider 21 can be transformed freely. Note that a wide stator 11 can consist of some stators 11, by combining these stators 11 as shown in FIG. 36 and FIG. 38, while FIG. 42(*b*) shows a wide foundation 4. Here, width of all piezoelectric elements 1 fixed on the foundations 4 of some stators 11 constructing this stator 11 is narrow. If some piezoelectric elements 1 shown in FIG. 42(*b*) are used, the piezoelectric elements 1 can curve greatly. If these foundations 4 are, thus, rounded cylindrically, a cylinder consisting of the foundations 4 and a pillar slider 23 becomes more flexible. In a case that the pillar slider 23 is made by a strong but soft material like a wire and a glass fiber, and the cylinder is transformed freely, the cylinder can reciprocate the pillar slider 23 even though the cylinder is curved.

Figure 43:
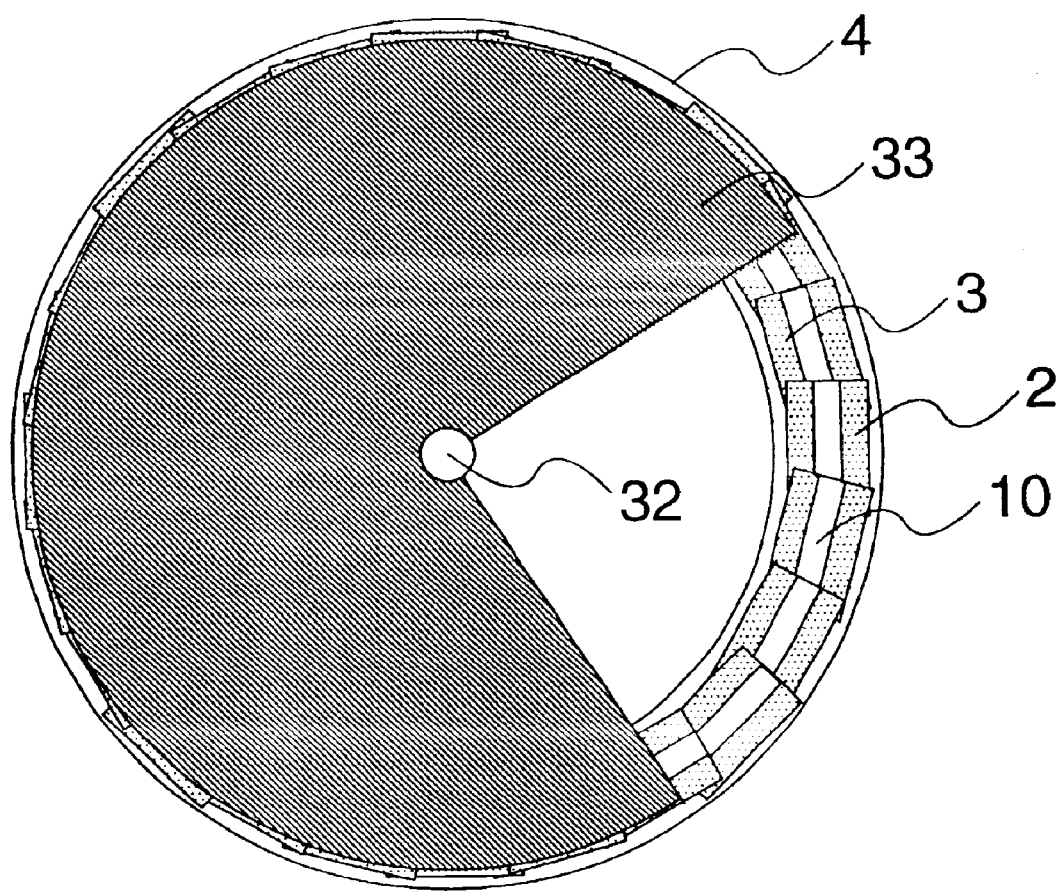
FIG. 43 is an explanation view for a thin vibrator consisting of an overlapping type piezoelectric actuator with an arc rotor.
Figure 44:
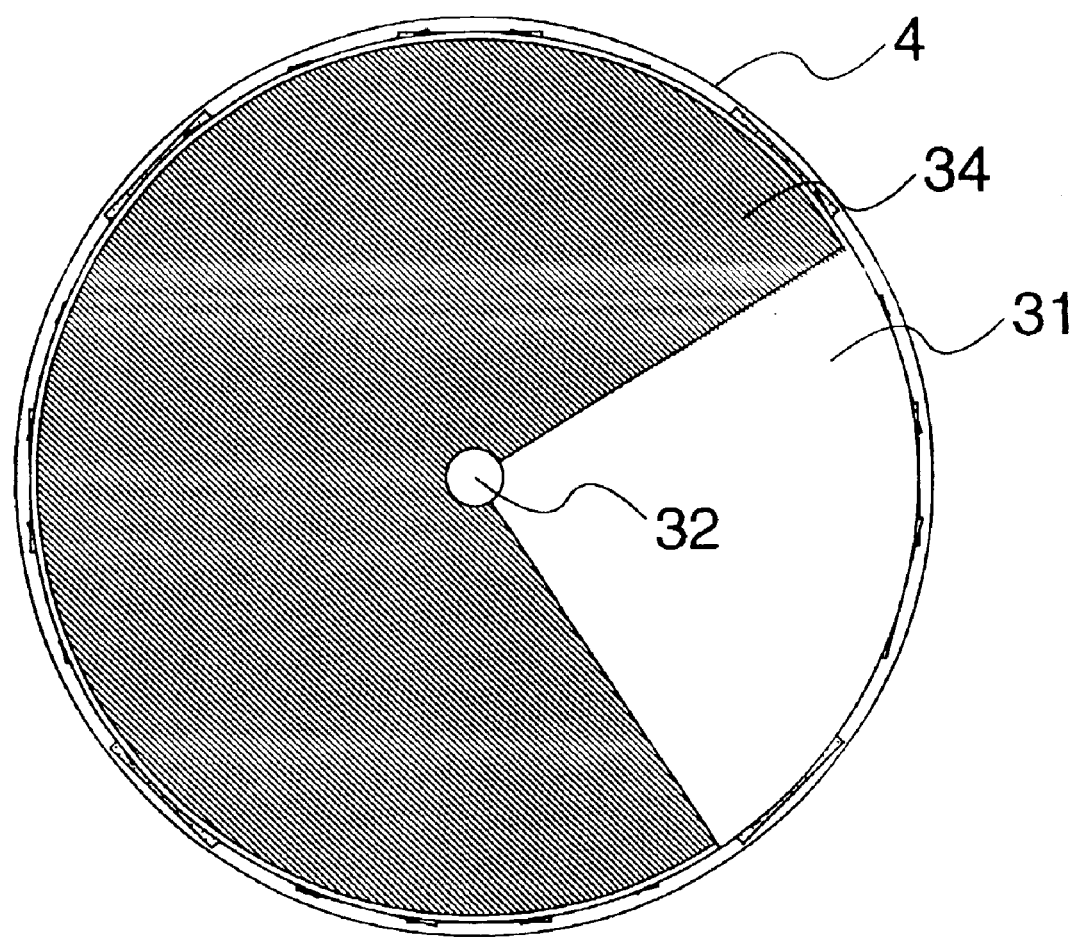
FIG. 44 is an explanation view for a thin vibrator consisting of an overlapping type piezoelectric actuator in whose circular rotor an arc weight is attached.

As shown in FIG. 43, a vibrator using an overlapping type piezoelectric actuator is the same as an overlapping type piezoelectric actuator like FIG. 14, a part of whose circular rotor 32 is cut off. Note that a stator 11 rotating a circular rotor 31 on low voltage is adopted in FIG. 43 because some surface electrodes 2 and some back electrodes 3 of adjacent piezoelectric elements 1 are arranged on a foundation 4 as not making a short circuit by an insulated domain 10, as shown in FIG. 15. In addition, a drive device 12 and wiring are omitted in FIG. 43 (refer to FIG. 33, FIG. 34 and FIG. 35). The circular rotor 31 cut off becomes an arc rotor 33 whose circumference is within 1 degree to 359 degree. Since a gravity center of the arc rotor 33 does not coincide with a center of an axis of rotation 32, the arc rotor 33 rotates vibrating. Since structure of the invention is very simple, and the invention does not need any coil and any brush, a maker can make a thin and light vibrator. However, some piezoelectric elements 1 do not touch the arc rotor 33 because the invention uses the arc rotor 33. Therefore, the shorter the circumference of the arc rotor 33 becomes, the worse the vibrator rotates the arc rotor 33. Suppoes then that a weight 34 is put on the circular rotor 31 as shown in FIG. 44. The vibrator using the overlapping type piezoelectric actuator can rotate the circular rotor 31 effectively. Note that a drive device 12 and wiring are omitted in FIG. 44 (refer to FIG. 33, FIG. 34 and FIG. 35). It is hoped that form of the weight 34 is like a fan, in order for variation of loads for all piezoelectric elements 1 to become as small as possible.

Figure 45:
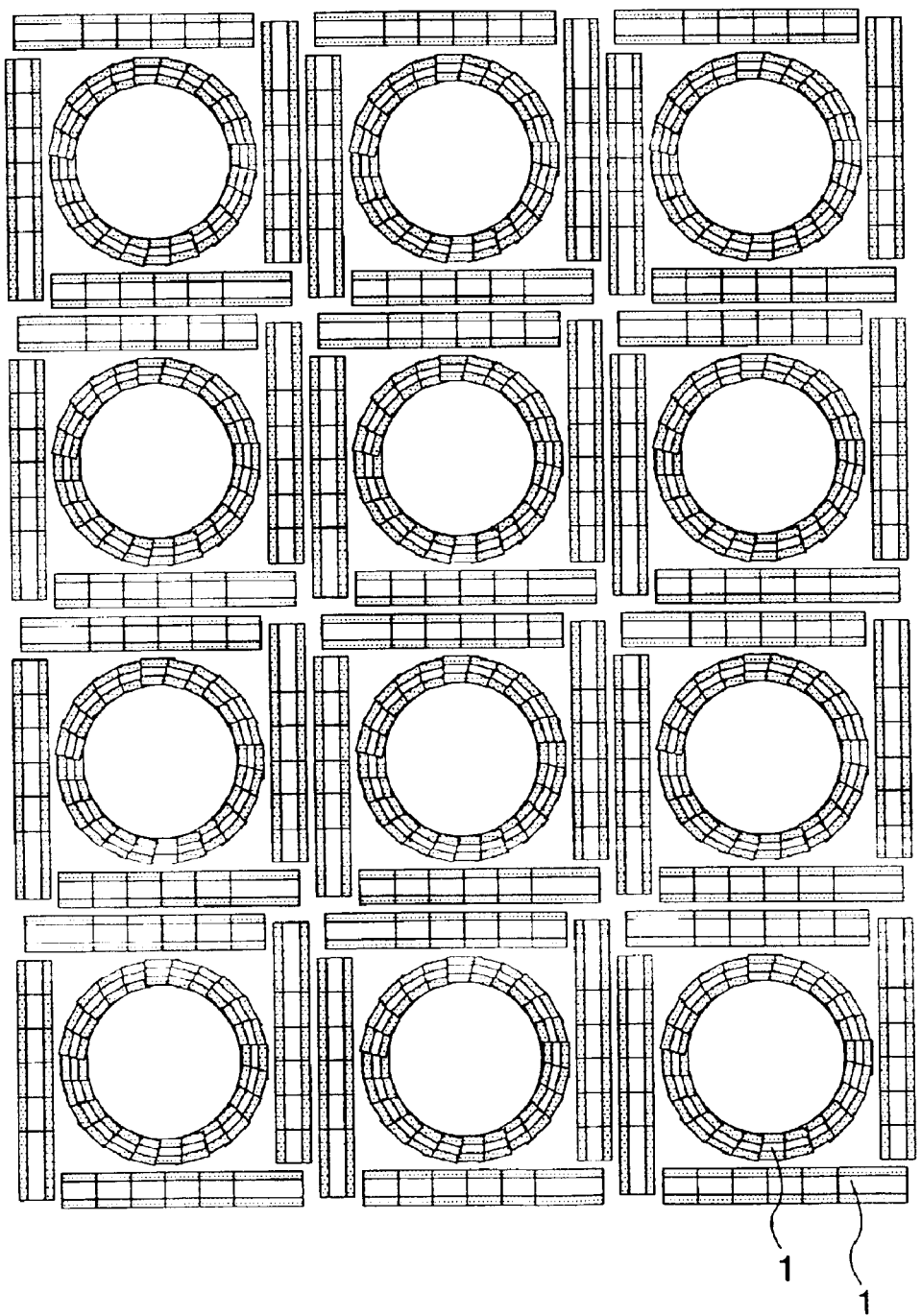
FIG. 45 is an explanation view for a table which can move an object vertically and horizontally, and rotate it.

As shown in FIG. 45, a moving table using stators 11 is arranged some three degree-of-freedom stators 11 like FIG. 21 on a plane. At least three drive devices 12 apply sawtooth waves to all stators 11, by combining wiring shown in FIG. 33, FIG. 34 and FIG. 35 suitably. Note that the drive devices 12 and the wiring are omitted in FIG. 45. If a slider 21 is put on the invention, the slider 21 can move vertically and horizontally, and moreover it can rotate clockwisely and counter-clockwisely at any place.

Figure 46:
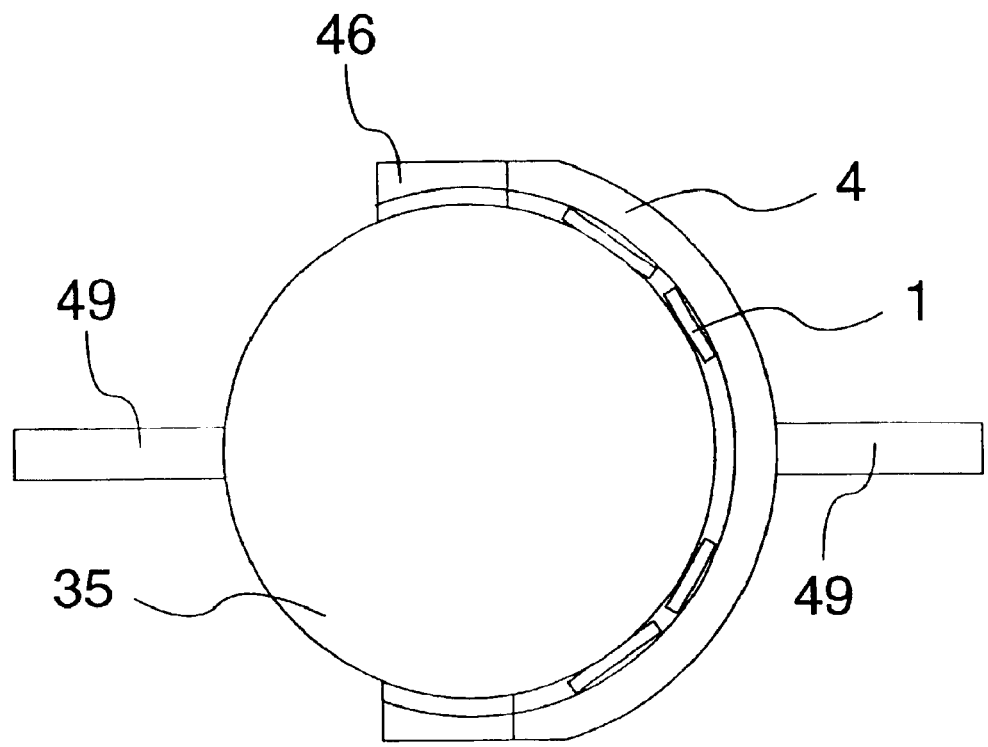
FIG. 46 is an explanation view for a three-degree-of-freedom joint using an overlapping type piezoelectric actuator.

As shown in FIG. 46, a joint using a multi-degree-of-freedom piezoelectric actuator is based on a multi-degree-of-freedom piezoelectric actuator in FIG. 16, to whose spherical rotor 35 and foundation 4 some (now two) props 49 are attached, where the spherical rotor 35 is held by a support stator 46 as it does not separate. Note that a drive device 12 and wiring are omitted in FIG. 46 (refer to FIG. 33, FIG. 34 and FIG. 35). Suppose that a contact area between the support stator 46 and the foundation 4 of a stator 11 is processed as the support stator 46 can be inserted in the foundation 4, otherwise a screw is shaved in the contact area between the support stator 46 and the foundation 4. The support stator 46, then, is fixed on the foundation 4. Since a maker of the joint can remove the support stator 46 from the foundation 4, he can exchange easily some parts of the joint and repair the joint.

Figure 47:
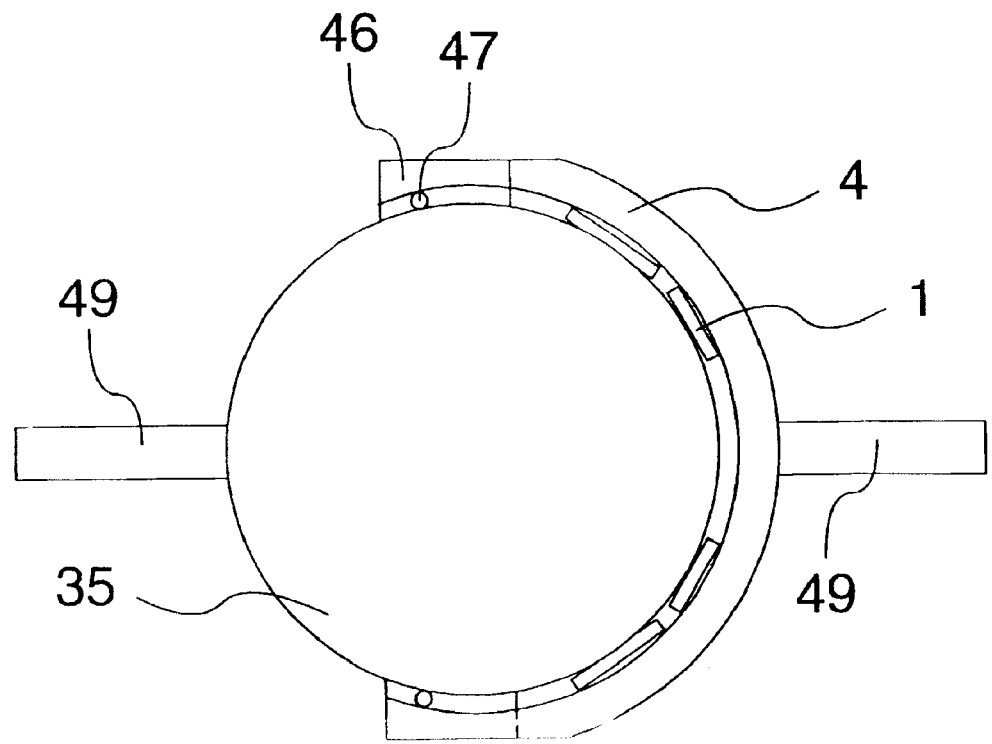
FIG. 47 is an explanation view for a three-degree-of-freedom joint using an overlapping type piezoelectric actuator, whose spherical rotor is held by some bearing balls.

Suppose that some bearing balls 47 embedded in a support stator 46 hold a spherical rotor 35 as shown in FIG. 47. A joint using a multi-degree-of-freedom piezoelectric actuator suppresses vibration of the spherical rotor 35, and moreover the bearing balls 47 can stick the spherical rotor 35 to piezoelectric elements 1 of stators 11. In a case that some (now two) props 49 are attached to the spherical rotor 35 and the foundation 4, the spherical rotor 35 can separate easily from the stators 11 because a gravity center of the spherical rotor 35 is different from the center point of the spherical rotor 35. Suppose here that the bearing balls 47 are embedded in the support stator 46. The bearing balls 47 can support the spherical rotor 35 and friction coefficient between the support stator 46 and the spherical rotor 35 can be omitted.

Figure 48:
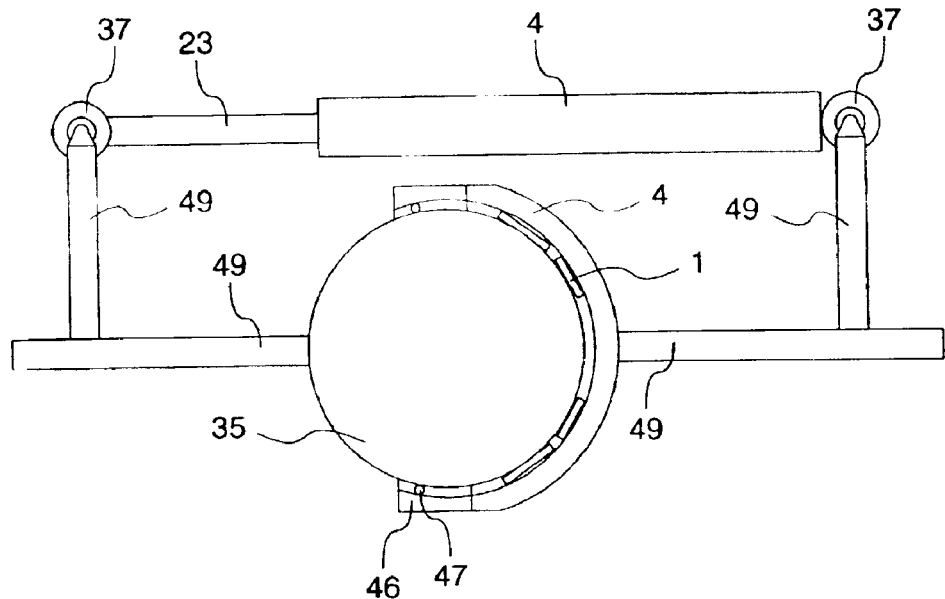
FIG. 48 is an explanation view for a three-degree-of-freedom joint using a cylinder and an overlapping type piezoelectric actuator.
Figure 49:
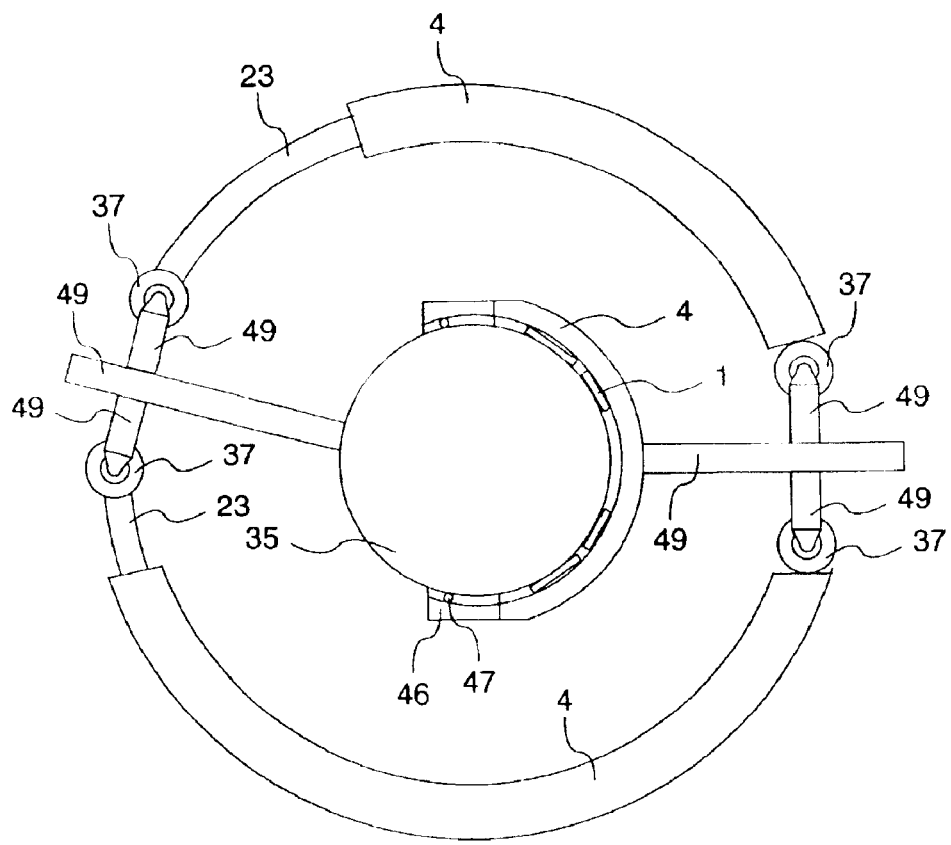
FIG. 49 is an explanation view for a three-degree-of-freedom joint using two arc cylinder and an overlapping type piezoelectric actuator.

By the way, in two joints shown in FIG. 46 and FIG. 47, since only piezoelectric elements 1 attached to a foundation 4 hold a spherical rotor 35 by friction power, the spherical rotor 35 may rotate easily by external power. The joints, therefore, are not suitable for applications desiring large torque like a knee joint of a robot. As shown in FIG. 48, a joint using a multi-degree-of-freedom piezoelectric actuator and an overlapping type piezoelectric actuator can reinforce required torque, by having an overlapping type piezoelectric cylinder. Two bearings 37 are attached to a foundation 4 and a pillar slider 23 of the cylinder, respectively, and moreover a props 49 is attached to each bearing 37. In addition, these props 49 are attached each prop 49 of the joint, respectively. In a case that commercial ball bearings are used as the bearing 37, and the foundation 4 of the cylinder is attached to an outer wheel of the bearing 37, a prop 49 is attached to an inner wheel. On the other hand, in a case that the foundation 4 of the cylinder is attached to the inner wheel of the bearing 37, the prop 49 is attached to the outer wheel of the bearing 37. It is also similar in a case of the pillar slider 23 of the cylinder. The cylinder can be elongated and shrinked in spite of an angle which is made by the props 49 of the joint, by using these bearings 37. Here, when a transformable material is used as the foundation 4 and the pillar slider 23 of the cylinder, the joint can operate flexibly. When the foundation 4 and the pillar slider 23 of the cylinder has been formed in the shape of an arc for a center of the spherical rotor 35 of the joint, the pillar slider 23 of the cylinder can move smoothly inside the foundation 4 of the cylinder. Suppose here that some (now two) cylinders are arranged as they face each other on a concentric circle, as shown in FIG. 49. A contact area between the pillar sliders 23 of these cylinders and some piezoelectric elements 1 attached to the foundations 4 of the cylinders is almost constant, in spite of an angle which some (now two) props 49 of the joint make. Therefore, friction powers and stresses generated by the cylinders are also constant, respectively.

Note that, of course, some commercial universal joints may be used instead of the bearings 37, while some bearings 37 are used in FIG. 48 and FIG. 49. A joint using the universal joints can work more widely than one using some bearings 37.

Figure 50:
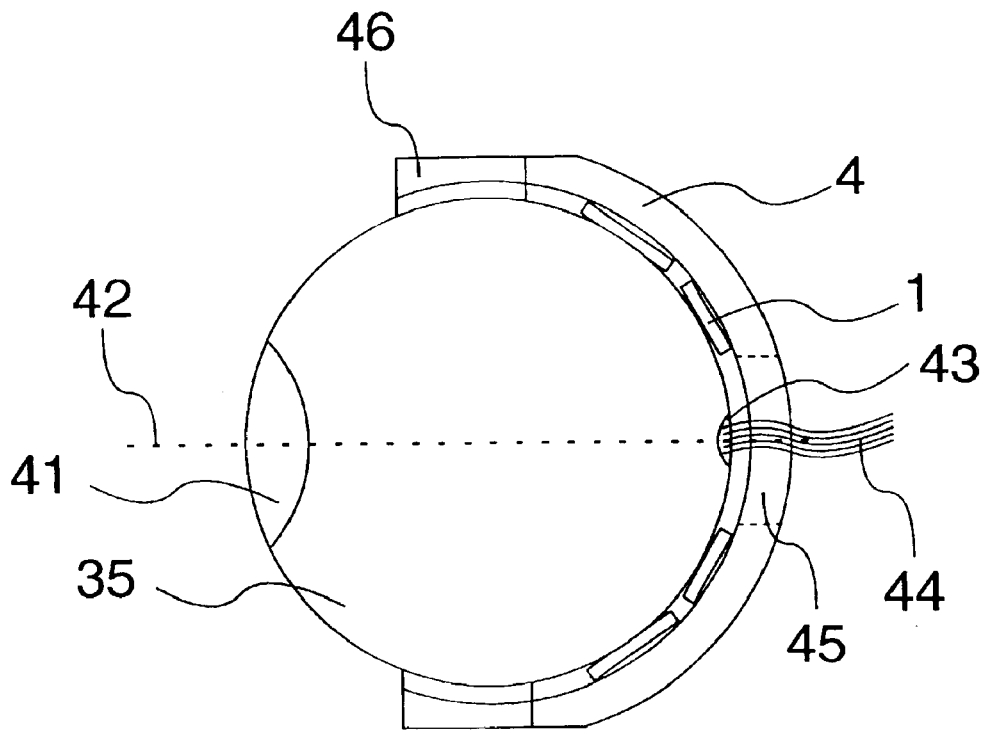
FIG. 50 is an explanation view for a three-degree-of-freedom moving camera using an overlapping type piezoelectric actuator.

Now, as shown in FIG. 50, a moving camera using a multi-degree-of-freedom piezoelectric actuator is based on a multi-degree-of-freedom piezoelectric actuator shown in FIG. 16, where an image sensor with lens 41 is embedded in a spherical rotor 35, and the spherical rotor 35 is held by a support stator 46 as it does not separate. Some signal lines 44 of the image sensor with lens 41 are taken out from an outlet 43 opened on the spherical rotor 35, and are pulled out through a hole for wiring 45 opened at a center of a foundation 4. In particular, as shown in FIG. 50, suppose that a moving camera using a multi-degree-of-freedom piezoelectric actuator is designed as the outlet 43 is opened at a point where an axis of light of a lens crosses with a surface of the spherical rotor 35. Note that the axis of light of a lens of the image sensor with lens 41 passes through a center point of the spherical rotor 35. In this case, the moving camera has the widest operation area. Note that a drive device 12 and wiring are omitted in FIG. 50 (refer to FIG. 33, FIG. 34 and FIG. 35). Suppose that a contact area between the support stator 46 and a foundation 4 of a stator 11 is processed as the support stator 46 can be inserted in the foundation 4, otherwise a screw is shaved in the contact area between the support stator 46 and the foundation 4. The support stator 46 is then fixed on the foundation 4. Since a maker of the moving camera can remove the support stator 46 from the foundation 4, he can exchange easily some parts of the moving camera and repair the moving camera.

Figure 51:
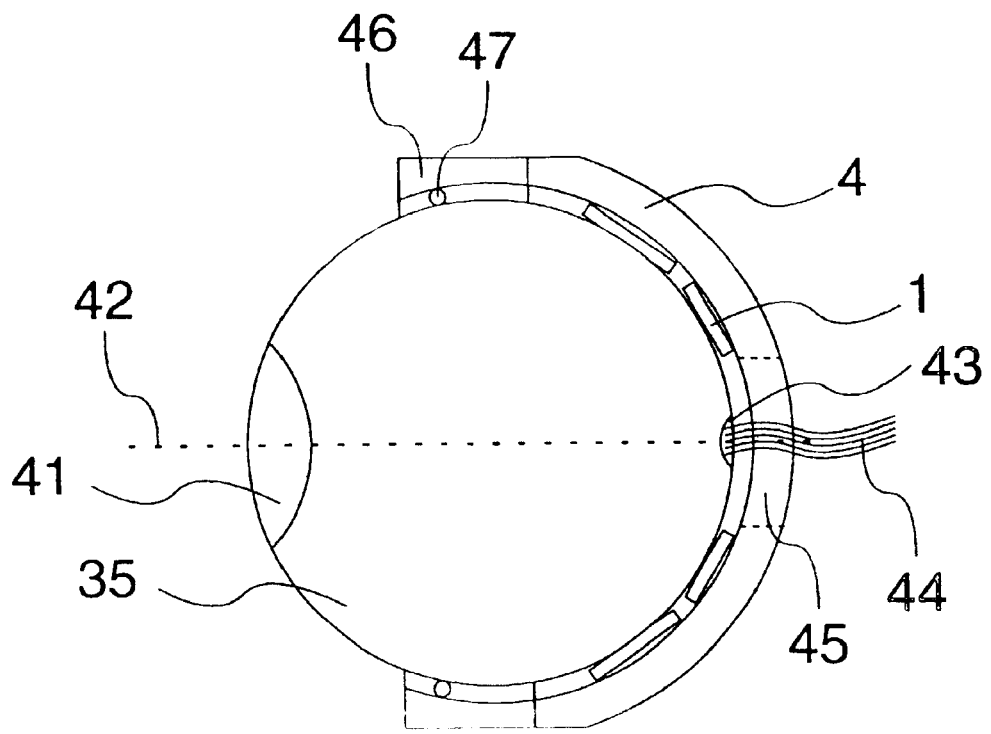
FIG. 51 is an explanation view for a three-degree-of-freedom moving camera using an overlapping type piezoelectric actuator, whose spherical rotor is held by some bearing balls.

Suppose that some bearing balls 47 embedded in a support stator 46 hold a spherical rotor 35 as shown in FIG. 51. A moving camera using a multi-degree-of-freedom piezoelectric actuator suppresses vibration of the spherical rotor 35, and moreover the bearing balls 47 can stick the spherical rotor 35 to piezoelectric elements 1 of stators 11. In a case that an image sensor with lens 41 is embedded in the spherical rotor 35, the spherical rotor 35 can separate easily from the stators 11 because a gravity center of the spherical rotor 35 is different from the center point of the spherical rotor 35. Suppose here that the bearing balls 47 are embedded in the support stator 46. The bearing balls 47 can support the spherical rotor 35 and friction coefficient between the support stator 46 and the spherical rotor 35 can be omitted.

Figure 52:
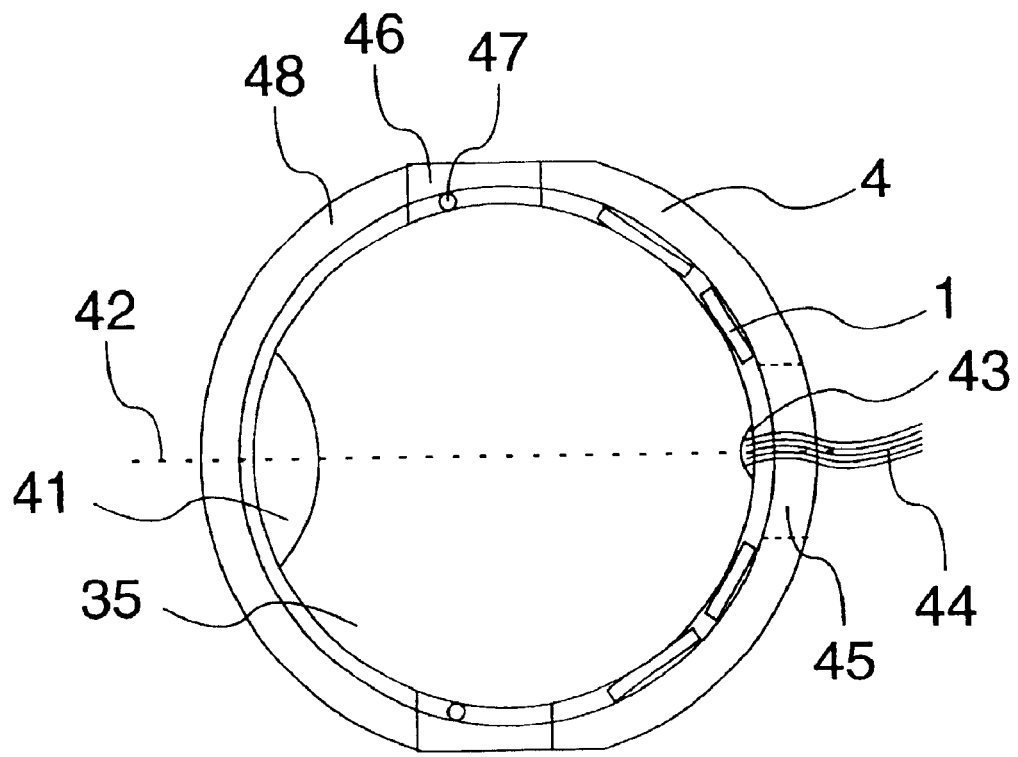
FIG. 52 is an explanation view for a three-degree-of-freedom moving camera using an overlapping type piezoelectric actuator, whose spherical rotor is protected by a transparent cover.

As shown in FIG. 52, a moving camera using a multi-degree-of-freedom piezoelectric actuator has a support stator 46 to which a transparent cover 48 is pasted up. The transparent cover 48 is made by forming glass, acrylics or reinforced plastic and so on. Since few crevices are vacant between a spherical rotor 35 and the support stator 46, dusts, garbages and moisture invade between the crevices. Therefore, rotation of the spherical rotor 35 is disturbed, or surface electrodes 2 (refer to FIG. 1) and back electrodes 3 (refer to FIG. 1) of piezoelectric elements 1 rust. Since the transparent cover 48 is attached to the support stator 46, however, the transparent cover 48 can prevent the dusts, the garbages and the moisture permeating. In addition, the transparent cover 48 can be exchanged easily together with the support stator 46 even when the transparent cover 48 got damaged.

Figure 53:
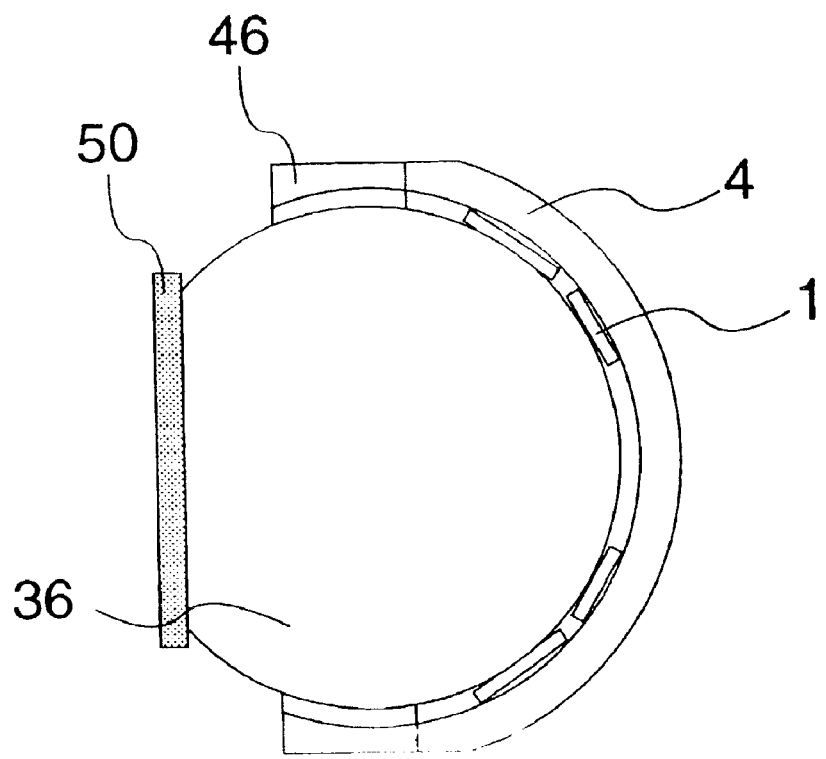
FIG. 53 is an explanation view for a three-degree-of-freedom moving mirror using an overlapping type piezoelectric actuator.

As shown in FIG. 53, a moving mirror using a multi-degree-of-freedom piezoelectric actuator is based on a multi-degree-of-freedom piezoelectric actuator shown in FIG. 16, where a mirror 50 is attached to a semispherical rotor 36 which is a spherical rotor 35, a part of which was cut off or transformed, and the semispherical rotor 36 is held by a support stator 46 as it does not separate. Note that a drive device 12 and wiring are omitted in FIG. 53 (refer to FIG. 33, FIG. 34 and FIG. 35). Suppose that a contact area between the support stator 46 and a foundation 4 of a stator 11 is processed as the support stator 46 can be inserted in the foundation 4, otherwise a screw is shaved in the contact area between the support stator 46 and the foundation 4. The support stator 46 is then fixed on the foundation 4. Since a maker of the moving mirror can remove the support stator 46 from the foundation 4, he can exchange easily some parts of the moving mirror and repair the moving mirror.

Figure 54:
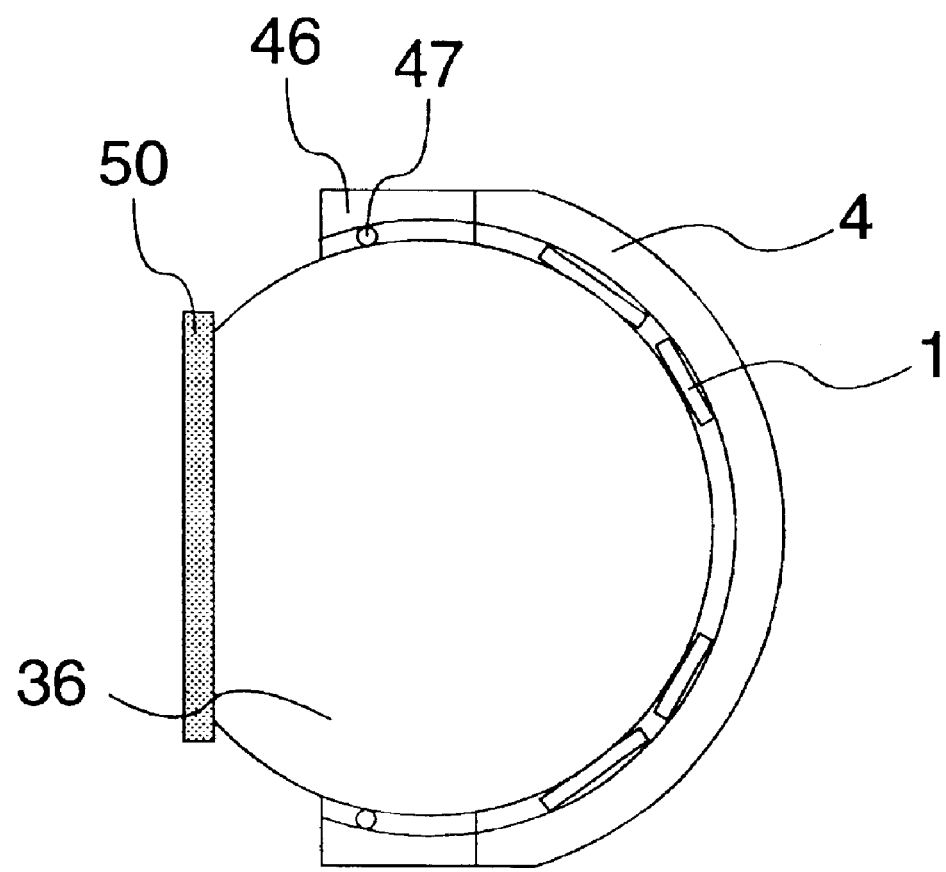
FIG. 54 is an explanation view for a three-degree-of-freedom moving mirror using an overlapping type piezoelectric actuator, whose semispherical rotor is held by some bearing balls.

Suppose that some bearing balls 47 embedded in a support stator 46 hold a semispherical rotor 36 as shown in FIG. 54. A moving mirror using a multi-degree-of-freedom piezoelectric actuator suppresses vibration of the semispherical rotor 36, and moreover the bearing balls 47 can stick the semispherical rotor 36 to piezoelectric elements 1 of stators 11. In a case that a mirror 50 is attached to the semispherical rotor 36, the semispherical rotor 36 can separate easily from the stators 11 because a gravity center of the semispherical rotor 36 is different from the center point of the semispherical rotor 36. Suppose here that the bearing balls 47 are embedded in the support stator 46. The bearing balls 47 can support the semispherical rotor 36 and friction coefficient between the support stator 46 and the semispherical rotor 36 can be omitted.

Figure 55:
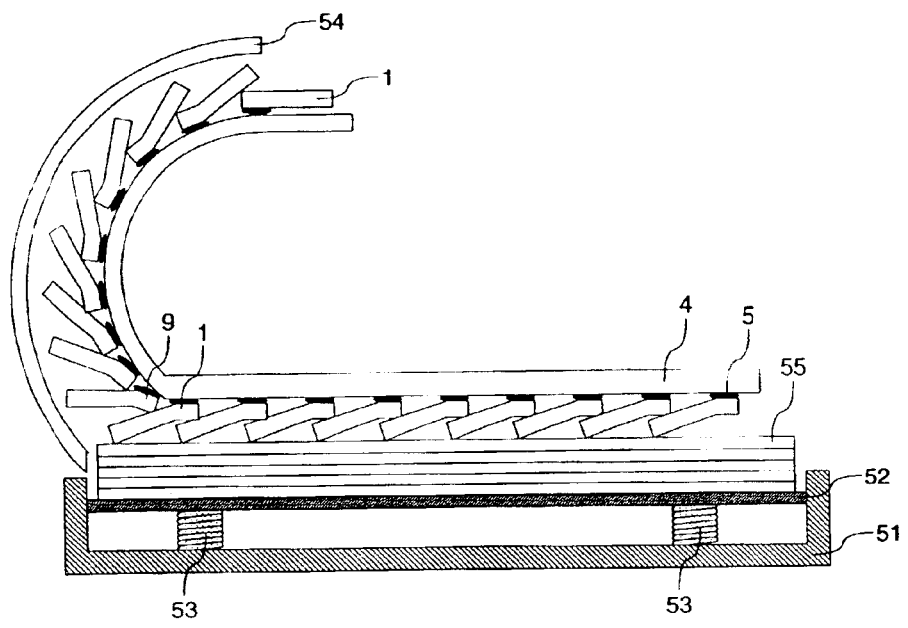
FIG. 55 is an explanation view for a sheet conveyance equipment which picks out every stacked sheet from a tray.
Figure 55:
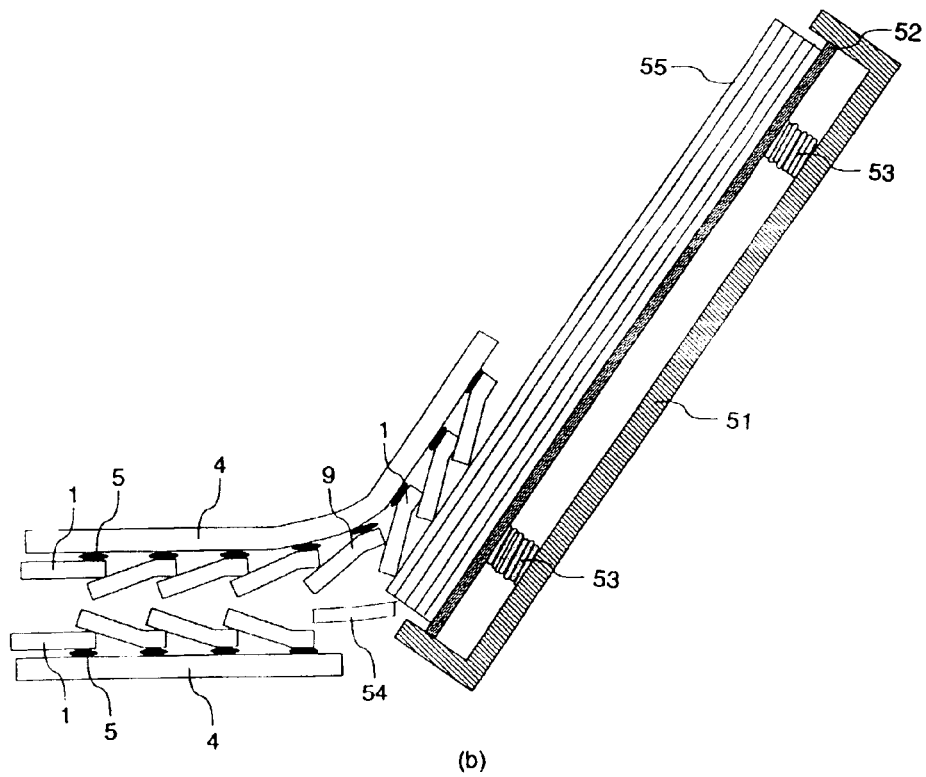

As shown in FIG. 55, a sheet conveyance equipment using an overlapping type piezoelectric actuator picks out every sheet 55 stacked on a splashes board 52 from a tray 51. Note that guide rails 15 and a drive device 12 are omitted in FIG. 55. In a case of FIG. 55(a), the stacked sheets 55 touch some piezoelectric elements 1 because some springs 53 push up the splashes board 52. All piezoelectric elements 1 arranged on a foundation 4 are divided into two groups by a spacer 9 having a surface electrode 2 (refer to FIG. 13(b)) and a back electrode 3 (refer to FIG. 13(b)). Suppose that a group of piezoelectric elements 1 among all piezoelectric elements 1, which are touching the sheets 55, pushes out a top of the stacked sheet 55 from the tray 51. Suppose moreover that another group of piezoelectric elements 1 among all piezoelectric elements 1, which are fixed on the curving foundation 4, rolls up the sheet 55 taken out along a guidance board 54. The sheet 55 therefore becomes inside-out. Since all of the piezoelectric elements 1 are divided into two groups and each group works separately, the sheet conveyance equipment picks out only one sheet 55 at a time from a tray 51. On the other hand, in a case of FIG. 55(b), piezoelectric elements 1 arranged on a reverse stator 11 are divided into two groups by a spacer 9 having a surface electrode 2 and a back electrode 3. Since the tray 51 is arranged aslant, a group of stators 11 touching the sheets 55 among all stators 11 pulls out a top of the stacked sheets 55 from the tray 51. The pulled sheet 55 is guided by a guidance board 54 between two opposite stators 11. Moreover, these stators 11 pull out the sheet 55 from the tray 51 after putting the sheet 55 between themselves. Since the piezoelectric elements 1 of the reverse stator 11 are divided into two groups, and each group works separately, the sheet conveyance equipment picks out only one sheet 55 at a time from the tray 51.

Figure 56:
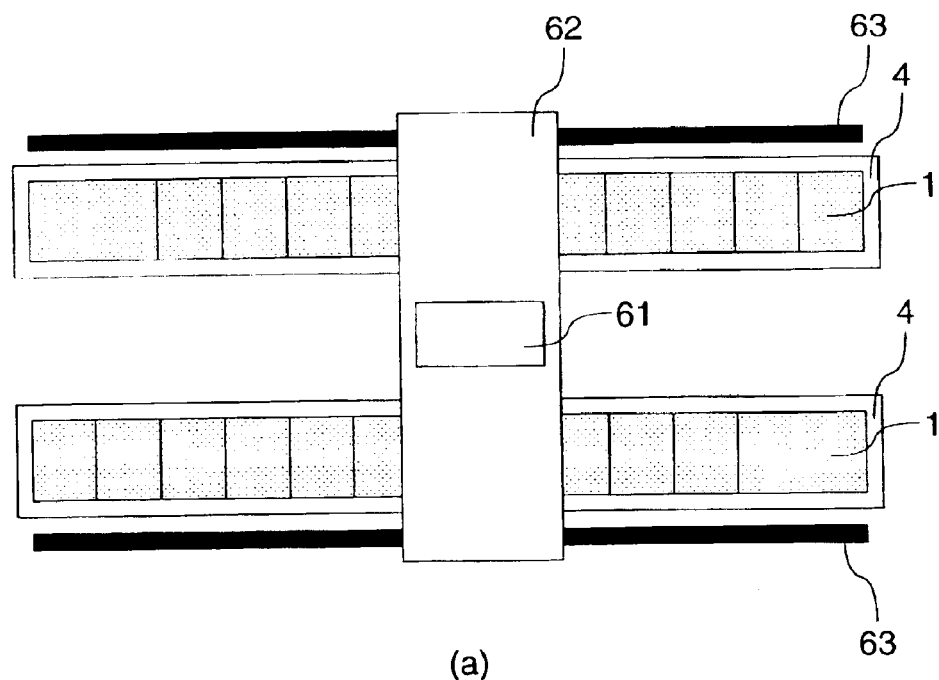
FIG. 56 is an explanation view for a printing head conveyance equipment moving a printing head.
Figure 56:
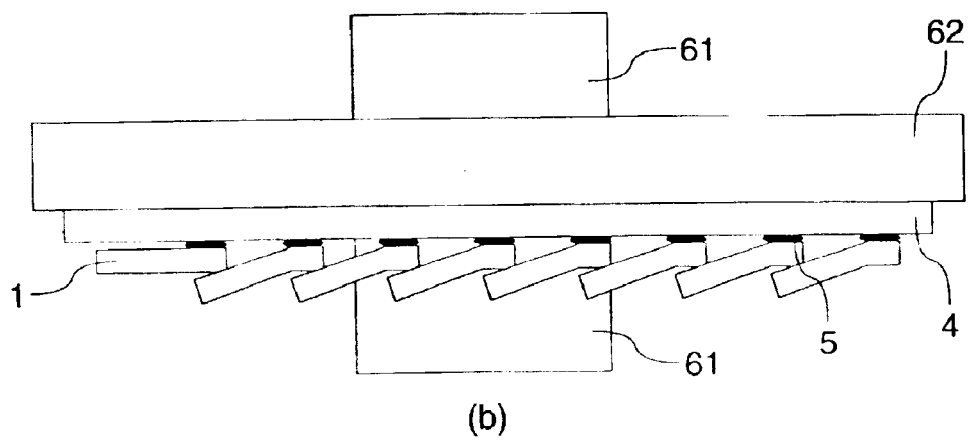

As shown in FIG. 56(a), a printing head conveyance equipment using an overlapping type piezoelectric actuator reciprocates a head carrier 62 to which a printing head 61 is attached. Note that a drive device 12 is omitted in FIG. 56(a). Suppose that unevenness is attached to a surface where the head carrier 62 touches a rail for head 63, corrsponding to the rail for head 63. Even though some piezoelectric elements 1 move the head carrier 62, the head carrier 62 can reciprocate along the rail for head 63. In a case of FIG. 56(a), two foundations 4 are used, and moreover extension directions of some piezoelectric elements 1 fixed on the foundations 4 are opposite each other. If performances of all piezoelectric elements 1 on the foundations 4 are the same, thus, the head carrier 62 can move equally in any direction. Since the piezoelectric elements 1 and the head carrier 62 are separated, moreover, wiring from the drive device 12 to the piezoelectric elements 1 is carried out easily. Since the head carrier 61 passes between the two foundations 4, the head carrier 61 can print in any of directions perpendicular to the head carrier 62.

On the other hand, as shown in FIG. 56(b), in a printing head conveyance equipment using an overlapping type piezoelectric actuator, foundations 4 are attached to a head carrier 62. Note that a drive device 12 and rails for head 63 are omitted in FIG. 56(b). Suppose that some rails for head 63 are set up as some piezoelectric elements 1 fixed on the foundations 4 touch a body of the printing head conveyance equipment, the head carrier 62 can reciprocate along the rails for head 63. Of course, the head carrier 62 can move equally in any direction because extension directions of the piezoelectric elements 1 fixed on two foundations 4 are opposite each other. Since the foundations 4 are attached to the head carrier 62, moreover, the piezoelectric elements 1 can move the head carrier 62 in spite of moving distance of the head carrier 62. In a case of FIG. 56(b), a printing head 61 is embedded in a center of the head carrier 62. The printing head 61 therefore can print in any of directions perpendicular to the head carrier 62.

While the invention has been shown by example, it should be understood, however, that the description herein of specific embodiments is not intended to limit the invention to the particular forms disclosed, but on the contrary, the invention is to cover all modifications equivalents, and alternative falling within the spirit and scope of the invention as defined by the appended claims.

Industrial Applicability

As suggested by claim 1 to claim 4, a summation of all areas of surface electrodes 2 of piezoelectric elements 1 becomes more than a summation of areas of piezoelectric elements 1 touching a slider 21. Therefore, piezoelectric elements 1 of the present invention can generate more distortion than some piezoelectric elements 1 of the conventional ultrasonic actuators, even though piezoelectric charge coefficients of the piezoelectric elements 1 are the same. In short, a stator 11 using the present invention can generate large friction power easily even though it uses piezoelectric elements 1 which are not used because of small piezoelectric charge coefficient. Thus, a user of the present invention can use many types of piezoelectric elements 1, according to his purpose and applications. In addition, the stator 11 using the present invention does not need any metal stators 11, while the conventional ultrasonic actuator amplifies distortion of piezoelectric elements 1, using a metal stator 11 whose form is like a comb. Moreover, the stator 11 using the present invention operates by a single-phase saw-tooth wave, while the conventional ultrasonic actuator needs two sets of piezoelectric elements 1 which are arranged by turns, where double-phase drive voltages are applied to the piezoelectric elements 1, respectively. Thus, a maker of the present invention can manufacture the stator 11 more easily than the conventional ultrasonic actuator. Suppose furthermore that the stator 11 is made upside-down, it can be used as a power of a micromachine running on the ground. In addition, the piezoelectric elements 1 can apply friction power to fluid in terms of viscosity, because the fluid has the viscosity. The present invention, therefore, can also use the fluid instead of a slider 21.

As suggested by claim 2 to claim 3, a drive device 12 can apply a low voltage to a stator 11 because all surface electrodes 2 and all back electrodes 3 of piezoelectric elements 1 in the stator 11 pass electricity, respectively. A maker of the present invention, therefore, can manufacture the drive device 12 more easily than the conventional ultrasonic actuators, and he can use a stator 11 using the present invention for some equipments not suitable for generating high voltage like a cellular phone.

As suggested by claim 5, a stator 11 can move a slider 21 in any direction because a foundation 4 can be transformed freely. In addition, the foundation 4 can be transformed while the stator 11 moves the slider 21. A designer of a production line in a factory, therefore, can use a stator 11 using the present invention for distribution of parts and so on.

As suggested by claim 6 to claim 7, a stator 11 can rotate a circular rotor 31 because some piezoelectric elements 1 are arranged in the shape of a cirlce and an arc. Suppose moreover that the piezoelectric elements 1 are fixed on a circular foundation 4 as their surfaces touch a spherical rotor 35, the stator 11 can rotate the spherical rotor 35. Since a stator 11 of the present invention can convert vibration of piezoelectric elements 1 into friction power more effectively than a stator 11 of the conventional ultrasonic motor, the present invention can realize a efficient piezoelectric motor.

As suggested by claim 8, skids 8 increase friction coefficient of surface electrodes 2 and back electrodes 3. Since it is hard coming to slide the surface electrodes 2 and the back electrodes 3 in a case that piezoelectric element 1 are shrinked rapidly, a stator 11 can generate large friction power. In addition, the piezoelectric elements 1 can apply friction power to fluid in terms of viscosity, because the fluid has the viscosity. The present invention, therefore, can also use the fluid instead of a slider 21. In particular, since a contact area between the skids 8 and the fluid is large, by making height of the skids 8 high, the skids 8 can apply large impelling force to the fluid.

As suggested by claim 9, surface electrodes 2 and back electrodes 3 of piezoelectric elements 1 are not worn out by a slider 21 because a ceiling plate 14 touches the slider 21. A designer of an overlapping type piezoelectric actuator, therefore, can select materials of the surface electrodes 2 and the back electrodes 3 freely. Moreover, since the ceiling plate 14 is an insulator, the surface electrodes 2 and the back electrodes 3 do not make a short circuit because of a material of the slider 21. The designer of the overlapping type piezoelectric actuator, therefore, can also use a metal for the slider 21. Furthermore, since a ceiling plate 14 only has to be attached to all piezoelectric elements 1, a maker of the overlapping type piezoelectric actuator can manufacture the overlapping type piezoelectric actuator more easily than one in a case that some skids 8 are pasted up to a surface electrode 2 and a back electrode 3 of each piezoelectric element 1. In addition, the slider 21 is not caught in the piezoelectric elements 1 even though the slider 21 moves in the direction opposite to the extension direction of the piezoelectric elements 1. The overlapping type piezoelectric actuator, therefore, can convey a thin sheet 55 like a paper as the slider 21 in the direction opposite to the extension direction of the piezoelectric elements 1.

As suggested by claim 10, suppose that a guide rail 15 presses down some piezoelectric elemetns 1. A surface electrode 2 and a back electrode 3 of the piezoelectric element 1 strongly contact to a back electrode 3 and a surface electrode 2 of the adjacent piezoelectric elements 1, respectively, without opening the intervals of the piezoelectric elements 1, even though a foundation 4 was curved. That is, the piezoelectric elements 1 can be elongated and shrinked even though the foundation 4 was curved. A stator 11, therefore, can move an arc slider 21, by rounding the foundation 4 like a drum. In addition, the stator 11 can also move a soft slider 21 like a paper, while bending or rounding it. Suppose moreover that an interval of guide rails 15 is united with breadth of the slider 21, the stator 11 can move the slider 21 along the guide rails 15.

As suggested by claim 11, a multi-degree-of-freedom overlapping type piezoelectric stator can move some objects to all around, respectively, and can only rotate them. That is, the present invention can control movement of the objects finely. In addition, the present invention can be used as power of a micromachine, by carrying the present invention in the micromachine.

As suggested by claim 12, a multi-degree-of-freedom overlapping type pizeoelectric stator can rotate finely not only a ball but also objects whose surface is like a convex lens and a concave lens with three degrees of freedom. In short, since the present invention can change direction of a reflector freely, a laser equipment can adjust an angle of reflected light easily, by carrying the present invention in the laser equipment. In an overlapping type piezoelectric actuator, moreover, suppose that two stators 11 face each other as a spherical rotor 35 and an object like an iron array are put between them. For each stator 11, the spherical rotor 35 and the object can be rotated smoothly with three degrees of freedom. Similarly, in a case that two stators 11 face each other as an object having two concave surfaces like a sphere is put between them, the object can rotate smoothly with three degrees of freedom, for each stator 11. In particular, suppose that two foundations 4 of stators 11 are drawn by an elastic body like rubber, a designer of a robot can use these overlapping type piezoelectric actuators for a joint of the robot. The joint can change an angle flexibly, corresponding to external power, while the conventional robot joint using a motor and gears can not do. The joint is therefore hard to do harm to man.

As suggested by claim 13, a drive device 12 becomes simple because the drive device 12 only has to generate a saw-tooth wave. A maker of an overlapping type piezoelectric actuator, therefore, can manufacture the drive device 12 easily.

As suggested by claim 14, a slot and a projection increase friction coefficient of a slider 21 and a circular rotor 31. When piezoelectric elements 1 are shrinked rapidly, it is hard coming to slide the slider 21 and the circular rotor 31. A stator 11 therefore can generate large friction power.

As suggested by claim 15, a user of the present invention can realize a small multi-degree-of-freedom ultrasonic motor because the present invention can make a stator 11 smaller than a stator 11 of the conventional multi-degree-of-freedom ultrasonic motor. In addition, since the present invention can make a contact area between the stator 11 and a spherical rotor 35 smaller than the conventional multi-degree-of-freedom ultrasonic motor, it can make frictional resistance between the stator 11 and the spherical rotor 35 small for rotation in the direction which crosses the stator 11. Thus, the present invention can reduce the amount of energy consumption.

As suggested by claim 16 and claim 17, the number of stators 11 described in claim 1 and claim 8 can be changed easily. A user of the present invention therefore can heighten stress by increasing an area of surfaces of piezoelectric elements 1 if needed.

As suggested by claim 18, ones generating stress really among some stators 11 described in claim 1 and claim 8 can be selected. A user of the present invention therefore can apply friction power to a specific part of a slider 21 if needed. Thus, the user of the present invention can control the slider 21 finely.

As suggested by claim 19 and claim 20, in a case that a designer of an overlapping type piezoelectric actuator must apply stress to an irregular slider 21, a user of the present invention can manufacture a stator 11 more easily than one who makes a foundation 4 according to unevenness of the slider 21, and who arranges piezoelectric elements 1 on the slider 21. In addition, each piezoelectric element 1 can apply stress equally to the slider 21. For example, suppose that some stators 11 are arranged along the moving direction of a piston. The user of the present invention can easily manufacture an overlapping type piezoelectric actuator like a cylinder. Suppose moreover that claim 18 and claim 20 are combined. Since the stators 11 generate the almost same stress toward both direction, a drive device 12 does not have to adjust voltage, waveform and frequency. The present invention therefore makes control of the overlapping type piezoelectric actuator easy.

As suggested by claim 21, suppose that a slider 21 is put between two stators 11, these stators 11 force the slider 21 on piezoelectric elements 1 of the mutual stator 11. In short, since the slider 21 can receive friction power enough from these stators 11, the slider 21 can move easily. Suppose here that an overlapping type piezoelectric actuator is made as the slider 21 is put between two stators 11. Even though the slider 21 is such a light object as a paper, the overlapping type piezoelectric actuator can move the slider 21 easily. Suppose moreover that an overlapping type piezoelectric actuator is made as the circular rotor 31 is put between two stators 11, the overlapping type piezoelectric actuator can generate strong torque.

As suggested by a cylinder using an overlapping type piezoelectric actuator, suppose that a pillar slider 23 and a stator 11 bend flexibly, the stator 11 can make the pillar slider 23 to go back and forth even though the pillar slider 23 is on a winding place. In a case of embedding the cylinder in a tube like a catheter, then, the stator 11 can send out a minute object to a head from an end of the cylinder. Suppose moreover that the cylinder, to an end of whose pillar slider 23 an instrument is attached, is attached to the head of the catheter. The catheter can control receipts and payments of the instrument finely according to directions from the outside via a drive device 12.

As suggested by a vibrator using an overlapping type piezoelectric actuator, the vibrator can be made very thinly because the vibrator consists of stacks of a foundation 4, some piezoelectric elements 1 and a circular rotor 31, and moreover a weight 34 if needed. In addition, since a magnet is not required in the present invention, and surface electrodes 2 and back electrodes 3 of the piezoelectric elements 1 and electric wires are a metal, a designer of the present invention can reduce weight of the vibrator, by using materials like a plastic for the foundation 4, the circular rotor 31 and the weight 34.

As suggested by a moving table using some stators 11, a multi-degree-of-freedom overlapping type piezoelectric stator can move some objects to all around, respectively, and can only rotate them, on the moving table. Since the present invention can control movement of the objects finely, it can be used as a driving source of a microfactory. In addition, the present invention can be used as a driving source of a micromachine, by carrying the present invention in the micromachine.

As suggested by a joint using a multi-degree-of-freedom piezoelectric actuator, control mechanism and a control device of a joint using a multi-degree-of-freedom overlapping type piezoelectric actuator becomes easier than ones of a joint using an ultrasonic motor. Moreover, since a multi-degree-of-freedom overlapping type piezoelectric stator covers only a half surface of a spherical rotor 35 in the present invention, a domain which the joint can operate within is wide. Design of the joint thus becomes easy. Since the present invention is light but does not require electric power for maintaining a fixed angle, and can operate finely, the present invention is useful for a joint of a finger and an arm of a robot, and so on.

As suggested by a joint using a multi-degree-of-freedom piezoelectric actuator and an overlapping type piezoelectric actuator, not only at least one cylinder forces torque which a spherical rotor 35 of the joint outputs, but also an angle which props 49 of the joint make is maintained by friction power generated by these cylinders. In a case that external power is applied to the joint, thus, the joint can change easily the angle which the props 49 make, and moreover can maintain the angle. Since the present invention is light but does not require electric power for maintaining a fixed angle, and can generate large torque, the present invention is useful for a joint of a leg of a robot, and so on.

As suggested by a moving camera using a multi-degree-of-freedom piezoelectric actuator, control mechanism and a control device of a moving camera using a multi-degree-of-freedom overlapping type piezoelectric actuator becomes easier than ones of a moving camera using an ultrasonic motor. Moreover, since a multi-degree-of-freedom overlapping type piezoelectric stator covers only a half surface of a spherical rotor 35 in the present invention, a domain which the moving camera can operate within is wide. Design of the joint thus becomes easy.

As suggested by a moving camera using a multi-degree-of-freedom piezoelectric actuator, an application domain of the moving camera is large since a foreign substance does not enter between a spherical rotor 35 and a support stator 46. In particular, in a case of carrying the moving camera in an object whose use place is unspecified and whose handling is not limited like a cellular phone and a pet robot, it is easy for the foreign substance to enter in movable portion of the moving camera. The foreign substance therefore causes the failure of the moving camera. By using the present invention, however, dust and moisture do not enter between the spherical rotor 35 and the support stator 46. Moreover, since a transparent cover 48 protects a lens, it is hard coming to attach a crack to the lens. Even though the crack is attached to the transparent cover 48, the transparent cover 48 can be exchanged together with the support stator 46. The moving camera thus can be repaired more cheaply than repair in a case of exchanging the spherical rotor 35 embedding an image sensor with lens 41.

As suggested by a moving mirror using a multi-degree-of-freedom piezoelectric actuator, control mechanism and a control device of a moving mirror using a multi-degree-of-freedom overlapping type piezoelectric actuator becomes easier than ones of a moving mirror using an ultrasonic motor. Moreover, since a multi-degree-of-freedom overlapping type piezoelectric stator covers only a half surface of a spherical rotor 35 in the present invention, a domain which the moving mirror can operate within is wide. Design of the joint thus becomes easy. Since the present invention is light but does not require electric power for maintaining a fixed angle, and can operate finely, the present invention is useful for a side mirror and a back mirror of a car, and so on.

As suggested by a sheet conveyance equipment using an overlapping type piezoelectric actuator, the sheet conveyance equipment can be used as a sheet feeder of a printer and a scanner, because some stators 11 can pick out every stacked sheet 55 from a tray 51. In particular, many present printers and scanners pick up every paper from a tray 51, using many parts like a motor, a gear and a roller. By using an overlapping type piezoelectric actuator, however, the number of parts of the sheet feeder decreases. In addition, the amount of energy consumption of the sheet feeder becomes low, and the sheet feeder stops being able to break down easily. A maker of a printer and a scanner then can manufacture the printer and the scanner cheaply. Moreover if the present invention is used, a designer of the printer and the scanner can design a mobile printer and a mobile scanner required as they are small and light, and consume only few energy.

As suggested by a printing head conveyance equipment using an overlapping type piezoelectric actuator, stators 11 can reciprocate a printing head 61. In particular, many present printers reciprocate a printing head 61, using many parts like a motor, a gear and a roller. By using an overlapping type piezoelectric actuator, however, the number of parts of the printer decreases. In addition, the amount of energy consumption of the printer becomes low, and the printer stops being able to break down easily. A maker of a printer then can manufacture the printer cheaply. Moreover if the present invention is used, a designer of the printer can design a mobile printer required as it is small and light, and consumes only few energy.

What is claimed is:

1. An overlapping type piezoelectric stator comprising:

a plurality of piezoelectric elements; and a foundation, wherein each piezoelectric element is formed in a thin film, a surface and a back of said piezoelectric element are each equipped with an electrode, respectively, and each piezoelectric element is folded up in a right-angled direction to an extension direction, wherein, in each of said piezoelectric elements folded up, predetermined parts of both sides are insulated by insulators, wherein, in attaching said piezoelectric elements to said foundation, said piezoelectric elements are arranged along said foundation in turn, said piezoelectric elements are overlapping, at least one of said electrodes on both sides of each piezoelectric element touches an electrode of an adjacent piezoelectric element, and an end of each piezoelectric element is fixed to said foundation, and wherein voltage is applied to electrodes of at least one of said piezoelectric elements arranged in turn.

2. An overlapping type piezoelectric stator comprising:

a plurality of piezoelectric elements; and a foundation, wherein each piezoelectric element is formed in a thin film, and a surface and a back of said piezoelectric element are equipped with an electrode, respectively, wherein, in each of said piezoelectric elements folded up, predetermined parts of both sides are insulated by insulators, a part of said electrode on said back and a part of said electrode on said surface are covered by at least one tunica electrode, and a part of said electrode on said back and a part of said surface are covered by said at least one tunica electrode, wherein, in attaching said piezoelectric elements to said foundation, said piezoelectric elements are arranged along said foundation in turn, said piezoelectric elements are overlapping, at least one of said electrodes on said surface and back of each piezoelectric element touches an electrode of an adjacent piezoelectric element via a plurality of said at least one tunica electrodes, and an end of each piezoelectric element is fixed to said foundation, and wherein voltage is applied to said electrodes of at least one of said piezoelectric elements arranged in turn.

3. An overlapping type piezoelectric stator according to claim 1, or 2, wherein, for each of said piezoelectric elements, resistance is reduced by connecting said electrode on said surface, said electrode on said back and a tunica electrode of said piezoelectric element with said electrode on said back, said electrode on said surface and a tunica electrode of an adjacent piezoelectric element, respectively, via at least one lead or at least on conductive sponge.

4. An overlapping type piezoelectric stator according to claim 3, wherein said foundation can be transformed.

5. An overlapping type piezoelectric stator according to claim 4, wherein said piezoelectric elements are arranged circularly, a spacer is inserted between electrodes in a head piezoelectric element and an end piezoelectric element of said overlapping type piezoelectric stator, two sides of said spacer touching said electrode in said head piezoelectric element and said electrode in said end piezoelectric element are equipped with electrodes, respectively, and said voltage is applied to said electrode in said head piezoelectric element and said electrode in said end piezoelectric element, via said electrodes of said two sides of said spacer.

6. An overlapping type piezoelectric stator according to claim 1, wherein said piezoelectric elements are arranged circularly.

7. An overlapping type piezoelectric stator according to claim 1, wherein at least one of said electrodes of said surface and back of each piezoelectric element has a skid at an end opposite to an end fixed on said foundation.

8. An overlapping type piezoelectric stator according to claim 1, wherein, in each electrode of each piezoelectric element, a ceiling plate is attached to an end opposite to an end fixed on said foundation.

9. An overlapping type piezoelectric stator according to claim 1, wherein, even when said foundation is curved, a plurality of said piezoelectric elements are pressed down by at least one guide rail arranged along an extension direction, by fixing both sides of said guide rail on said foundation by attachment of said guide rail.

10. A multi-degree-of-freedom overlapping type piezoelectric stator comprising:

a plurality of said overlapping type piezoelectric stators according to claim 5, wherein a first overlapping type piezoelectric stator of said overlapping type piezoelectric stators includes piezoelectric elements which are arranged circularly, wherein a plurality of second overlapping type piezoelectric stators of said overlapping piezoelectric stator each includes piezoelectric elements which are arranged linearly, wherein said first overlapping type piezoelectric stator and said second overlapping type piezoelectric stators are arranged on a plane, said second overlapping type piezoelectric stators surround said first overlapping type piezoelectric stator, and wherein said first overlapping type piezoelectric stator and said second overlapping type piezoelectric stators operate independently.

11. A multi-degree-of-freedom overlapping type piezoelectric stator according to claim 10, wherein a convex and a concave are used instead of said plane.

12. An overlapping type piezoelectric actuator comprising: a multi-degree-of-freedom overlapping type piezoelectric stator according to claim 10 and at least one drive device, wherein a slider touching said piezoelectric elements of each of said overlapping type piezoelectric stators moves by said drive device generating a saw-tooth wave as said voltage.

13. An overlapping type piezoelectric actuator according to claim 12, wherein a contact surface of said slider touching said piezoelectric elements of each of said overlapping type piezoelectric stators is trenched, or projections are attached to a contact surface.

14. An overlapping type piezoelectric actuator comprising:

a plurality of overlapping type piezoelectric stators according to claim 5; and a plurality of drive devices, wherein said overlapping type piezoelectric stators surround a spherical rotor, and said drive devices generate a saw-tooth wave as said voltage, and wherein said spherical rotor touching said piezoelectric elements of said overlapping type piezoelectric stators rotates with multi degrees of freedom.

15. An overlapping type piezoelectric actuator drive method for an overlapping type piezoelectric actuator according to claim 12, wherein one of said at least one drive device applies a same voltage to all overlapping type piezoelectric stators.

16. An overlapping type piezoelectric actuator drive method for an overlapping type piezoelectric actuator according to claim 12, wherein all overlapping type piezoelectric stators are classified into a same number of sets as a number of said at least one drive device, each of said at least one drive device generates one of said voltages whose phases are different from each other, and each drive device applies a voltage to one of a set of overlapping type piezoelectric stators which are different from each other.

17. An overlapping type piezoelectric actuator drive method for an overlapping type piezoelectric actuator according to claim 12, wherein at least one drive device applies said voltage to at least one set of overlapping type piezoelectric stators by classifying all overlapping type piezoelectric stators into a plurality of sets, attaching a switch to each of said drive devices, and selecting at least one set of overlapping type piezoelectric stators by said switch.

18. An overlapping type piezoelectric actuator according to claim 12, wherein said piezoelectric elements of at least two overlapping type piezoelectric stators overlap in a same direction.

19. An overlapping type piezoelectric actuator according to claim 12, wherein said piezoelectric elements of at least two overlapping type piezoelectric stators overlap in an opposite direction.

20. An overlapping type piezoelectric actuator according to claim 12, wherein for two of said overlapping type piezoelectric stators, and one or two drive devices, said slider moves between piezoelectric elements of said two overlapping type piezoelectric stators, by arranging said piezoelectric elements of said two overlapping type piezoelectric stators face to face.

* * * * *